(12) United States Patent
Ashok et al.

(10) Patent No.: US 10,185,306 B2
(45) Date of Patent: Jan. 22, 2019

(54) UTILIZING LOOK-UP TABLES REPRESENTING ALL MODELS IN AN AUTOMATION CONTROL ARCHITECTURE TO INDEPENDENTLY HANDLE UNCERTAINTIES IN SENSED DATA IN OIL AND GAS WELL CONSTRUCTION

(71) Applicant: Board of Regents, The University of Texas System, Austin, TX (US)

(72) Inventors: Pradeepkumar Ashok, Austin, TX (US); Eric van Oort, Austin, TX (US); Adrian Ambrus, Austin, TX (US); Parham Pournazari, Austin, TX (US); Roman Shor, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 304 days.

(21) Appl. No.: 15/053,500

(22) Filed: Feb. 25, 2016

(65) Prior Publication Data
US 2016/0252897 A1     Sep. 1, 2016

Related U.S. Application Data

(60) Provisional application No. 62/121,978, filed on Feb. 27, 2015.

(51) Int. Cl.
*G01M 1/38*     (2006.01)
*G05B 19/4155*  (2006.01)
*E21B 44/02*    (2006.01)

(52) U.S. Cl.
CPC ......... *G05B 19/4155* (2013.01); *E21B 44/02* (2013.01); *G05B 2219/45129* (2013.01)

(58) Field of Classification Search
None
See application file for complete search history.

(56) References Cited

U.S. PATENT DOCUMENTS

| 6,519,568 B1 * | 2/2003 | Harvey | G06Q 20/203 |
| | | | 702/14 |
| 7,668,694 B2 * | 2/2010 | Anderson | E21B 47/042 |
| | | | 700/281 |

(Continued)

OTHER PUBLICATIONS

Ambrus et al., "Overcoming Barriers to Adoption of Drilling Automation: Moving Towards Automated Well Manufacturing," SPE/IADC Drilling Conference and Exhibition, London, United Kingdom, Mar. 17-19, 2015, pp. 1-38.

(Continued)

*Primary Examiner* — Cory W Eskridge
(74) *Attorney, Agent, or Firm* — Robert A. Voigt, Jr.; Winstead, P.C.

(57) ABSTRACT

A method, system and computer program product for utilizing look-up tables representing all models in an automation control architecture to independently handle uncertainties in sensed data. Data is stored in a form of conditional probability tables (CPTs) or conditional probability distributions (CPDs), where the data comes from an operator, a service provider, a drilling contractor and an equipment manufacturer. Models of the drilling process domains, such as wellbore hydraulics, drill bit/rock interactions, torque and drag modeling, vibration modeling and drilling machinery operation, are received. Data is extracted from these models into the CPTs or CPDs. The CPTs or CPDs are converted to look-up tables. Data in the look-up tables are then visually displayed in graphical form. As a result, real-time troubleshooting of drilling operations occurs in an efficient manner.

12 Claims, 55 Drawing Sheets

(56) References Cited

U.S. PATENT DOCUMENTS

| | | | |
|---|---|---|---|
| 8,463,548 B2* | 6/2013 | Gies | E21B 47/01 702/9 |
| 2011/0172976 A1* | 7/2011 | Budiman | E21B 47/022 703/2 |
| 2013/0231781 A1 | 9/2013 | Chapman | |

OTHER PUBLICATIONS

James J. Alpigini, "Dynamical System Visualization and Analysis Via Performance Maps," Information Visualization, vol. 3, No. 4, pp. 271-287.

Brian Coffey, "Using Building Simulation and Optimization to Calculate Lookup Tables for Control," http://escholarship.org/uc/item/1202p562, Jan. 30, 2012, pp. 1-154, see pp. 17-32.

Hafner et al., "Multiobjective Optimization of Feedforward Control Maps in Engine Management Systems Towards Low Consumption and Low Emissions," Transactions of the Institute of Measurement and Control, vol. 25, No. 1, 2003, pp. 57-74.

International Preliminary Report on Patentability for International Application No. PCT/US2016/019576 dated Sep. 8, 2017, pp. 1-9.

International Search Report and Written Opinion of the International Searching Authority for International Application No. PCT/US2016/019576 dated May 6, 2016, pp. 1-11.

* cited by examiner

TABLE 1
| Joints | Component | OD (in) | ID (in) |
|---|---|---|---|
|  | Drill Pipe | 5 | 4.276 |
| 10 | HWDP | 5 | 3 |
| 1 | XO Sub | 6½ | 2¼ |
| 7 | Drill Collar | 6½ | 2¾ |
| 1 | XO Sub | 8 | 2.375 |
| 3 | Drill Collar | 8 | 2.375 |
| 2 | NM Drill Collar | 8 | 2¾ |
| 1 | MWD | 8 |  |
| 1 | Stabilizer | 8 | 2¾ |
| 1 | Bit | 12¼ |  |
FIG. 11
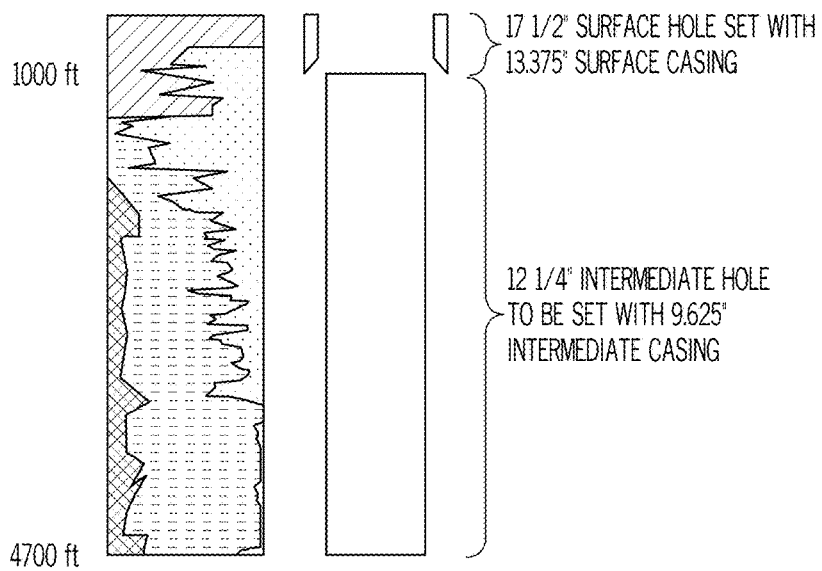
FIG. 12
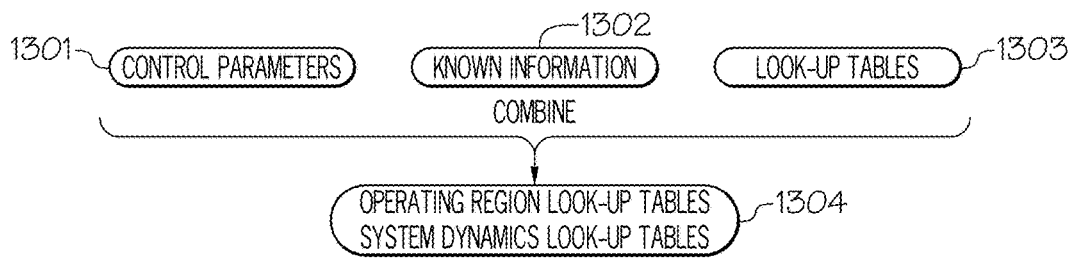
FIG. 13

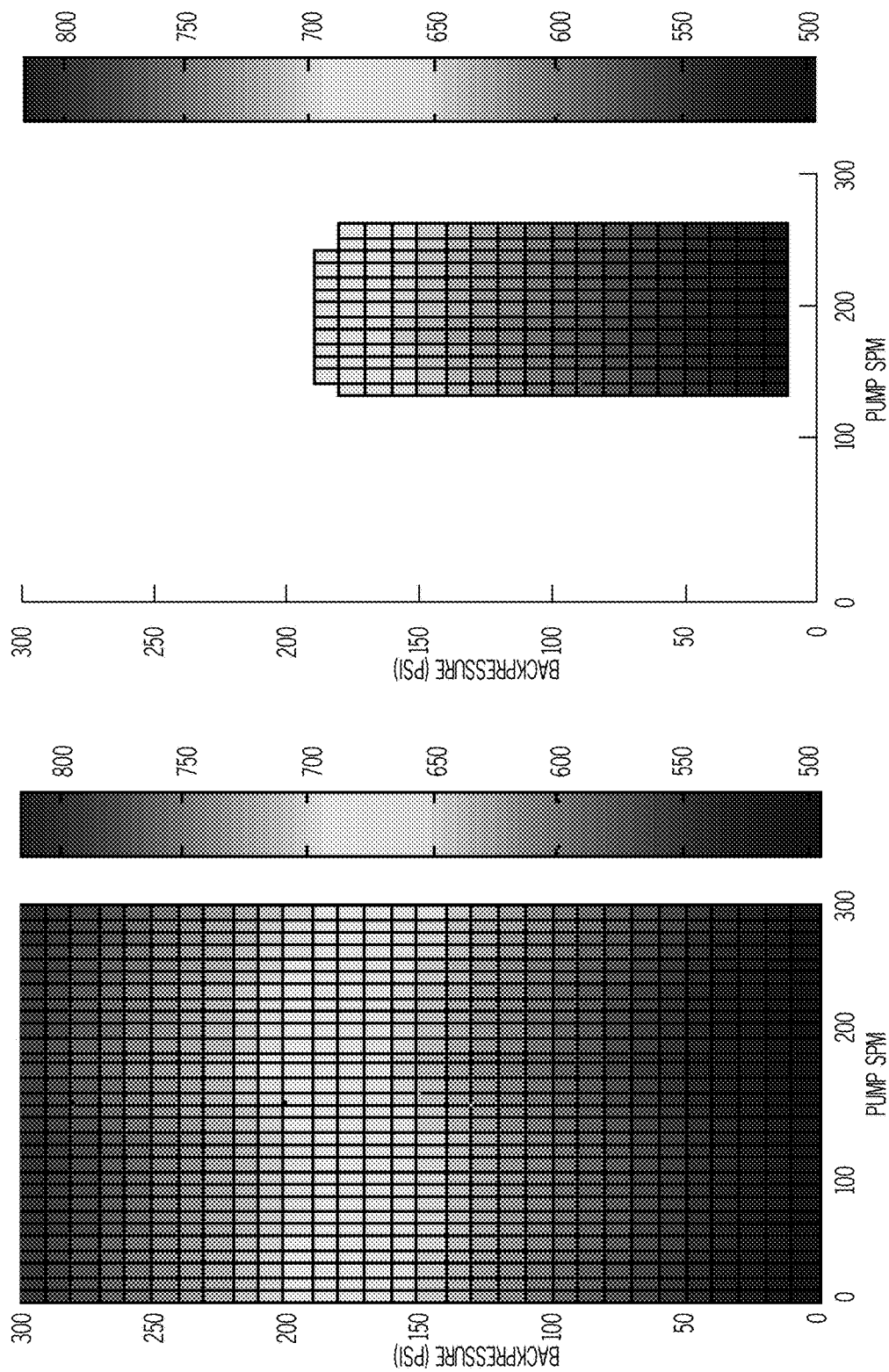

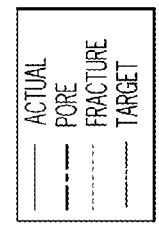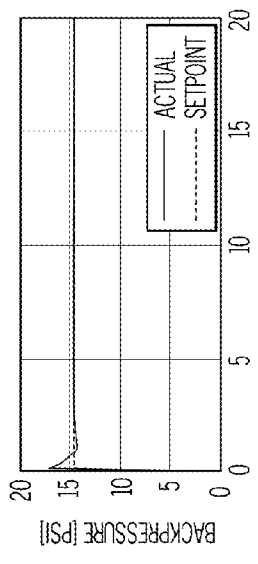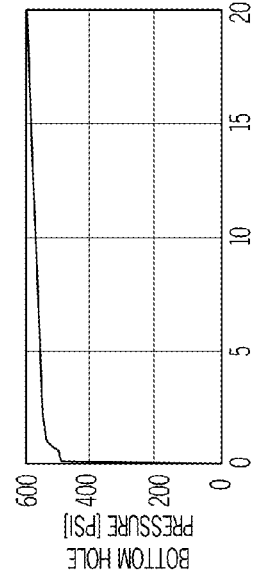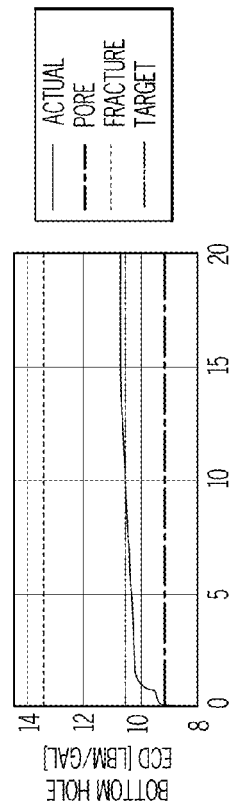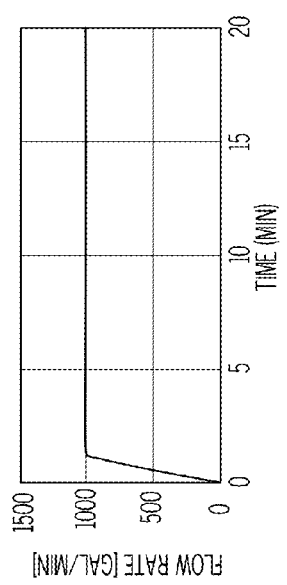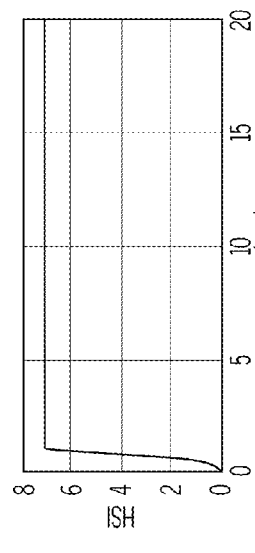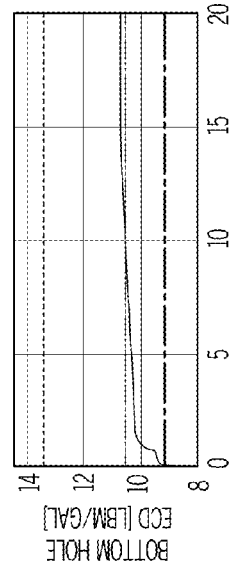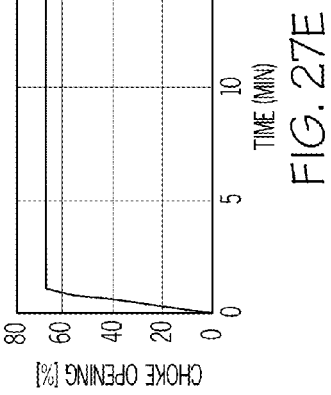

UTILIZING LOOK-UP TABLES REPRESENTING ALL MODELS IN AN AUTOMATION CONTROL ARCHITECTURE TO INDEPENDENTLY HANDLE UNCERTAINTIES IN SENSED DATA IN OIL AND GAS WELL CONSTRUCTION

TECHNICAL FIELD

The present invention relates generally to oil and gas exploration, appraisal and production, and more particularly to utilizing look-up tables representing all models in a drilling, completion, stimulation and production (all aspect of well construction) automation control architecture to independently handle uncertainties in sensed data.

BACKGROUND

Oil and gas exploration, appraisal and production is becoming increasingly difficult and automation of drilling, completion, stimulation and production operations is being explored as a means to improve economics and safety. Past automation attempts have achieved varying degrees of success, and a few are now deployed in the field. These recent developments are very encouraging. However, there still remain significant challenges that need to be overcome before broader adoption of automation in the oil and gas industry is achieved.

Each well that is drilled, completed, stimulated and produced is unique and sensors, actuators, and other rig equipment vary in type, number, performance and quality from one rig to the next. This implies that automation and control algorithms (especially ones that can have safety and high cost ramifications on failure) have to be reviewed and signed off for each well constructed. Current algorithms (except for the simplest ones) require tight control on the hardware for execution, and require significant expertise for adaptation from one rig to another.

A well drilled today generally has four primary stakeholders: the operator, the service provider(s), the drilling contractor, and the equipment manufacturer(s). An automation solution usually requires input from all these parties. Each of them holds data critical to a complete automation solution. More often than not, these stakeholders are hesitant to share data due to competing interests. There is a general consensus that the operator is the stakeholder who holds most authority in this scenario and is best suited to play the role of a data integrator/automation supervisor. But integrating all the data together (when the operator does get access) and devising a control algorithm in a short time period of time is a challenge.

Drilling contractors are often very cautious when it comes to automated algorithms. There are several reasons for this. A first concern is safety: control algorithms provided by service providers and operators are often black box/proprietary, and rig contractors are hesitant to hook them up to their rig systems because of potentially harmful (to people, equipment, etc.) unintended consequences/failures. Secondly, it is often unclear what the value-proposition is for the rig contractor. The potential benefits to an operator or service provider may be evident, whereas, the rig contractor may see only downside risks by adopting automated routines. Both of these concerns need to be addressed to achieve the buy-in of the rig contractor. Hence, making the control algorithm transparent and intuitive for the senior rig contactor representatives at the rig site (e.g., tool pusher, driller) goes a long way to addressing the black box concern.

Data quality in the oil and gas industry is generally not good enough to reliably implement automated control algorithms. Many who have implemented automation solutions in the past recommend improving rig instrumentation. While this is a desirable goal, it is generally not an economically viable solution on a broad level. The current generation of automation algorithms however are not capable of independently handling uncertainties in sensed data generated by current rig instrumentation, presenting a significant hurdle to the adoption and further development of automated solutions.

BRIEF SUMMARY

In one embodiment of the present invention, a method for utilizing look-up tables representing all models in an automation control architecture to independently handle uncertainties in sensed data comprises storing data in a form of conditional probability tables or conditional probability distributions, where the data comes from the following sources: an operator, a service provider, a drilling contractor and an equipment manufacturer. The data from the operator comprises information regarding well planning and construction. The data from the service provider comprises data from surface sensors and downhole telemetry drilling tools. The data from the drilling contractor comprises data regarding a working condition of rig equipment. The data from the equipment manufacturer comprises data regarding equipment performance characteristics. The conditional probability tables are matrices or multi-dimensional arrays that represent probabilistic relationships between various drilling parameters and the conditional probability distributions are continuous variants of the conditional probability tables. The method further comprises receiving models of a drilling process comprising one or more of the following domains: wellbore hydraulics, drill bit/rock interactions, rock/fluid interactions, wellbore geomechanics, torque and drag modeling, vibration modeling and drilling machinery operation. Furthermore, the method comprises extracting data from the models into the conditional probability tables or conditional probability distributions. Additionally, the method comprises converting the conditional probability tables or conditional probability distributions into look-up tables. In addition, the method comprises visually displaying data in the look-up tables in graphical form.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which:

FIG. 11 is a table, Table 1, of the bottom-hole assembly specification in accordance with an embodiment of the present invention;

FIG. 12 illustrates the formation lithology expected in the intermediate hole section in accordance with an embodiment of the present invention;

FIG. 13 illustrates the data integration to arrive at look-up tables needed to design the control algorithm in accordance with an embodiment of the present invention;

FIGS. 22A-22B illustrate the bottom-hole pressure look-up table at 1,000 ft., where the plot in FIG. 22A is before constraints are enforced and the plot in FIG. 22B is with the constraints, in accordance with an embodiment of the present invention;

FIGS. 27A-27F illustrate the hydraulics inputs and outputs for controller 2B in accordance with an embodiment of the present invention;

DETAILED DESCRIPTION

In the following description, various embodiments are described. For purposes of explanation, specific configurations and details are set forth in order to provide a thorough understanding of the embodiments. It will also be apparent to one skilled in the art that the present invention can be practiced without the specific details described herein. Furthermore, well-known features may be omitted or simplified in order not to obscure the embodiment being described.

Figure 1:
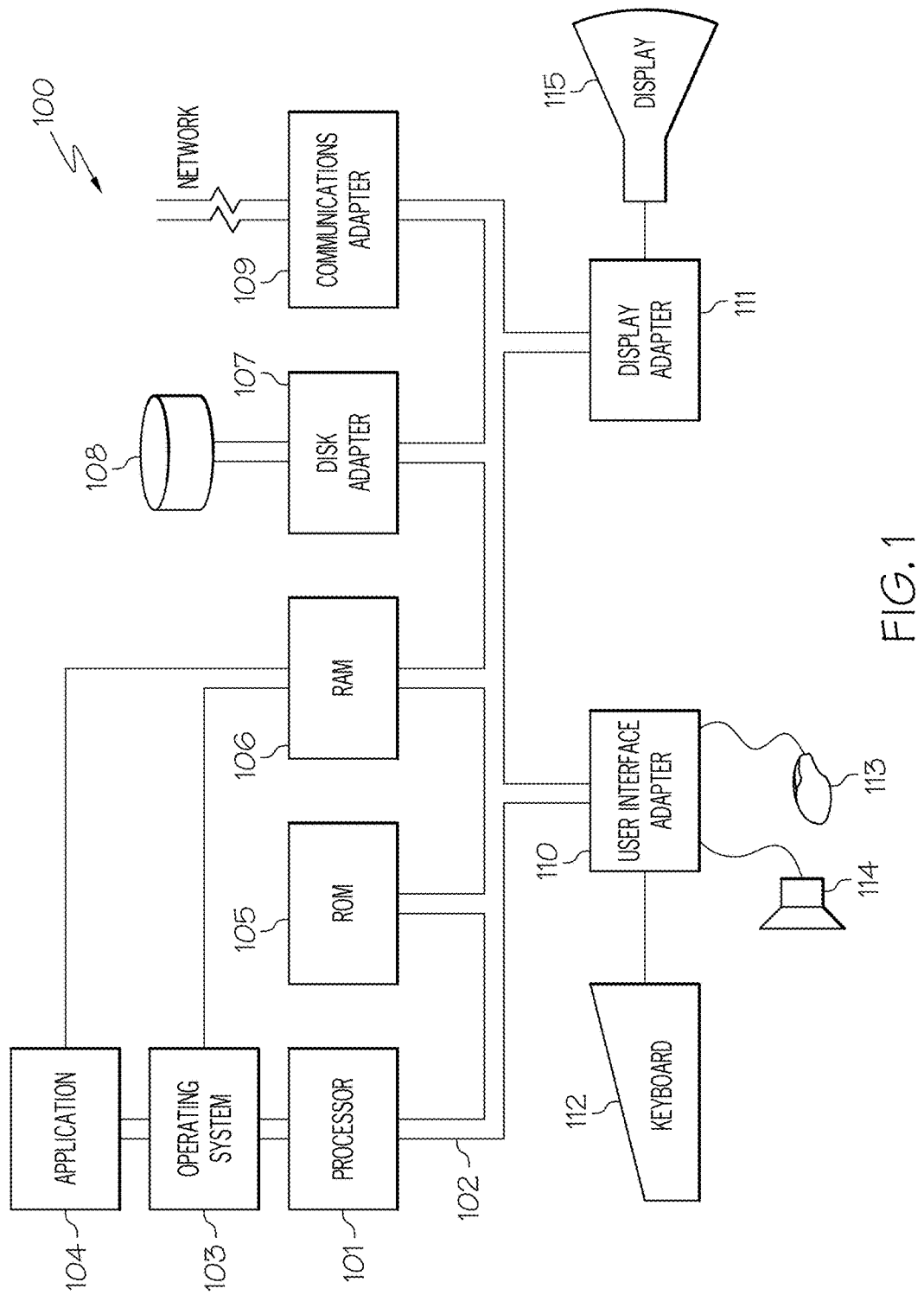
FIG. 1 illustrates an embodiment of a hardware configuration of a computer system which is representative of a hardware environment for practicing the present invention.

Referring now to the Figures in detail, FIG. 1 illustrates an embodiment of a hardware configuration of a computer system 100 which is representative of a hardware environment for practicing the present invention. In one embodiment, computer system 100 is attached to sensors (not shown), sensing activities, events, physical variables, etc., occurring in the drilling or other type of environment (e.g., stimulation operation, production operation). Referring to FIG. 1, computer system 100 may have a processor 101 coupled to various other components by system bus 102. An operating system 103 may run on processor 101 and provide control and coordinate the functions of the various components of FIG. 1. An application 104 in accordance with the principles of the present invention may run in conjunction with operating system 103 and provide calls to operating system 103 where the calls implement the various functions or services to be performed by application 104. Application 104 may include, for example, an application for integrating data from multiple stakeholders in a drilling environment that can be presented in an easily understood manner as discussed below in association with FIGS. 2-3, 4A-4B, 5-13, 14A-14F, 15A-15E, 16A-16F, 17-18, 19A-19H, 20A-20H, 21A-21B, 22A-22B, 23A-23F, 24A-24D, 25A-25F, 26A-26D, 27A-27F, 28A-28D, 29A-29F, 30A-30D, 31A-31D, 32, 33A-33B, 34A-34C, 35A-35D, 36, 37A-37D, 38, 39A-39D and 40.

Referring again to FIG. 1, read-only memory ("ROM") 105 may be coupled to system bus 102 and include a basic input/output system ("BIOS") that controls certain basic functions of computer device 100. Random access memory ("RAM") 106 and disk adapter 107 may also be coupled to system bus 102. It should be noted that software components including operating system 103 and application 104 may be loaded into RAM 106, which may be computer system's 100 main memory for execution. Disk adapter 107 may be an integrated drive electronics ("IDE") adapter that communicates with a disk unit 108, e.g., disk drive. It is noted that the program for integrating data from multiple stakeholders in a drilling environment that can be presented in an easily understood manner, as discussed below in association with FIGS. 2-3, 4A-4B, 5-13, 14A-14F, 15A-15E, 16A-16F, 17-18, 19A-19H, 20A-20H, 21A-21B, 22A-22B, 23A-23F, 24A-24D, 25A-25F, 26A-26D, 27A-27F, 28A-28D, 29A-29F, 30A-30D, 31A-31D, 32, 33A-33B, 34A-34C, 35A-35D, 36, 37A-37D, 38, 39A-39D and 40, may reside in disk unit 108 or in application 104.

Computer system 100 may further include a communications adapter 109 coupled to bus 102. Communications adapter 109 may interconnect bus 102 with an outside network (not shown) thereby allowing computer system 100 to communicate with other similar devices.

I/O devices may also be connected to computer system 100 via a user interface adapter 110 and a display adapter 111. Keyboard 112, mouse 113 and speaker 114 may all be interconnected to bus 102 through user interface adapter 110. Data may be inputted to computer system 100 through any of these devices. A display monitor 115 may be connected to system bus 102 by display adapter 111. In this manner, a user is capable of inputting to computer system 100 through keyboard 112 or mouse 113 and receiving output from computer system 100 via display 115 or speaker 114.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As discussed herein, the principles of the present invention provide a data and controller architecture intended to address many of the challenges discussed in the Background section. In the architecture, the data is stored as conditional probability distributions or tables. It enables control algorithms to be rapidly developed and implemented on a well by well basis. The ultimate goal is a control algorithm development methodology that results in "driller friendly" control algorithms and can be developed quickly by people without advanced science and engineering background. A description regarding how the architecture and methodology of the present invention can be applied to the automation of a few operations, such as tripping and managed pressure drilling, is provided below.

Prior to discussing the control architecture, a method for utilizing look-up tables representing all models in an automation control architecture to independently handle uncertainties in sensed data is discussed below in connection with FIG. 40.

Figure 40:
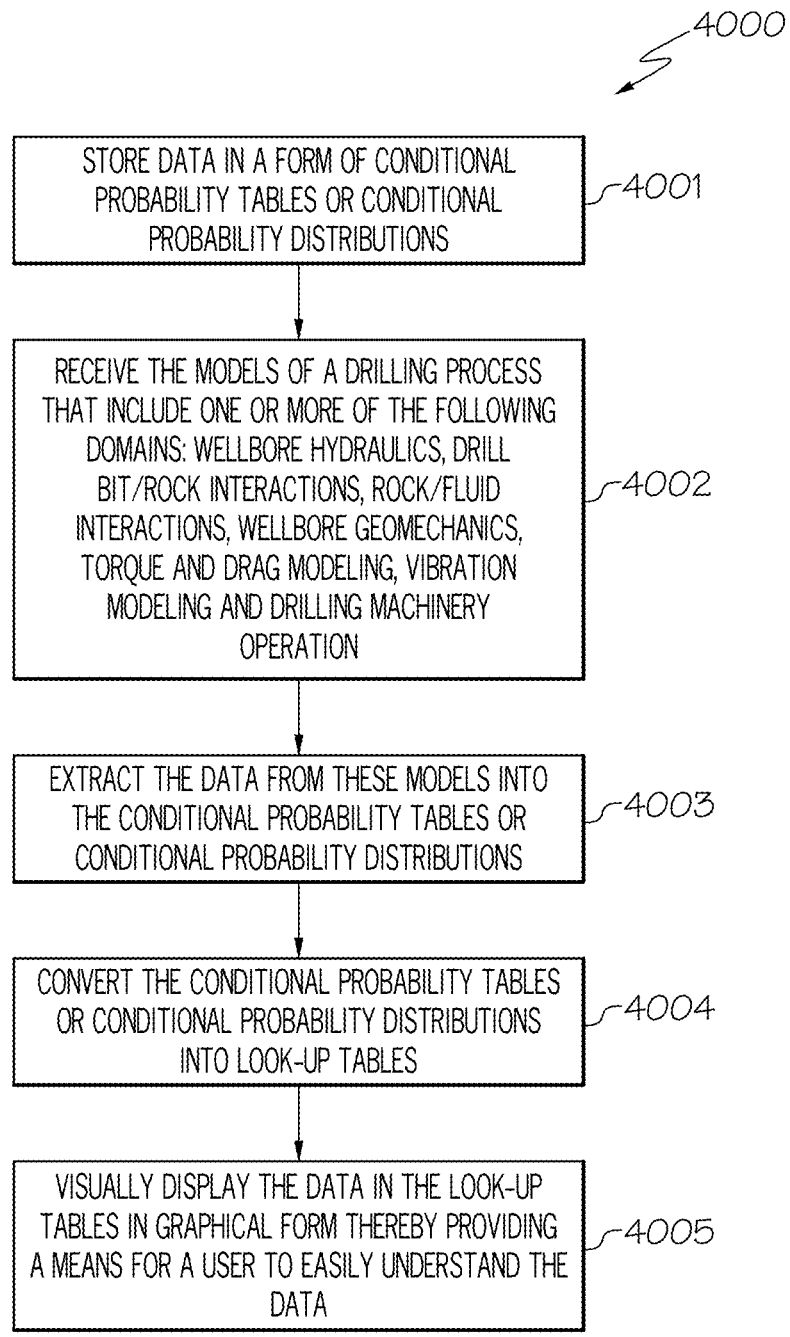
FIG. 40 is a flowchart of a method for utilizing look-up tables representing all models in an automation control architecture to independently handle uncertainties in sensed data in accordance with an embodiment of the present invention.

FIG. 40 is a flowchart of a method 4000 for utilizing look-up tables representing all models in an automation control architecture to independently handle uncertainties in sensed data in accordance with an embodiment of the present invention.

Referring to FIG. 40, in step 4001, computer system 100 stores data in a form of conditional probability tables (matrices or multi-dimensional arrays that represent probabilistic relationships between various drilling parameters) or conditional probability distributions (continuous variants of the conditional probability tables), where the data comes from the following sources: an operator, a service provider, a drilling contractor and an equipment manufacturer. The data from the operator includes information regarding well planning and construction. Furthermore, the data from the service provider includes data from surface sensors and downhole telemetry tools. Additionally, the data from the drilling contractor includes data regarding a working condition of rig equipment. Furthermore, the data from the equipment manufacturer includes data regarding equipment performance characteristics.

In step 4002, computer system 100 receives the models of a drilling process that include one or more of the following domains: wellbore hydraulics, drill bit/rock interactions, rock/fluid interactions, wellbore geomechanics, torque and drag modeling, vibration modeling and drilling machinery operation.

In step 4003, computer system 100 extracts the data from these models into the conditional probability tables or conditional probability distributions.

In step 4004, computer system 100 converts the conditional probability tables or conditional probability distributions into look-up tables.

In step 4005, computer system 100 visually displays the data in the look-up tables in graphical form thereby providing a means for a user to easily understand the data, including a user without an advanced degree or training. In this manner, the present invention is able to independently handle uncertainties in sensed data generated by current rig instrumentation in a user friendly manner.

A more detailed description of the steps of method 4000 is discussed below, starting with a description of the control architecture.

Control Architecture

Figure 2:
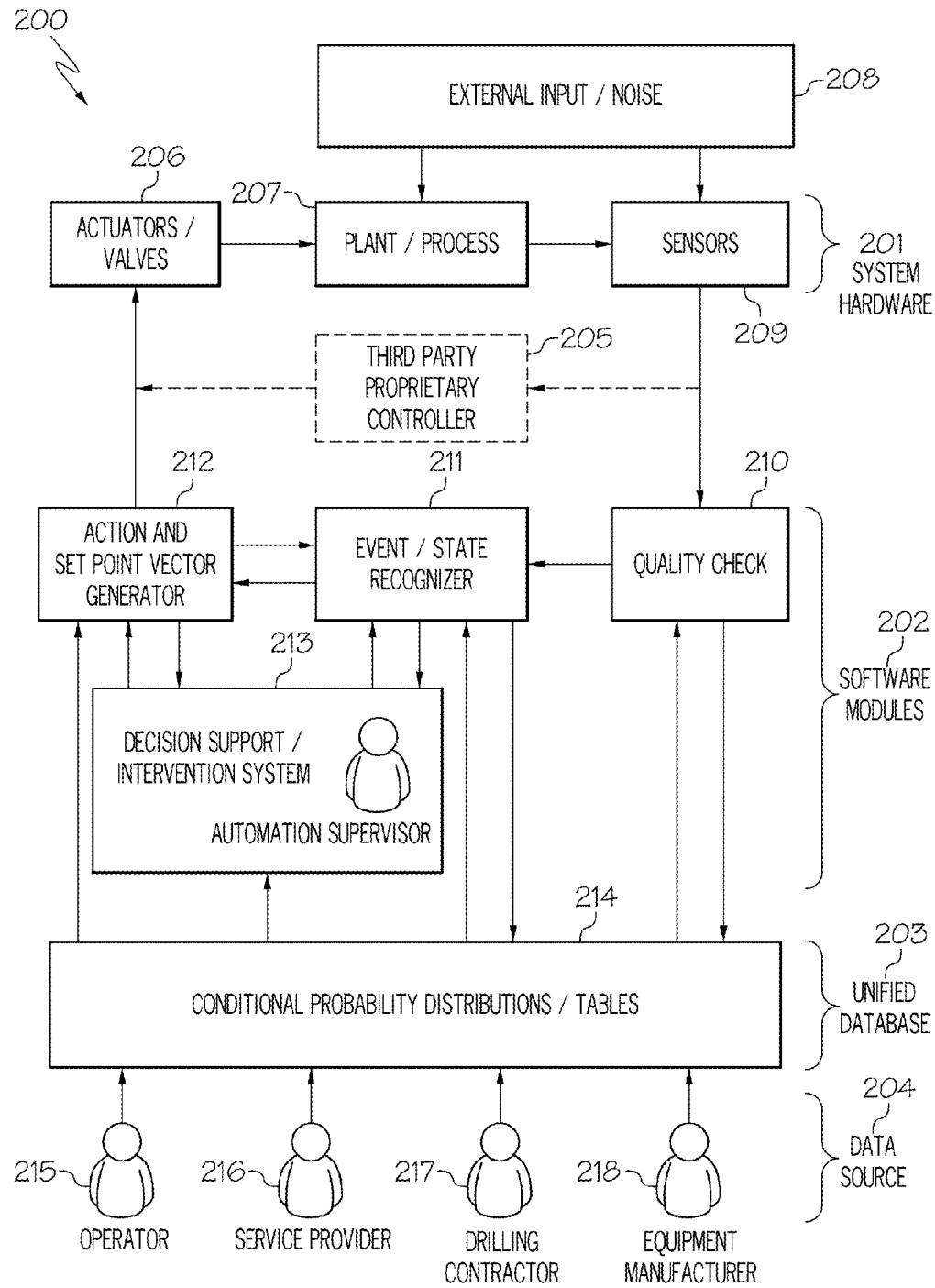
FIG. 2 illustrates the automation control architecture split into four broad categories: system hardware, software modules, unified database and data source in accordance with an embodiment of the present invention.

FIG. 2 illustrates the automation control architecture 200 split into four broad categories: system hardware 201, software modules 202, unified database 203 and data source 204 in accordance with an embodiment of the present invention. An option is provided within architecture 200 for the operator to plug in a third party proprietary controller 205. This would be very desirable option, where such controllers are proven to be reliable both in performance and consistency, and therefore acceptable as a black box unit. In such cases, there needs to be a mechanism for non-conflicting operation of the operators' controller, and third party controller 205.

System Hardware 201

These include the actuators/valves 206, etc., that can be controlled to modify the plants' (drilling rigs') response 207 to external inputs and noise 208. These also include the sensors 209 attached to the plant to measure all the response characteristics that are essential for closed loop control. In some instances, sensors 209 may be offline and manual human input of the sensed data will be required to complete the loop.

Software Modules 202

There are four software modules 202 that may be considered essential to this control architecture 200. They are:

1. Quality Check 210. Due to the harsh environment on a drilling rig, sensors 209 generally have a high failure rate. Therefore, a module should exist within this architecture 200 to ensure that the data can be trusted for the purposes of automatic control. No data validation module can deterministically predict sensor failure at all times, and a probabilistic framework is therefore desired. Control algorithms have to be designed to account for sensor failure in a probabilistic sense. This quality check module 210 can be a black box as far as the driller is concerned since the outputs coming from this module 210 can be easily checked with actual sensor conditions for module troubleshooting purposes.

2. Event/State Recognizer 211. Once the data has been checked for quality, one needs to apply algorithms to detect the current drilling operation state or event automatically. Various techniques are available to do this. Here also, as in the quality check module 210, a probabilistic estimate is desired since no algorithm can detect events to 100% accuracy. Control actions need to be tied to probabilistic estimates of events or states. This module 211 can also be a black box as far the driller is concerned since the output from this module 211 can be easily validated, and software module 211 held accountable for errors.

Figure 3:
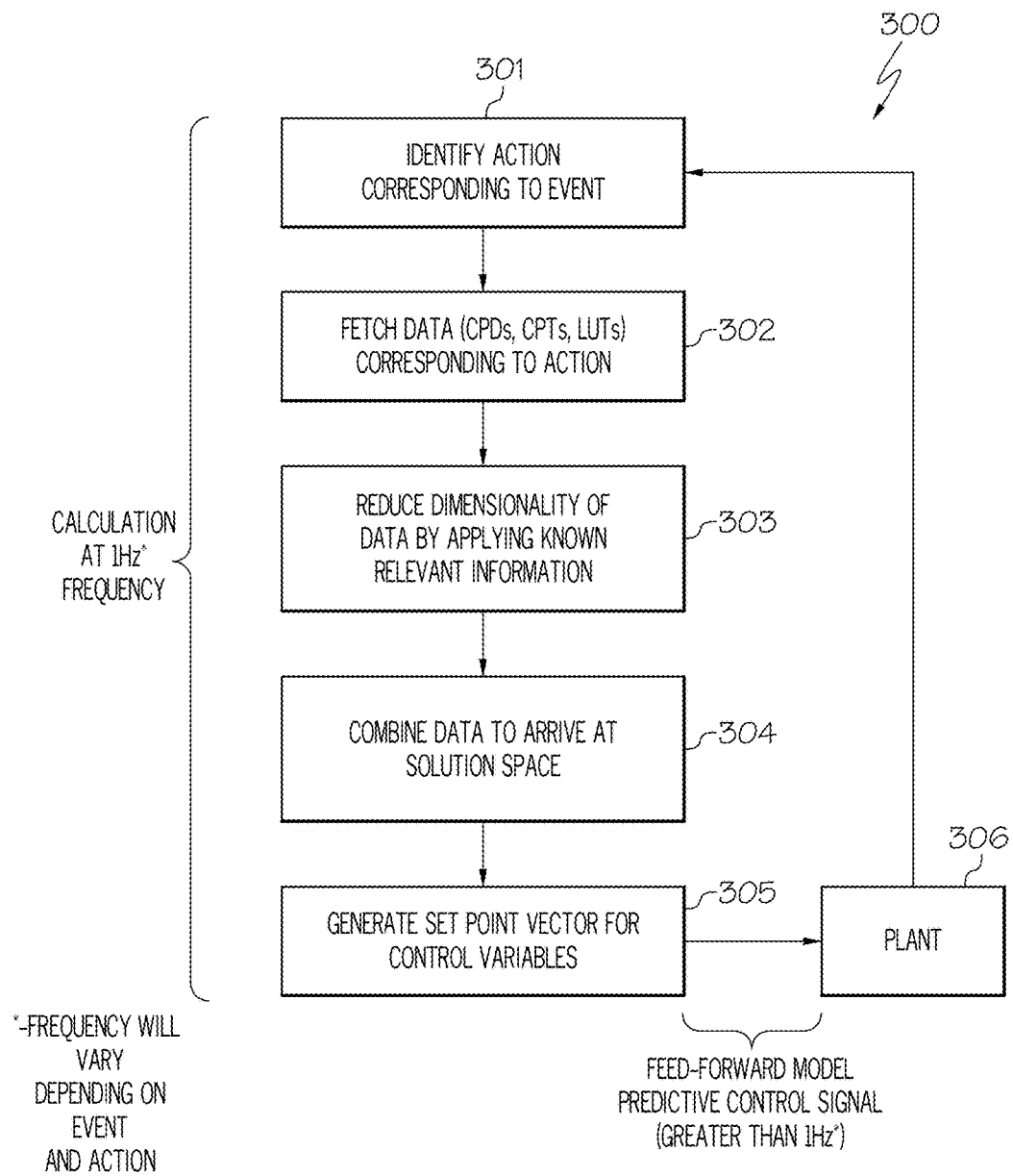
FIG. 3 is a high level flowchart of a method detailing the steps for generation of a set point vector in accordance with an embodiment of the present invention.

3. Action and Set Point Vector Generator 212. This is the module 212 that takes all the real-time data gathered from sensors 209, the model data (discussed below) from database 203, information from event/state recognizer 211, and all other relevant known information to arrive at the set point vector for the control variables. The set point vector is generated through a combination of both feedback and feed forward control. FIG. 3 is a high level flowchart of a method 300 detailing the steps for generation of a set point vector in accordance with an embodiment of the present invention.

Referring to FIG. 3, in step 301, an action is identified corresponding to an event occurring in the plant.

In step 302, data (Conditional Probability Tables (CPTs), Conditional Probability Distributions (CPDs), and Look-Up Tables (LUTs), which are discussed further below) are fetched corresponding to the action.

In step 303, the dimensionality of the data is reduced by applying known relevant information.

In step 304, the data is combined to arrive at a solution space.

In step 305, the set point vector is generated for control variables, which is sent to the plant in step 306.

Method 300 may then be repeated as illustrated in FIG. 3 at a rate of 1 Hz frequency. The principles of the present invention are not to be limited in scope to any particular rate of frequency and the rate of 1 Hz frequency is used for illustration purposes.

Returning to FIG. 2, this architecture allows for control at different time scales. While the set point vector itself is calculated generally once every second (or at another predetermined frequency), the control signals may be sent to actuators 206 at a higher frequency. For example, a set point vector for a certain variable, with a length 'n' essentially implies 'n' separate set point value changes to the controlled variable within the one second.

Also, in arriving at the set point vector, a finite response horizon (greater than the one second feedback loop) may be taken into consideration for robust control. One primary objective with the approach suggested herein is to enable the development of control laws that are intuitive, does not involve direct use of differential equations and can be generally understood by the driller. This has two implications. First, the control laws may be heuristical in nature and therefore there will be many different control solutions. Second, these control laws may not be optimal, although they may be close to optimal. The control laws will, however, be transparent, allow automated operation, and will be more efficient and safer than manual drilling (which involves manual interpretation of the data followed by manual setting of the control set points).

The control laws should also account for the fact that there could be errors in event/state recognizer 211 and quality check module 210. The control laws should ideally be developed during the well planning phase. Further, effort should be expended on educating the drilling crew so they understand how the set point vectors are generated.

Decision Support/Intervention System 213. Currently, automation solutions tend to drastically increase the workload on a drilling crew when something does not work as expected. This is generally due to the black box nature of present-day automatic control implementations. Even when the drilling crew is aware of the logic underlying the generation of control signals, a decision support module 213 would be valuable in enabling the drillers to visualize what is happening and consequently increasing their confidence in the system. Further, module 213 should allow the driller to intervene when necessary, and take manual control of the rig if the situation demands it. This module 213 would be the primary interface into the automated system for the "Automation Supervisor" (FIG. 2). Such a module should incorporate human factor engineering in the design of the visual display unit and prevent data/alarm overload.

Unified Database 203

This is a central database that is a repository for all the models, all information about the rig equipment, and the data collected from the sensors. The architecture suggested herein has all the data to be stored in the form of Conditional Probability Tables (CPTs) or Conditional Probability Distributions (CPDs) 214. Statistically, a CPT is a table or a matrix probabilistically relating one output random variable to one or more random variables. CPDs are the continuous variants of CPTs, and both are used interchangeably herein.

Data Source 204

The data that is stored in the database generally comes from one of the following sources.

1. Operator 215. Operator 215 generally has information with regards to the well, its geology, trajectory, casing program, etc. They are also the primary owners of the well drilling plan and therefore have access to the models used to predict well behavior.

2. Service Provider 216. Data from surface sensors, MWD tools and other specialized sensors and services may be provided by the service provider in a WITSML or other industry standard format, and used to update the stored CPD/CPT models. The real time data may also be stored in a tabular format.

3. Drilling Contractor 217. Data with regards to working condition of rig equipment as well as surface sensors is required information for the control system, and this data is usually available from the drilling contractor, and the maintenance crew.

4. Equipment Manufacturer 218. Data with regards to equipment performance characteristics may be obtained directly from the equipment manufacturers in a tabular format.

Figure 4A:
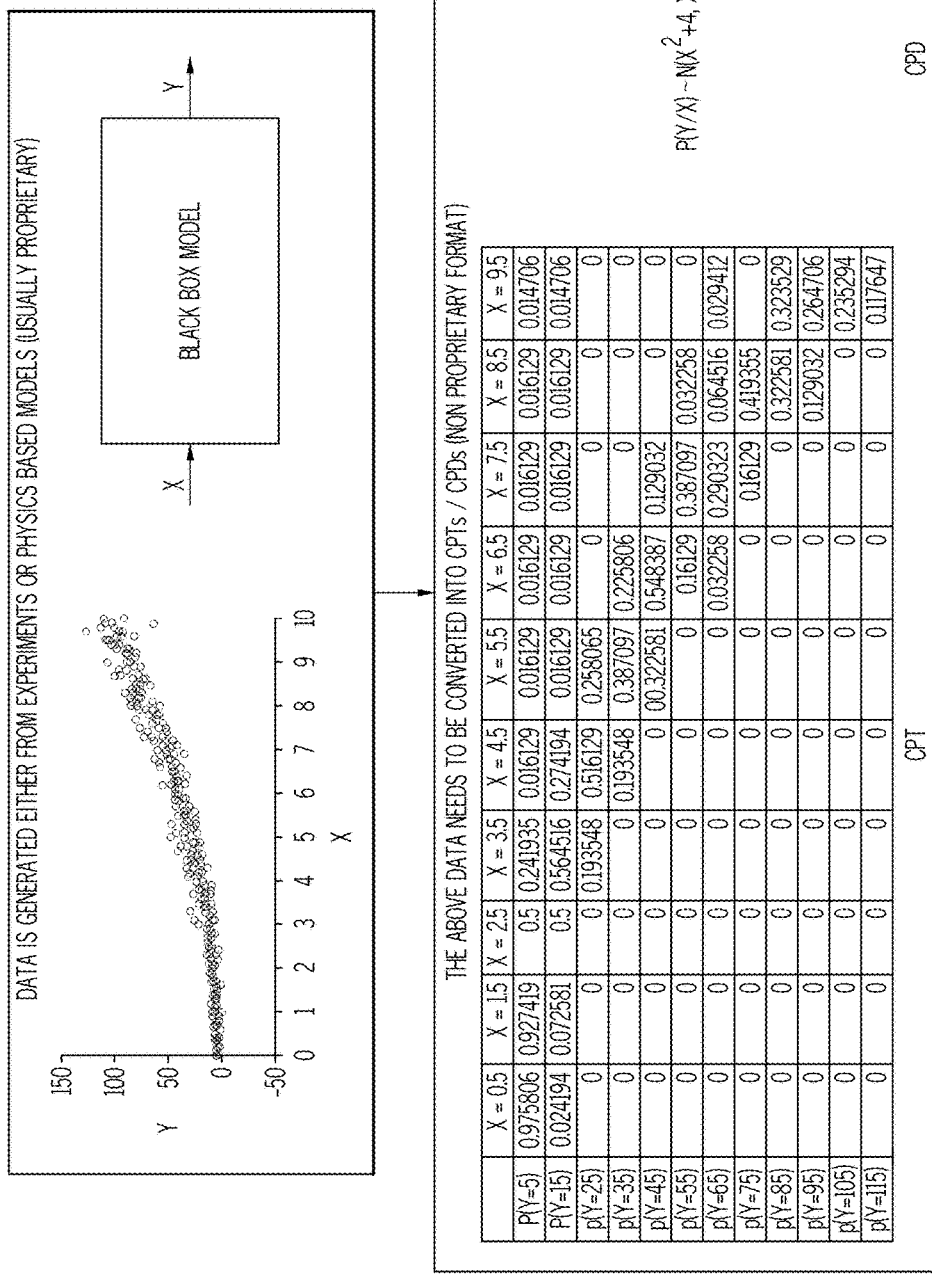
FIGS. 4A and 4B illustrate the different stages of data collection, storage and usage in accordance with an embodiment of the present invention.
Figure 4B:
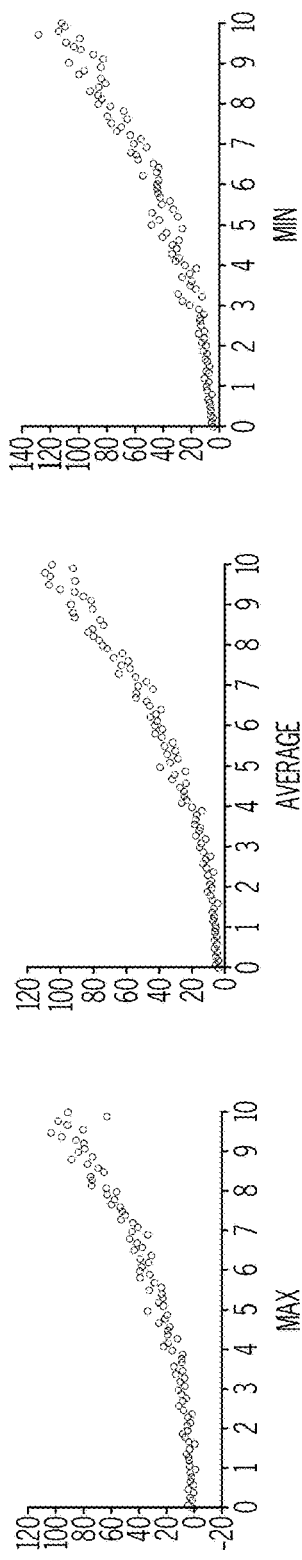

Conditional Probability Tables/Distributions for Model Representation and Data Storage One of the important features of architecture 200 is a model representation and data storage mechanism, namely the Conditional Probability Table (CPT) or the Conditional Probability Distribution (CPD). CPTs are matrixes that represent probabilistic relationship between various drilling parameters. By requiring all parties involved in a drilling operation to adhere to this format, one can achieve efficient data aggregation eliminating the complications involved in linking complex mathematical models from different sources. The model CPTs may be generated through the offline solving of algebraic or differential equations derived from first principles through experimentation or even data from offset wells. These CPTs can be updated in real time as new sensor data is obtained and can be visually presented in a manner that is intuitive and readily understandable by the drill crew. If a concerted effort is made to represent all information in a format that enables rapid visualization, there exists the possibility for creating quicker, driller-friendly control algorithms. Visual data in the form of Look-Up Tables (LUTs) have been used in control algorithms and in the decision making process for some time now. An overview of a suggested data structure in which LUTs may be considered to be specific instances of CPTs or CPDs is shown in FIGS. 4A-4B. FIGS. 4A-4B illustrate the different stages of data collection, storage and usage in accordance with an embodiment of the present invention.

The following discussion will describe some key features of the suggested data architecture as well as describe how they tie into control architecture 200 (FIG. 2).

Incorporating Uncertainty Handling Mechanism

Decisions we make are always based on probabilistic information (though we may not be conscious of the process we follow). Similarly, very little about drilling is deterministic. So control algorithms should be written to take uncertainty into account. This in turn requires one to account for the uncertainty in the models, the uncertainty in the empirical data, the uncertainty in the operational capacities of the rig equipment, etc. The CPDs/CPTs are therefore an ideal construct for data storage from which to build the different software modules 202 (quality check 210, event recognizer 211, etc.). The various parts of the controller software have access to information with regards to system uncertainty.

Storing Conditional Probability Tables

Storing information and data in CPTs can require large data storage capacities, depending on the granularity/accuracy of the desired model representation. Recent advances in high-volume data storage and retrieval technology has made it possible to now store and retrieve huge multi-dimensional data sets with ease. Data storage is also continuing to be cheaper by the day. CPDs are more efficient than CPTs when it comes to representing models, require very few parameters to be stored, and are preferred when the model is generally monotonic in nature. Additional techniques, such as the use of a graphical model (Bayesian network or undirected graphical models), can offer efficient means of storing data by exploiting conditional independence relations.

Separating Modeling from Control Algorithm Design

Drilling is a multi-disciplinary operation. Efficient and safe drilling requires good models from diverse domains, such as fluid hydraulics, drill bit/rock interactions, torque and drag modeling, vibration modeling, drilling machinery operation, etc. Building good models require significant expertise in the individual domains. One of the goals of this architecture is to enable a separation of modeling expertise from control algorithm design. In this architecture, the domain expert team provides models in a CPT/CPD format to the control algorithm designers. The control algorithm designer bases controller design on CPT/CPD data that can be easily reviewed visually for correctness.

Visualization of Data Used to Develop Control Law

Figure 5:
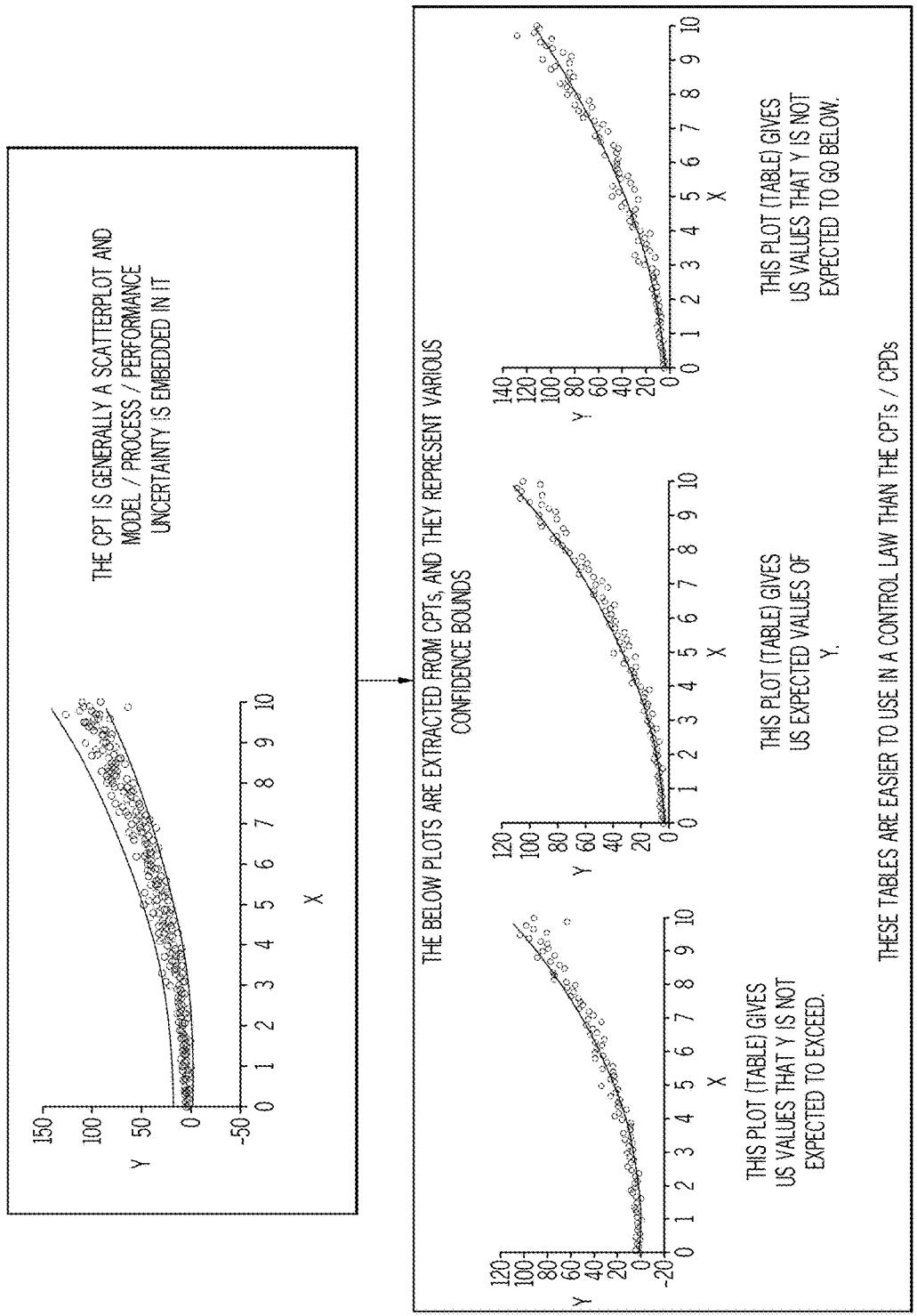
FIG. 5 illustrates the appropriate LUTs being extracted from CPDs/CPTs for the development of the control laws in accordance with an embodiment of the present invention.

As previously noted, the control law designer does not have to be an expert in all the domains relevant to drilling. However, he/she should have a mechanism to check the data received from the different parties to ensure there are no gross errors. Here it is often beneficial to convert CPTs/CPDs into Lookup-Tables (LUT) and plotting them as 2D/3D plots. One of the advantages of using CPDS/CPTs to store data is that they allow representations of uncertain information. From these, one may extract one or multiple LUTs (used interchangeable with plots) relating the parameters of interest for a given confidence requirement. FIG. 5 illustrates the appropriate LUTs being extracted from CPDs/CPTs for the development of the control laws in accordance with an embodiment of the present invention.

Referring to FIG. 5, the top plot (a) in FIG. 5 shows what a CPT looks like when plotted. There are multiple values of Y for each X, and there is an upper and lower bound on Y for each value of X. This plot represents the process relating Y and X and the uncertainties associated with the process. The three plots (b), (c) and (d) of FIG. 5 are extracted from (a). Plot (b) represents the upper bound limit of Y given an X (i.e., the probability that Y will be above the value shown in this plot is probabilistically very low). Plot (c) represents the expected value of Y given X and plot (d) represents the lower limit. These plots allow the control algorithm designer to better understand how the process is expected to behave and the limits and uncertainties. It thereby enables a quick validation of the model, placing the control law designer in a position to choose an upper or lower bound depending on the overall goal.

Representing System Dynamics Using CPDs/CPTs/LUTs

System dynamics in the form of ordinary or partial differential equations are very difficult to integrate into an already existing control algorithm. Also, unlike the visual plots discussed above, these equations provide little intuitive meaning to the control algorithm designers, especially if they are themselves not experts in the domain. Converting these equations into CPTs can help capture the important information that a controller designer would need to build the controller. Techniques exist for representing dynamics in easily interpretable CPT/LUT formats.

Figure 6:
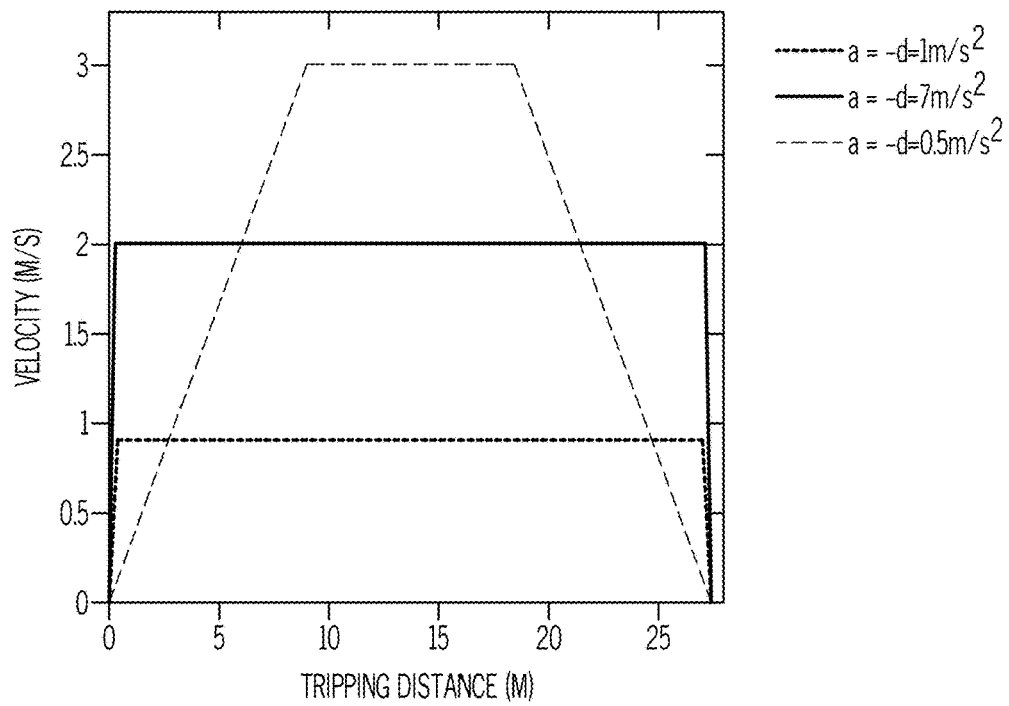
FIG. 6 illustrates three possible trajectories during a drillstring or casing tripping operation in accordance with an embodiment of the present invention.
Figure 7:
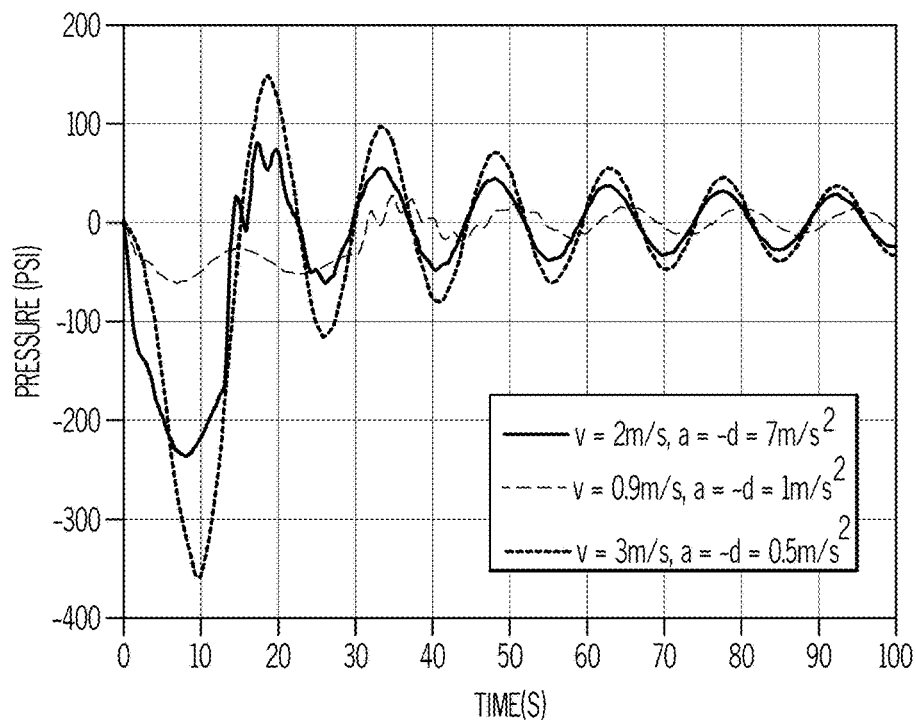
FIG. 7 illustrates the bottom-hole pressure variation for trajectories in FIG. 6 in accordance with an embodiment of the present invention.

As an example of how one might convert a partial differential equation representation of system dynamics to a CPT/LUT representation, consider the operation of a drill-string tripping out of a borehole as illustrated in FIG. 6, which illustrates three possible trajectories during a drill-string or casing tripping operation in accordance with an embodiment of the present invention. As the pipe is pulled out, pressure transients are generated in the annulus, and not accounting for the associated dynamics can lead to a kick or a lost circulation scenario. A physics-based model can be built to understand these transients and this involves taking into account the principles of continuity, conservation of momentum, etc. This, in turn, translates to a set of partial differential equations and the solution is often numerically obtained. FIG. 7 illustrates the bottom-hole pressure variation for trajectories in FIG. 6 in accordance with an embodiment of the present invention. FIG. 7 is illustrative of the bottom-hole pressure variations as the bit is tripped out, at first accelerating to a certain speed, then maintaining that speed and finally decelerating to a full stop. Accurate calculations of such transients are very difficult in real time.

However, it is quite possible that such models can be solved offline for various input conditions and pertinent information can be extracted from these simulations and condensed into CPTs/LUTs. For example, in the tripping-out operation, it is important that the maximum and minimum bottom-hole pressures that result during the transients not exceed the fracture pressure and pore pressure, respectively.

Figure 8:
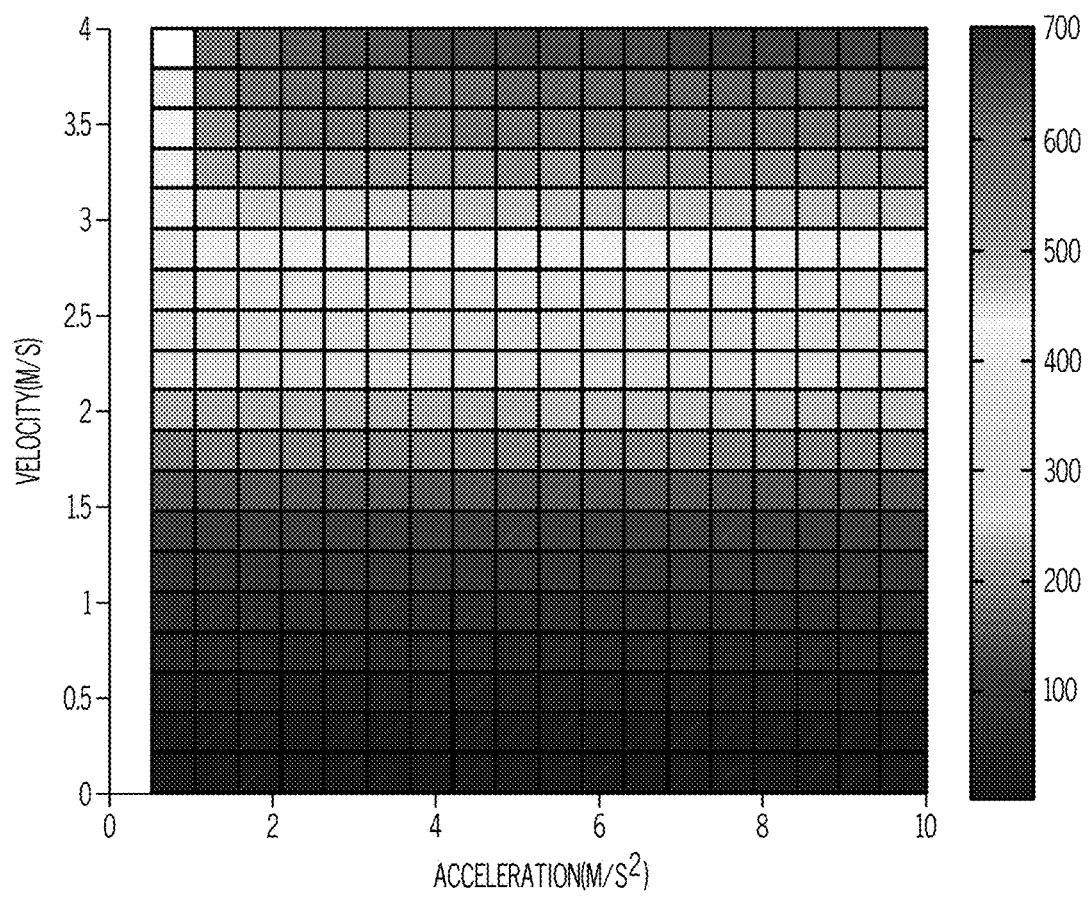
FIG. 8 illustrates the pressure change versus velocity and acceleration in accordance with an embodiment of the present invention.

Simulations such as the ones shown in FIG. 7 may be repeated for various velocities and accelerations such as the ones in FIG. 6. The trends may then be recorded and summarized into a CPT/LUT. FIG. 8 is an example of one such exercise. FIG. 8 illustrates the pressure change versus velocity and acceleration in accordance with an embodiment of the present invention. Here, the maximum transient swabbing pressure is shown for different tripping velocities for a certain constant acceleration. This chart is intuitive, easy to interpret and ultimately useful in the design of the control algorithm. The control algorithm designer does not have to deal with complex partial differential equations and their solution methodologies.

Figure 9:
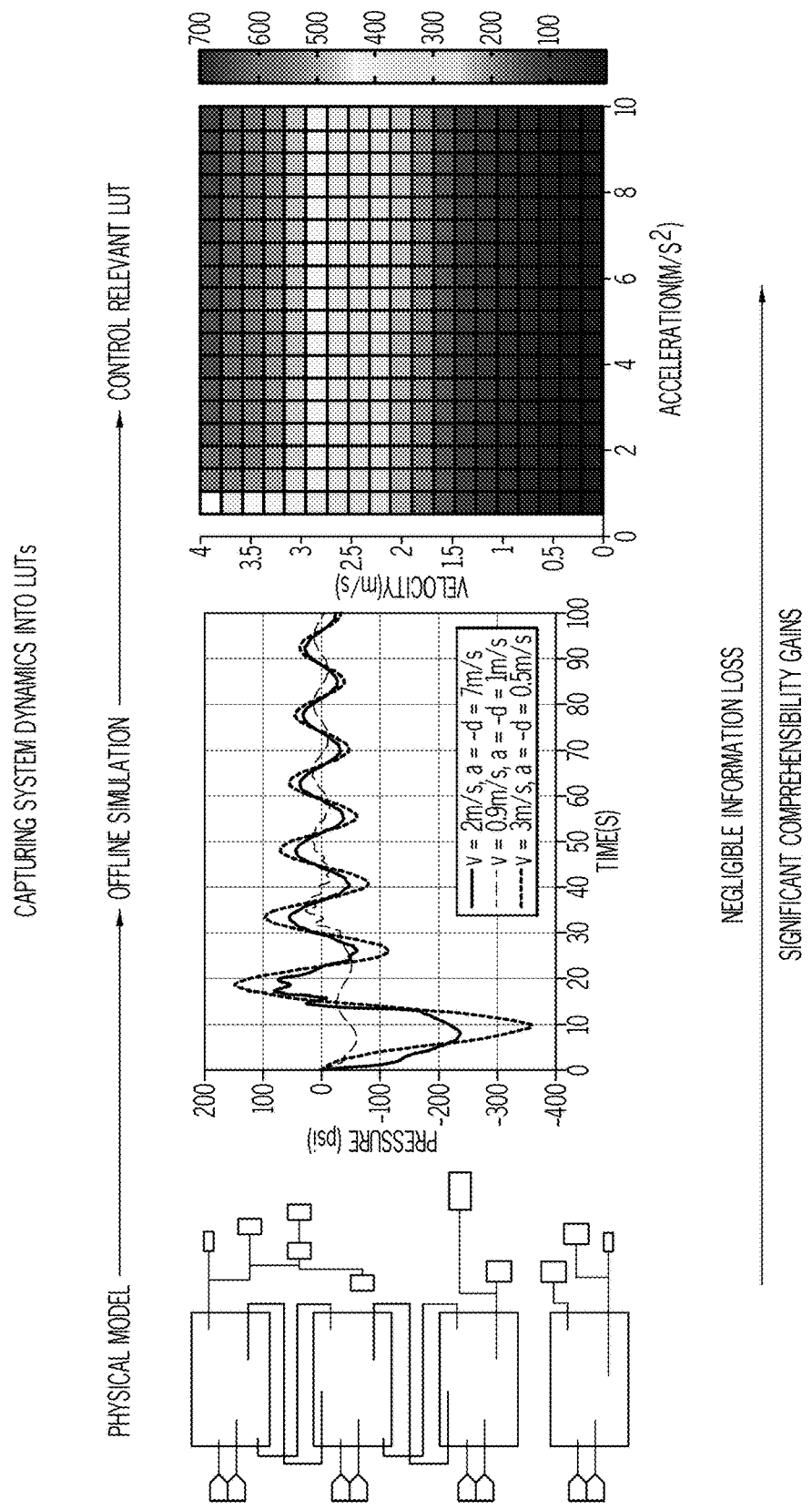
FIG. 9 illustrates the transition from differential equations representing fluid dynamics to look-up tables representing the fluid dynamics in accordance with an embodiment of the present invention.

This whole process is summarized in FIG. 9. FIG. 9 illustrates the transition from differential equations representing fluid dynamics to look-up tables representing the fluid dynamics in accordance with an embodiment of the present invention. Comprehension of the system dynamics is greatly increased as one moves from left to right in FIG. 9. Note that, in this process, no pertinent information is lost. Depending on how confident the domain expert feels about the model, he/she may assign an upper and lower bound for such plots using CPTs.

Figure 10:
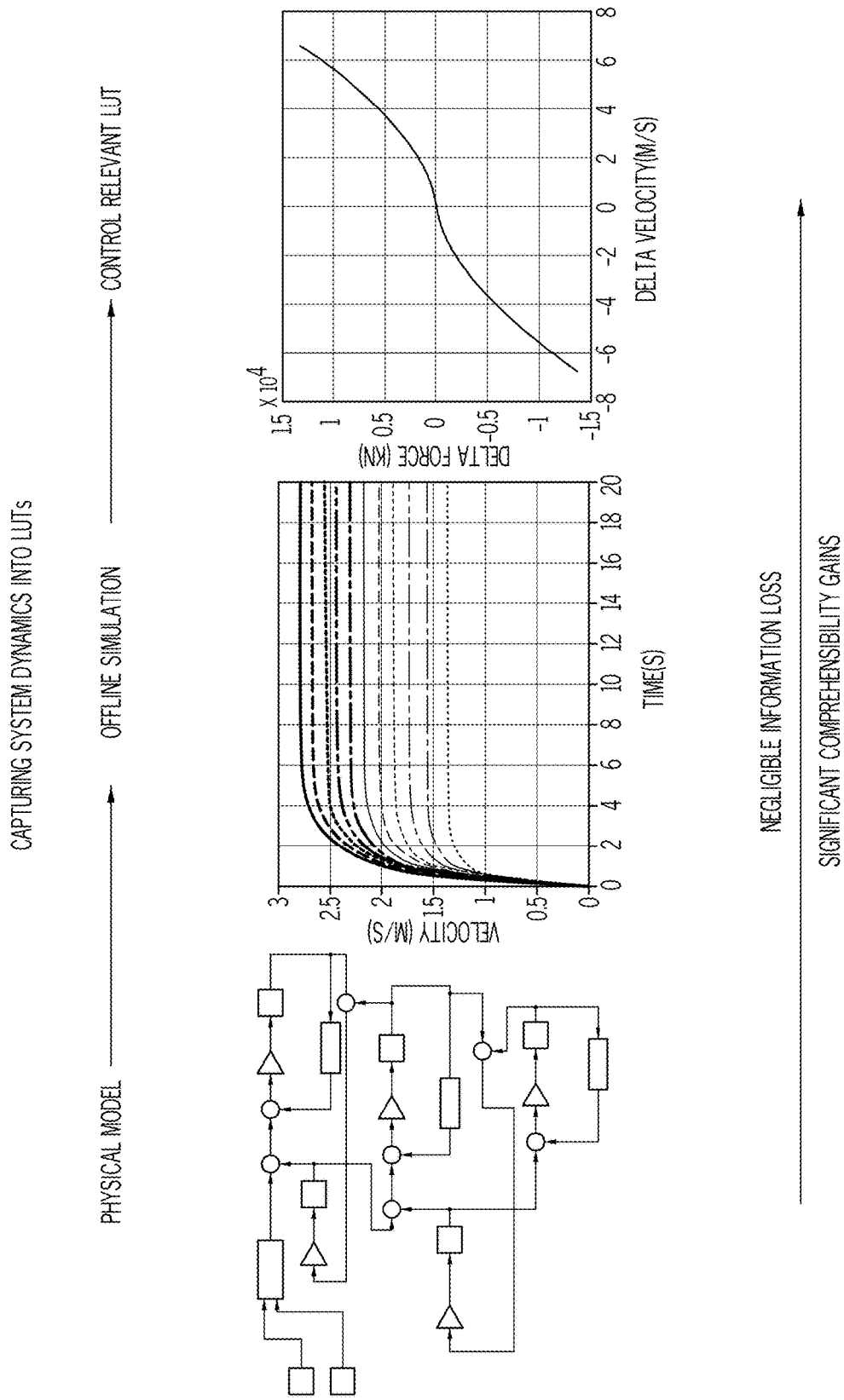
FIG. 10 illustrates the transition from differential equations representing fluid dynamics to look-up tables representing the dynamics in accordance with an embodiment of the present invention.

A similar approach can be taken to represent the mechanical dynamics of the drillstring in a LUT. As shown in FIG. 10, a mechanical model of the drillstring can be simulated for various input forces and the obtained steady state velocities can be stored in a LUT for real-time use. FIG. 10 illustrates the transition from differential equations representing fluid dynamics to look-up tables representing the dynamics in accordance with an embodiment of the present invention.

CPT/LUT Combination Math

Often the tables that would be most relevant for a particular control algorithm may not be readily available. This would necessitate the combinations of various LUTs to arrive at the desired table. Various techniques to do this are already available in literature. Furthermore, it is noted that the look-up table math is in general no more difficult than high school level math, and as a result, this simplicity is considered an asset for building driller-friendly control systems.

Modularity and Re-Usability

CPDs/CPTs/LUTs are self-contained units of information. New tables can be added to the database or deleted easily based on availability and relevance. Also, when vendors or service providers change, the operator may request data in the same tabular format as before, and this could potentially mean no change whatsoever to the control algorithm. Also, this allows for the operator to continue to build the model database and add new automation algorithms over a period of time. As discussed below, a controller architecture, such as control architecture 200 of FIG. 2, based on LUTs will allow rapid development of control algorithms.

Drilling Scenario

The scenario utilized below covers operations on an example well. The operations will entail the drilling of a 12¼" vertical intermediate hole using a six-blade PDC bit with 6×14" nozzles. 13.375" surface casing is set at 1,000 feet and the target depth of the intermediate section is 4,700 feet. The bottom-hole assembly is detailed in Table 1 of FIG. 11 and is used throughout for hydraulics and dynamics calculations. Table 1 is a table of the bottom-hole assembly specification in accordance with an embodiment of the present invention.

The drilled formation lithology is primarily shale behind the surface casing followed by a section of interbedded shale and sandstone. At 1,800 feet, mudstones appear and become the dominant lithology for the remainder of the section, as is seen in FIG. 12. FIG. 12 illustrates the formation lithology expected in the intermediate hole section in accordance with an embodiment of the present invention. A 9 ppg mud is used during the simulated Managed Pressure Drilling (MPD) operation and 10 ppg mud is used during the tripping operation.

Application to Managed Pressure Drilling

A potential use for the control methodology presented in the previous sections is for MPD. The goal of back-pressure MPD is to maintain a constant bottom hole fluid pressure so as to avoid influxes of formation fluids, gas or combinations thereof, wellbore instability or lost circulation events while drilling formations with narrow pressure windows. This is accomplished with additional equipment, such as a rotating control device (RCD) mounted at the wellhead, a drillstring float valve, a dedicated choke manifold and a rig pump diverter or optional back-pressure pump. In its most basic form, the operator has to manually adjust the choke opening, allowing pressure to be trapped or released from the top side of the annulus. This requires considerable fine tuning and swift reaction time to deal with pressure transients such as the ones caused by swab and surge effects, or by ramping the rig pumps up and down during connections. Several commercial control systems have been developed to automate this process, but they suffer from bandwidth limitations and lack of robustness as they are typically tuned for a particular operating point, requiring recalibration once the wellbore environment changes significantly. This process relies upon precise measurement of surface and downhole pressures, flow rates in and out of the well and density of the drilling mud. Moreover, a dynamic hydraulics model has to compute the required pressure set points in real-time, which may require trading off the model complexity with run-time capabilities. More importantly, these controllers require considerable domain expertise to understand. Using the principles outlined above, a LUT-based controller can be designed for the MPD case without the need for advanced hydraulics knowledge.

FIG. 13 illustrates the data integration to arrive at look-up tables needed to design the control algorithm in accordance with an embodiment of the present invention. Referring to FIG. 13, control parameters 1301, task relevant known information 1302, and the set of look up tables 1303 required for automating this task are combined and integrated to arrive at the LUTs 1304 needed to design the control algorithm.

Control Variables 1301.

The variables that can be controlled in a MPD operation are the main rig pump rate, choke opening and back pressure pump rate, on the pressure management side, in addition to Weight on Bit (WOB) and top drive RPM/torque. The methodology presented herein will assume only the main pump and choke are available for control and will additionally use WOB and surface RPM. For the choke control, a set-point backpressure value is specified, which translates to an actuation of the choke opening. This will allow easier adaptation of the control laws to MPD systems having various choke orifice sizes.

Known Information 1302.

The automation system would require real-time and offline information to safely perform a tripping operation. Known information 1302 reduces dimensionality of the LUTs that are needed for the task. For this scenario, the variables below are assumed to be known information:

Real-time depth position of the drillstring
BHA/drillstring configuration details
Wellbore geometry
Depth of last casing shoe
Mud properties
Choke geometry
Mud pump, RCD and top drive specifications
Lithology Set of Required Look-Up Tables 1303

Below is a list of base look-up tables (BLUT) required for an automated MPD operation. Note that some of these are shared with the database for the tripping operation.

Figure 14A:
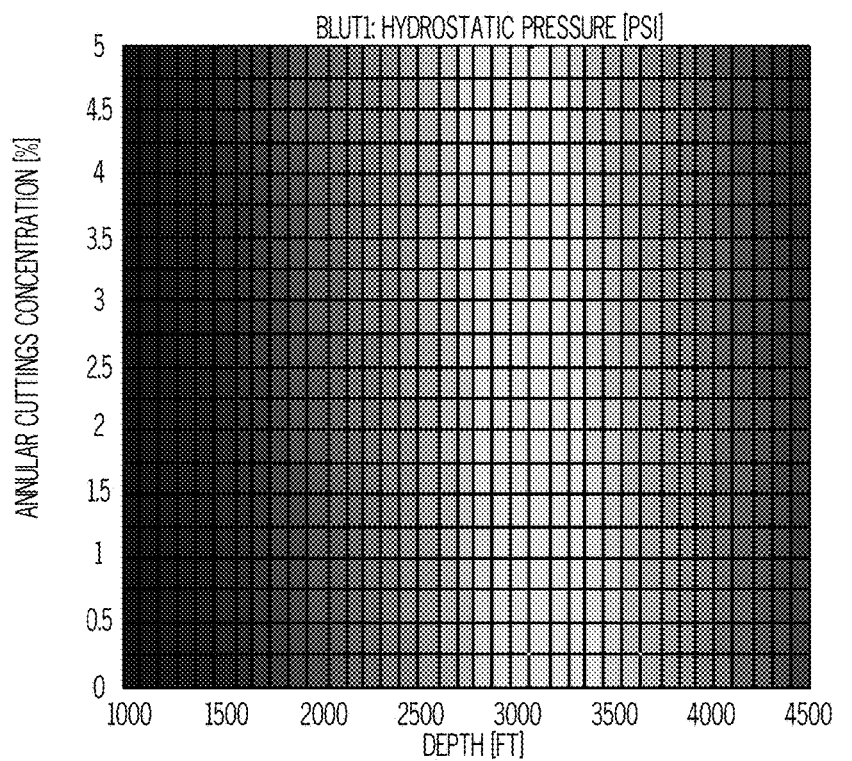
FIGS. 14A-14F illustrate the base look-up tables 1 through 6 in accordance with an embodiment of the present invention.

BLUT 1: Hydrostatic pressure vs. mud weight, depth, annular cuttings concentration and cuttings density. The hydrostatic pressure increases linearly with true vertical depth, mud weight and annular cuttings loading. A plot of hydrostatic pressure varying with well depth and cuttings concentration is shown in FIG. 14A. FIGS. 14A-14F illustrate the base look-up tables 1 through 6 in accordance with an embodiment of the present invention.

Figure 14B:
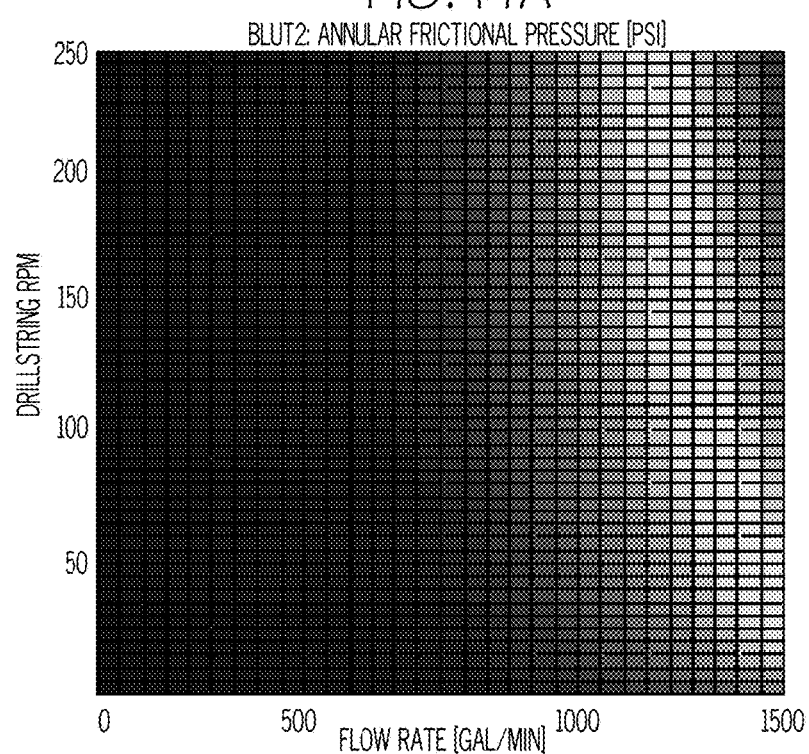
Figure 14C:
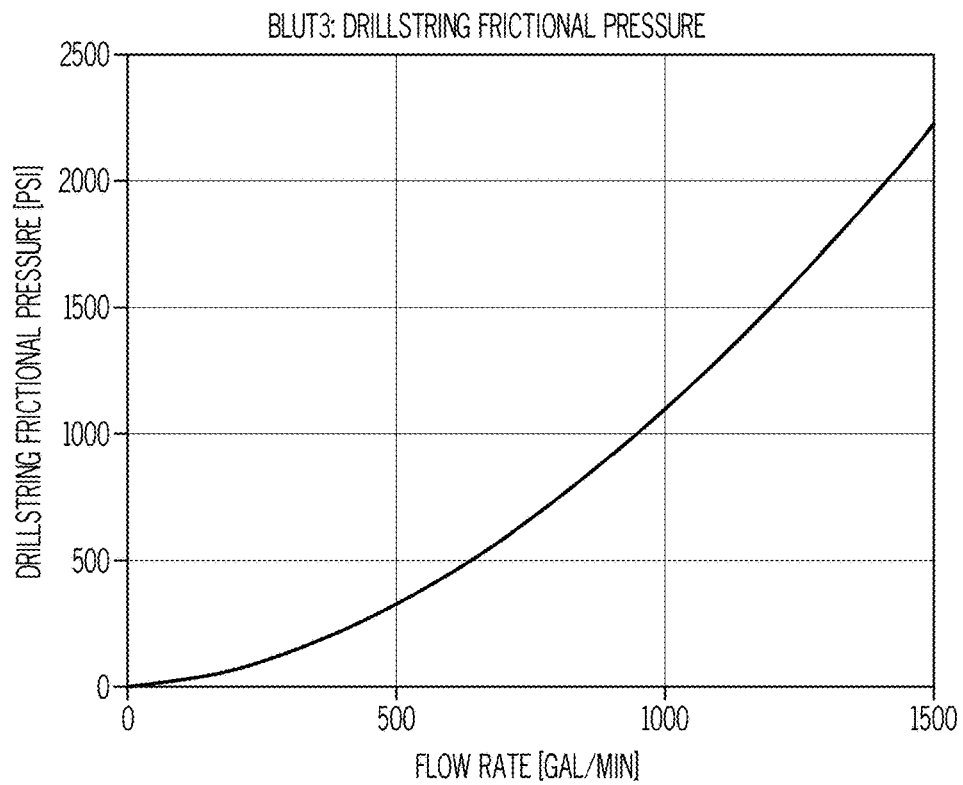
Figure 14D:
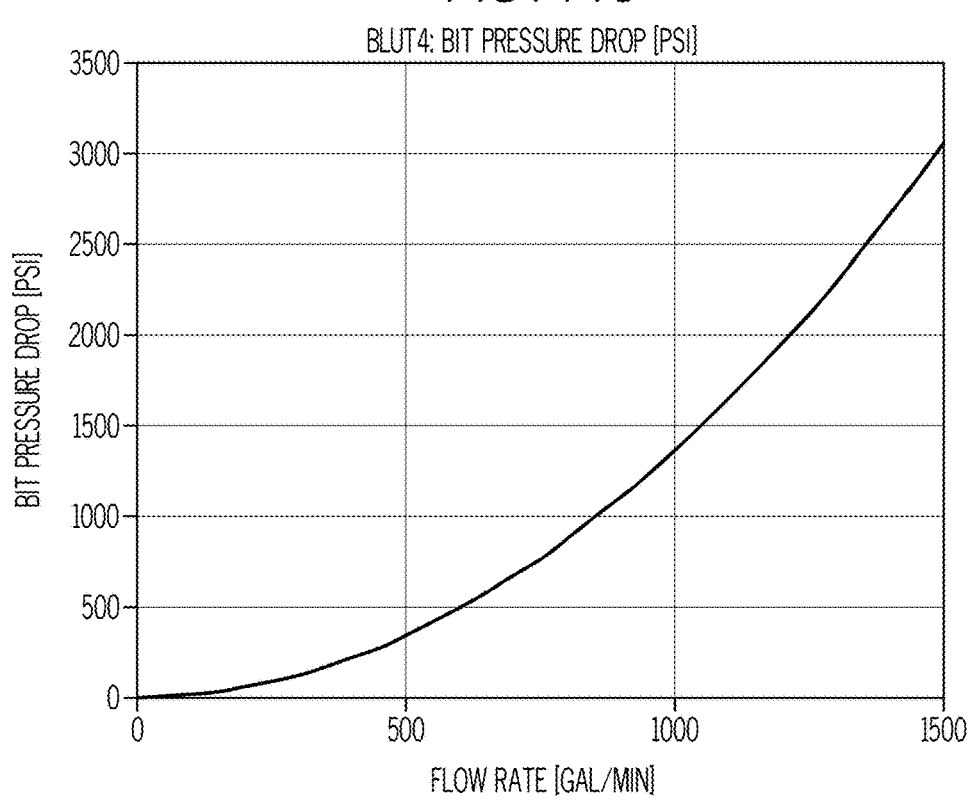

BLUT 2: Annular frictional pressure vs. flow rate, mud weight, depth, drillstring RPM, mud plastic viscosity, mud yield point, hole diameter, pipe outer diameter, annular cuttings concentration and cuttings density. To calculate frictional pressure drop, one needs to first determine whether the flow is laminar or turbulent, and then apply the appropriate friction factor correlations for the mud rheology. Since the annulus is made up of sections with different internal and outer diameters (drill pipe vs. casing, drill pipe vs. open hole, drill collar vs. open hole, etc.), the frictional pressure drop is calculated separately for each section and the final result is a summation of all the individual sections. The effect of drillstring rotation is also applied. A plot of annular pressure loss vs. flow rate and RPM is shown in FIG. 14B.

BLUT 3: Drillstring frictional pressure vs. flow rate, mud weight, depth, mud plastic viscosity, mud yield point and pipe inner diameter. This table is constructed similarly to BLUT 2, however, the effect of drillstring rotation is not considered here. Drillstring pressure loss is plotted against flow rate in FIG. 14C.

BLUT 4: Bit pressure drop vs. flow rate, mud weight, nozzle size and discharge coefficient. The bit pressure drop is important in evaluating the hydraulic horsepower generated at the bit. A plot of bit pressure drop versus flow rate is displayed in FIG. 14D.

Figure 14E:
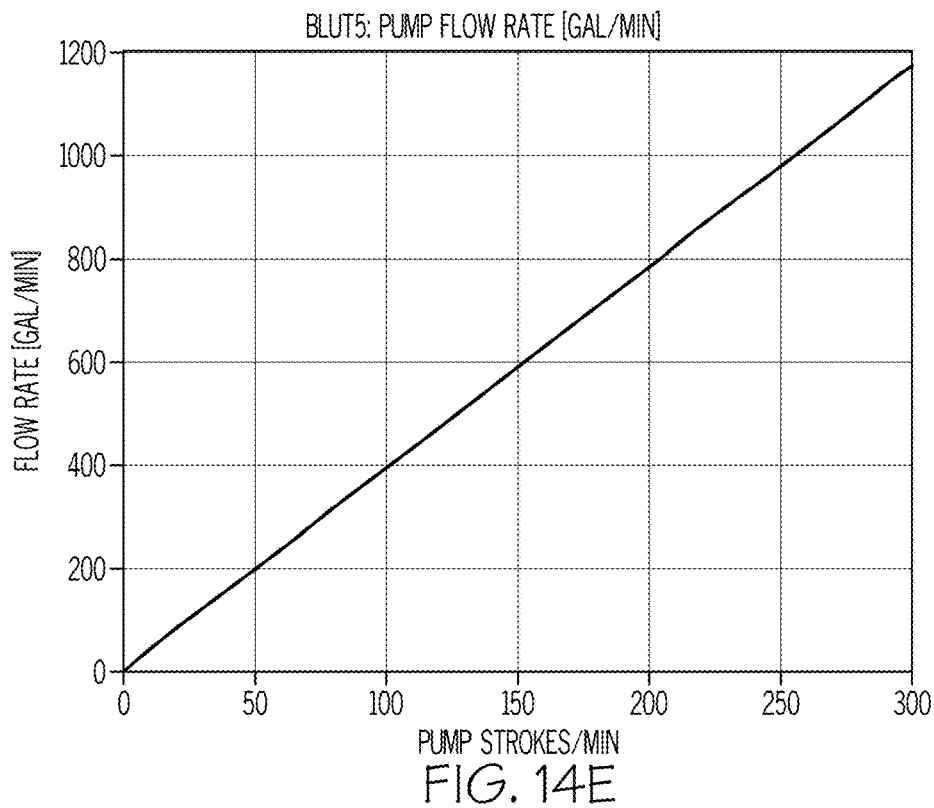
Figure 14F:
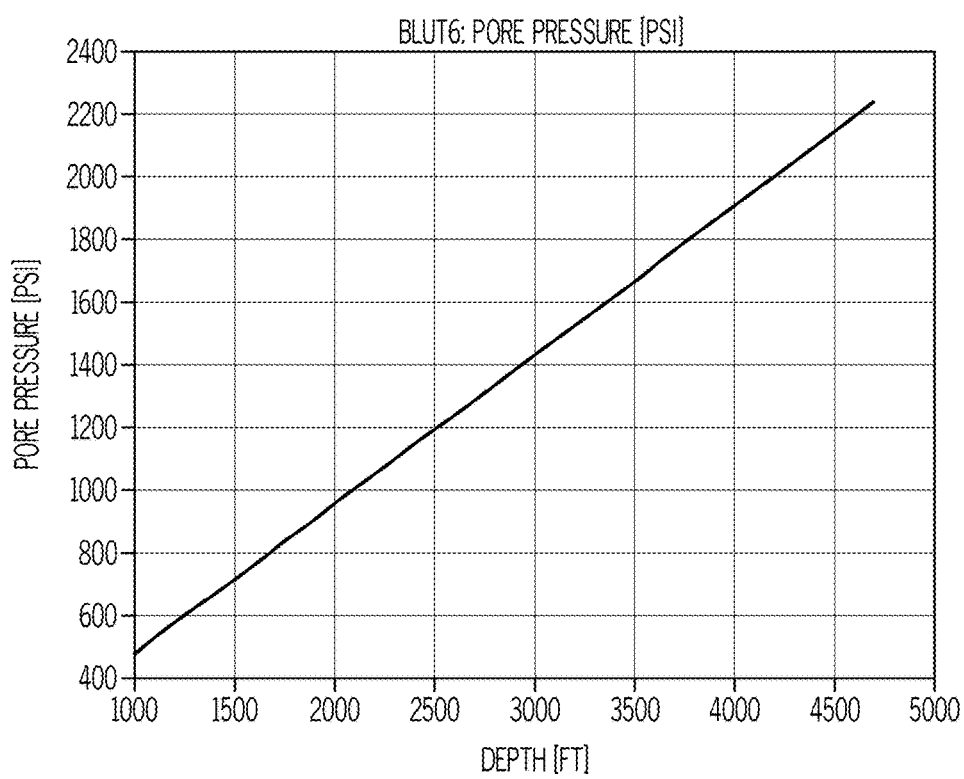

BLUT 5: Flow rate vs. pump strokes/minute, pump volume/stroke and pump volumetric efficiency. The volume/stroke factor is a function of pump geometry, specifically the liner size and stroke length of the pump. The pump configuration (duplex, triplex, single-acting or double-acting) also impacts the effective flow rate generated. In the current scenario, single-acting triplex pumps are used. A plot of flow rate vs. pump strokes/minute is shown in FIG. 14E.

BLUT 6: Pore pressure vs. depth. This data is usually obtained prior to drilling from seismic surveys or information obtained on offset wells (such as direct pore pressure measurements using repeat formation tester (RFT)/modular formation dynamics test (MDT) downhole tools or correlation from downhole logs). The operator usually owns this information. During the well construction process, pore pressure can be measured using the RFT/MDT tools or computed using empirical correlations to sonic, density and resistivity logs. The pore pressure curve for the current scenario is plotted in FIG. 14F.

BLUT 7: Fracture pressure vs. depth. This data is also obtained from offset wells. Formation integrity tests, limit tests, leak-off tests and minifrac tests are often used to update this table. The fracture pressure curve for the current scenario is plotted in FIG. 15A. FIGS. 15A-15E illustrate the base look-up tables 7 through 11 in accordance with an embodiment of the present invention.

BLUT 8: Minimum flow rate for bit cleaning vs. bit diameter. A general rule of thumb for PDC bits is used to generate the plot in FIG. 15B.

BLUT 9: Pump capability (yes/no) vs. pump pressure, flow rate, maximum working pressure and pump horsepower rating. At high flow rates, the maximum allowable pump pressure is limited by the pump horsepower, resulting in a curve such as the one shown in FIG. 15C. This table can be obtained from the equipment manufacturer.

Figure 15A:
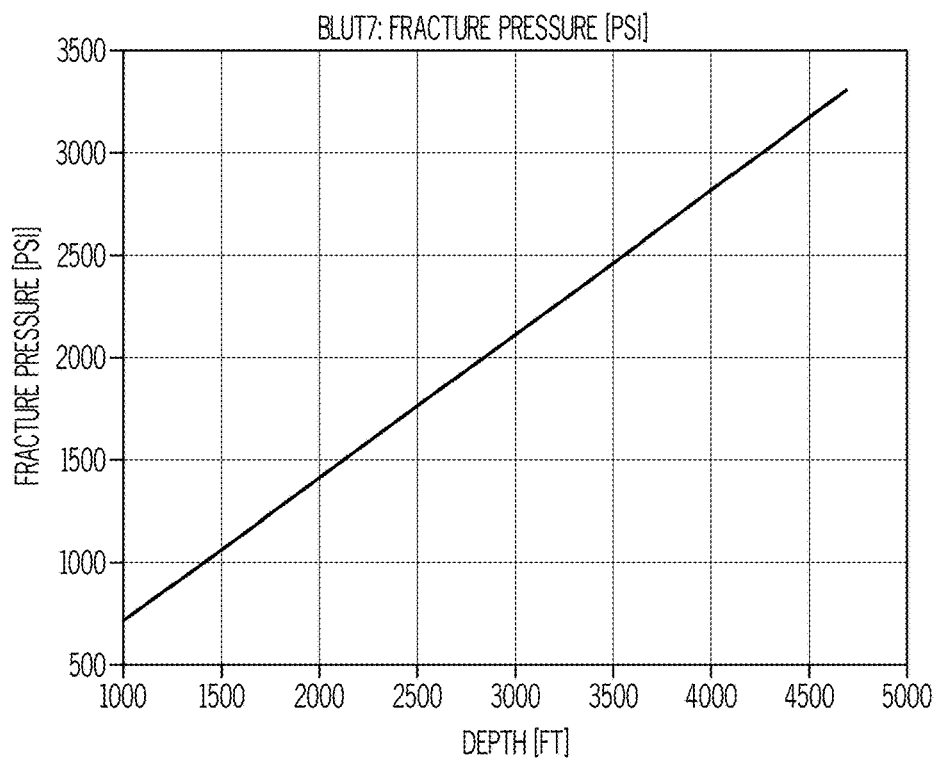
FIGS. 15A-15E illustrate the base look-up tables 7 through 11 in accordance with an embodiment of the present invention.
Figure 15B:
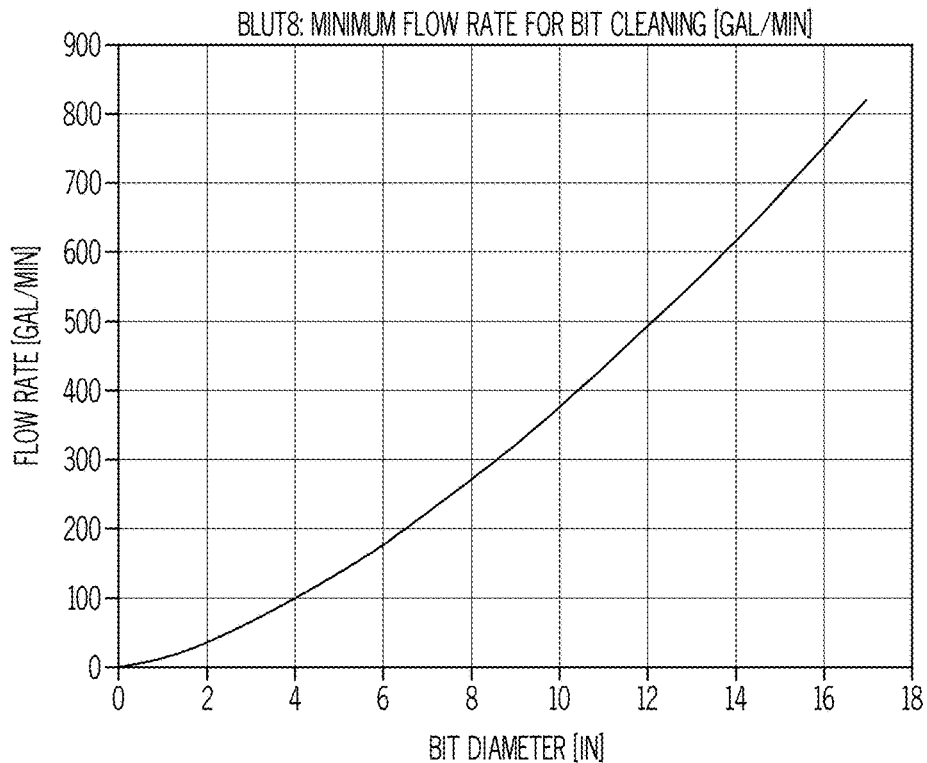
Figure 15C:
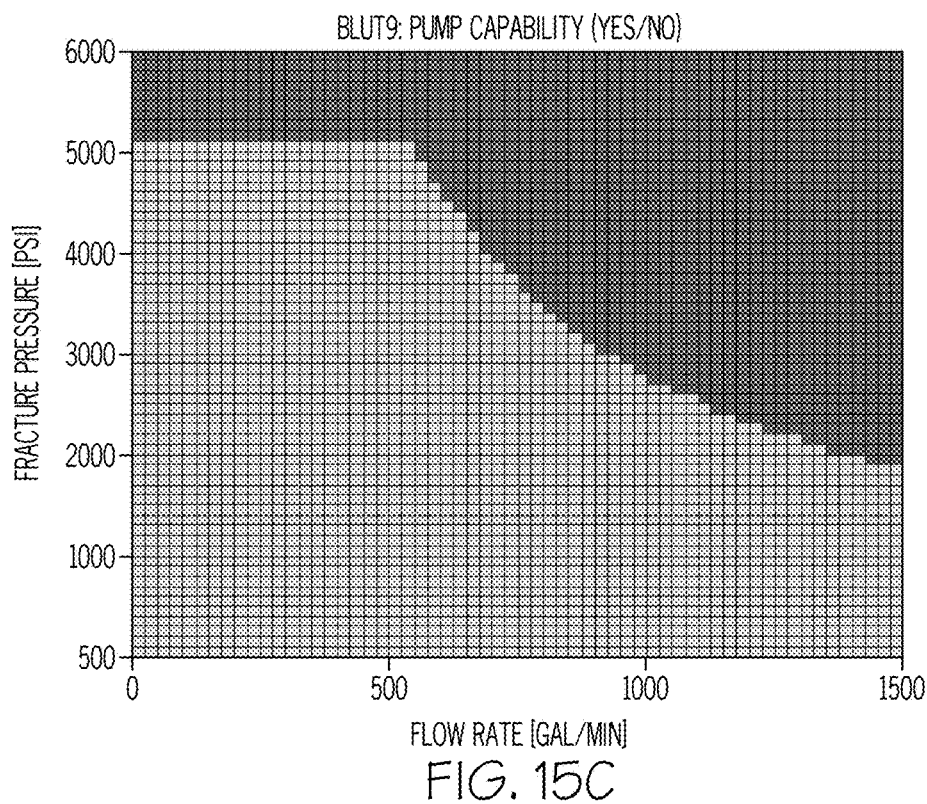
Figure 15D:
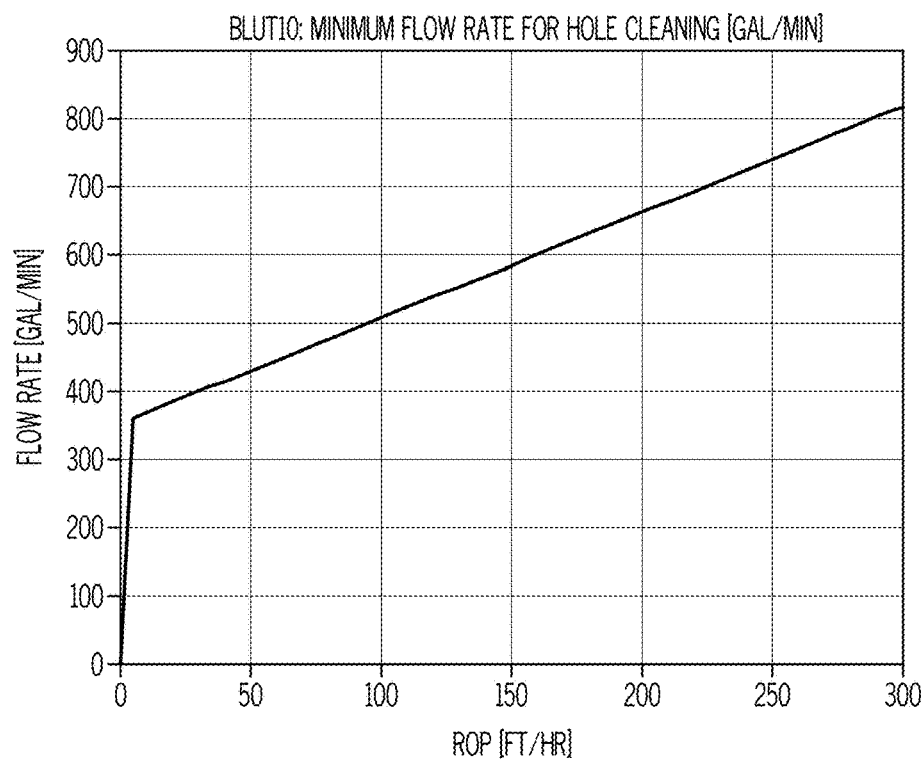
Figure 15E:
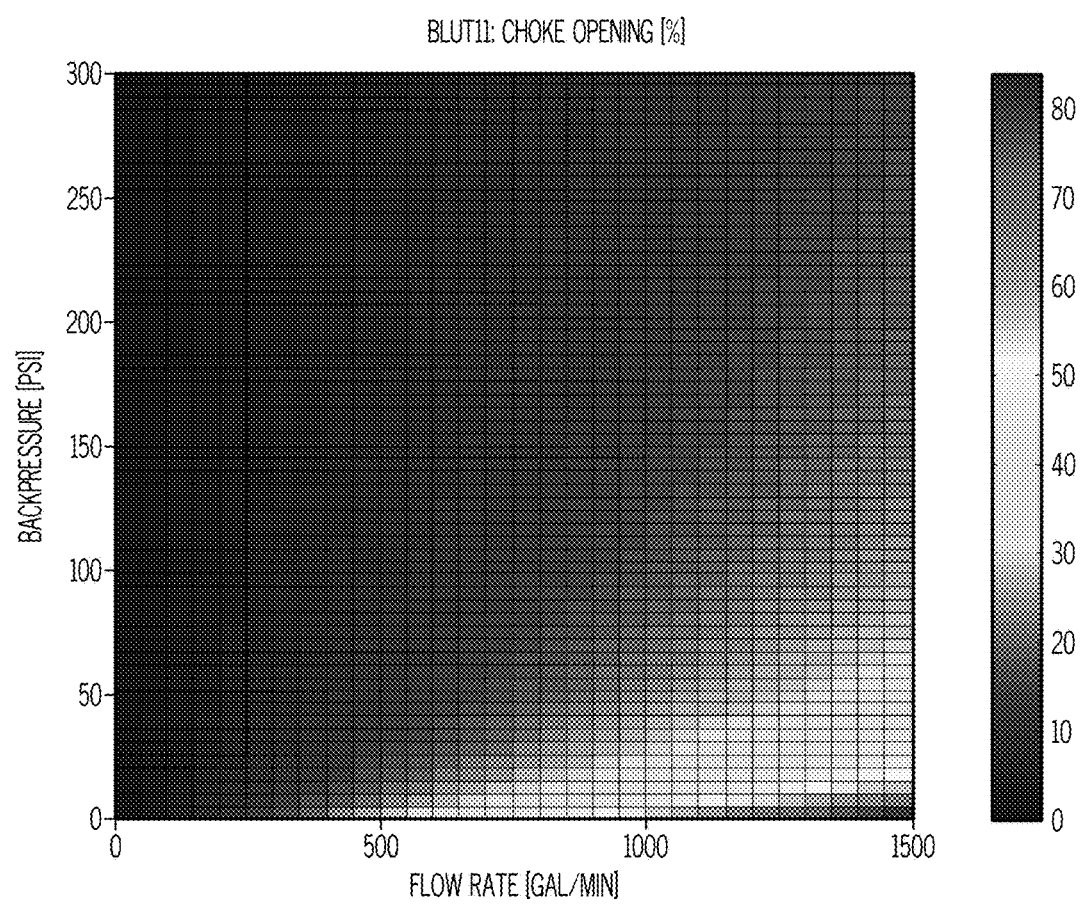

BLUT 10: Minimum flow rate for hole cleaning vs. mud weight, hole diameter, pipe outer diameter, mud yield point, mud plastic viscosity, cuttings density, cutting diameter, cutting sphericity, porosity and Rate of Penetration. This table uses a cuttings transport model to calculate the flow rate required to maintain the cuttings concentration in the annulus at a value below 5%. The average cuttings concentration in the annulus depends on the Rate of Penetration and formation porosity. The cuttings transport model also requires computing the slip velocity, which is calculated using a model for irregularly shaped particles in a Bingham Plastic mud. A plot of the minimum allowable flow rate vs. Rate of Penetration is shown in FIG. 15D.

BLUT 11: Choke opening vs. mud weight, cuttings concentration, cuttings density, backpressure and flow rate. This table uses a nonlinear valve model commonly cited in the MPD literature. Since mud in the annulus might contain dispersed cuttings, it uses the mixture density in the valve equation. Choke opening is plotted for different combinations of flow rate and backpressure in FIG. 15E.

Figure 16A:
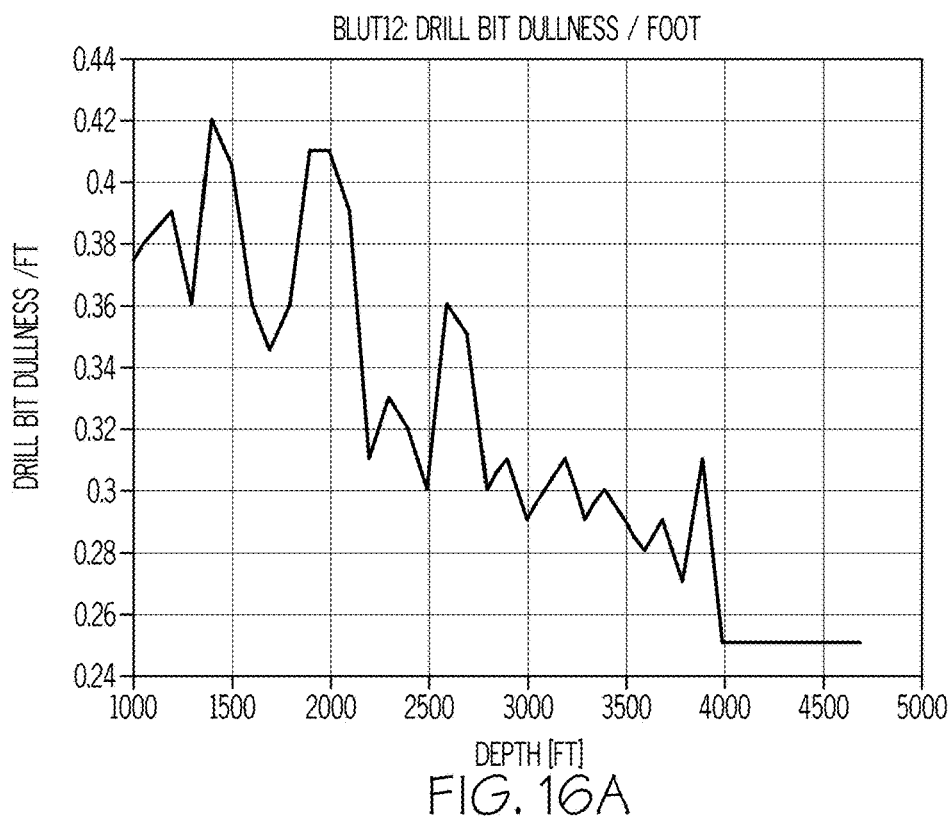
FIGS. 16A-16F illustrate the base look-up tables 12 through 17 in accordance with an embodiment of the present invention.

BLUT 12: Drill bit dullness/foot vs. depth, Weight on Bit and bit RPM. The bit dullness characteristic is highly dependent on the lithology drilled. FIG. 16A shows a plot of drill bit dullness/foot vs. depth generated for the described drilling scenario. In particular, FIGS. 16A-16F illustrate the base look-up tables 12 through 17 in accordance with an embodiment of the present invention. The drill bit dullness/foot decreases as the lithology transitions from harder rocks (sandstone and shale) to softer ones (mudstone). Note that this is an instantaneous characteristic (i.e., how much dullness the bit would experience if the bit run started at a given depth). The effective dullness that the bit would experience over a drilling interval can be obtained from the area under the dullness/foot curve with an appropriate normalization factor.

Figure 16B:
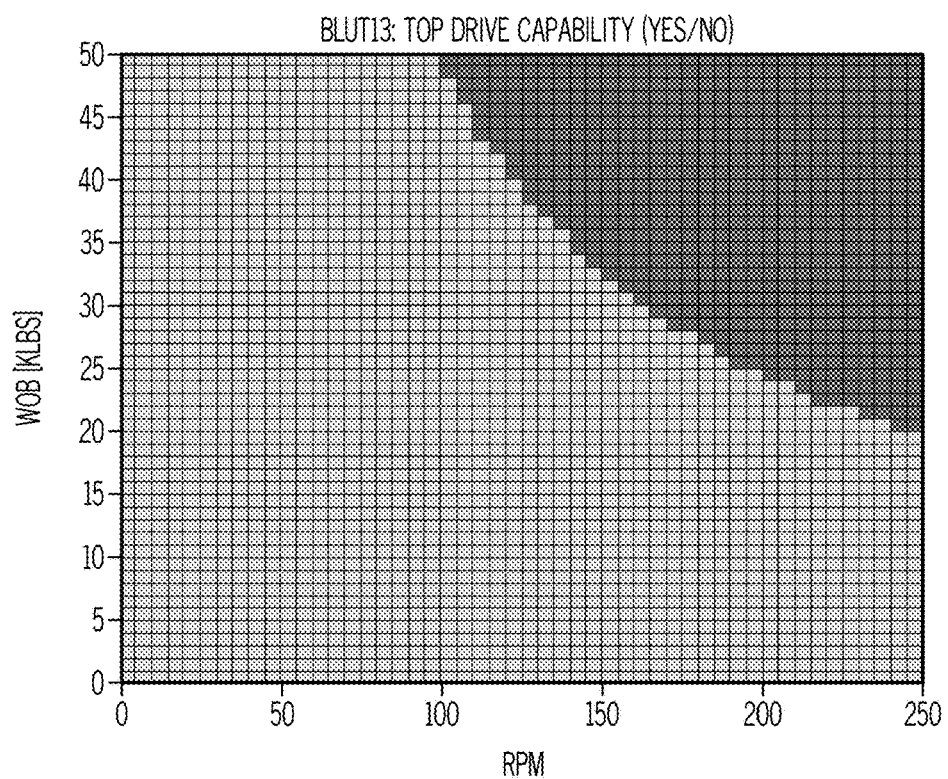

BLUT 13: Top drive capability (yes/no) vs. bit RPM, Weight on Bit, and depth and drill bit dullness. To obtain this LUT, the load torque is related to the Weight-on-Bit through the bit-rock interaction (function of drill-bit dullness and depth). Then, the load torque is translated to the top drive torque to verify whether this combination is physically feasible based on the top drive torque-speed operational envelope. This table can be obtained from the equipment manufacturer. A plot of top drive capability vs. bit RPM and WOB is shown in FIG. 16B.

Figure 16C:
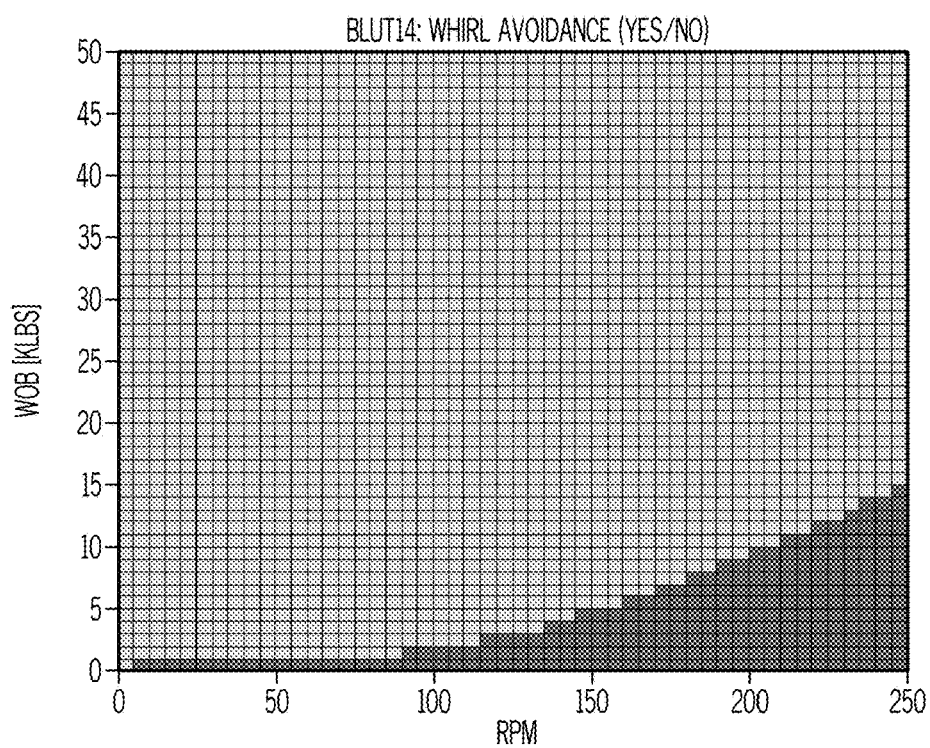

BLUT 14: Whirl (yes/no) vs. bit RPM, Weight on Bit, and depth and drill bit dullness. This table requires a lateral vibration model to be run offline and return the ranges of RPM and WOB where the onset of whirl is avoided. FIG. 16C shows one such plot.

Figure 16D:
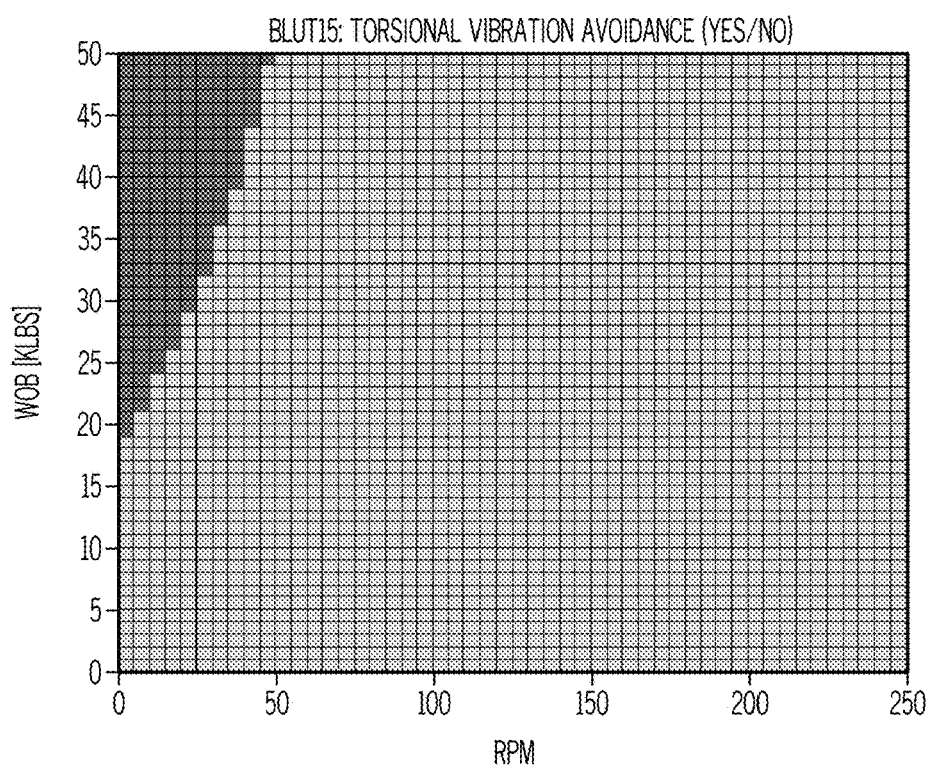
Figure 16E:
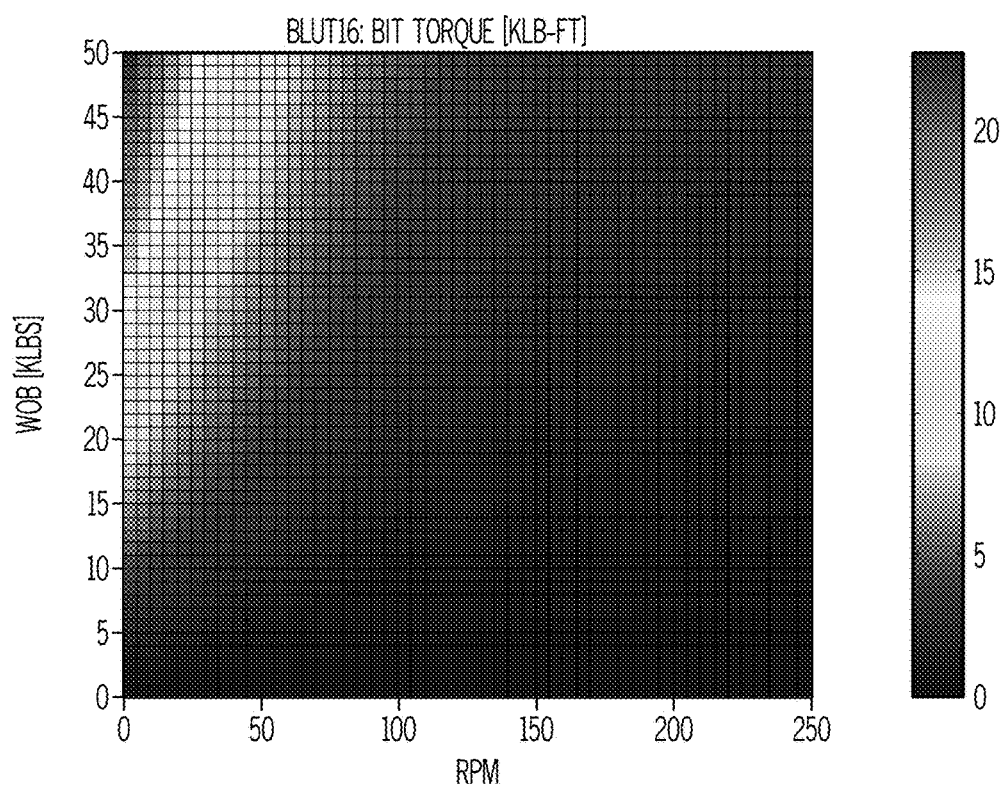
Figure 16F:
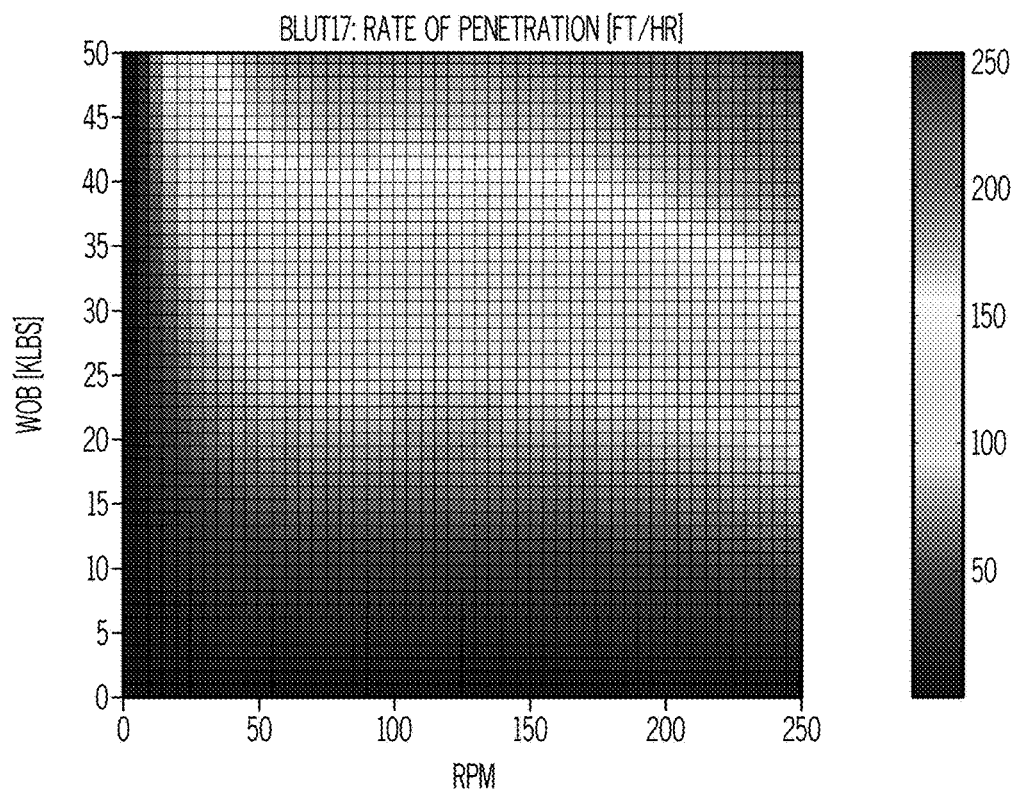

BLUT 15: Torsional Vibration (Yes/No) vs. Bit RPM, Weight on Bit, and depth and drill bit dullness. This table requires a torsional vibration model to be run offline and return the ranges of RPM and WOB where stick-slip is avoided. FIG. 16D shows an example plot.

BLUT 16: Bit Torque vs. Bit RPM, Weight on Bit and drill bit dullness. This table is generated using a velocity-weakening frictional characteristic caused by the bit-rock interaction. A plot of bit torque vs. bit RPM and WOB is given in FIG. 16E.

BLUT 17: Rate of Penetration (ROP) vs. Unconfined Compressive Strength (UCS), friction angle, bit RPM, Weight on Bit, bit torque, drill bit dullness, bit diameter, Equivalent Circulating Density, pore pressure and depth. The Rate of Penetration is predicted using the model which uses Confined Compressive Strength (CCS) as an indicator of the rock strength. To calculate CCS, knowledge of UCS, friction angle, as well as pressure overbalance is required. A plot of the rate of penetration vs. bit RPM and WOB is given in FIG. 16F.

While not detailed herein, additional look-up tables can be constructed to handle well control in MPD operations where influxes of formation fluids may occur. Those look-up table values can be calibrated off-line after running multi-phase flow models consisting of partial differential equations. For the scenario presented herein, it is assumed only liquid and solid phases (cuttings) are present in the mud at all times.

Combining Base LUTs to Obtain Control Relevant Derived LUTs

Figure 17:
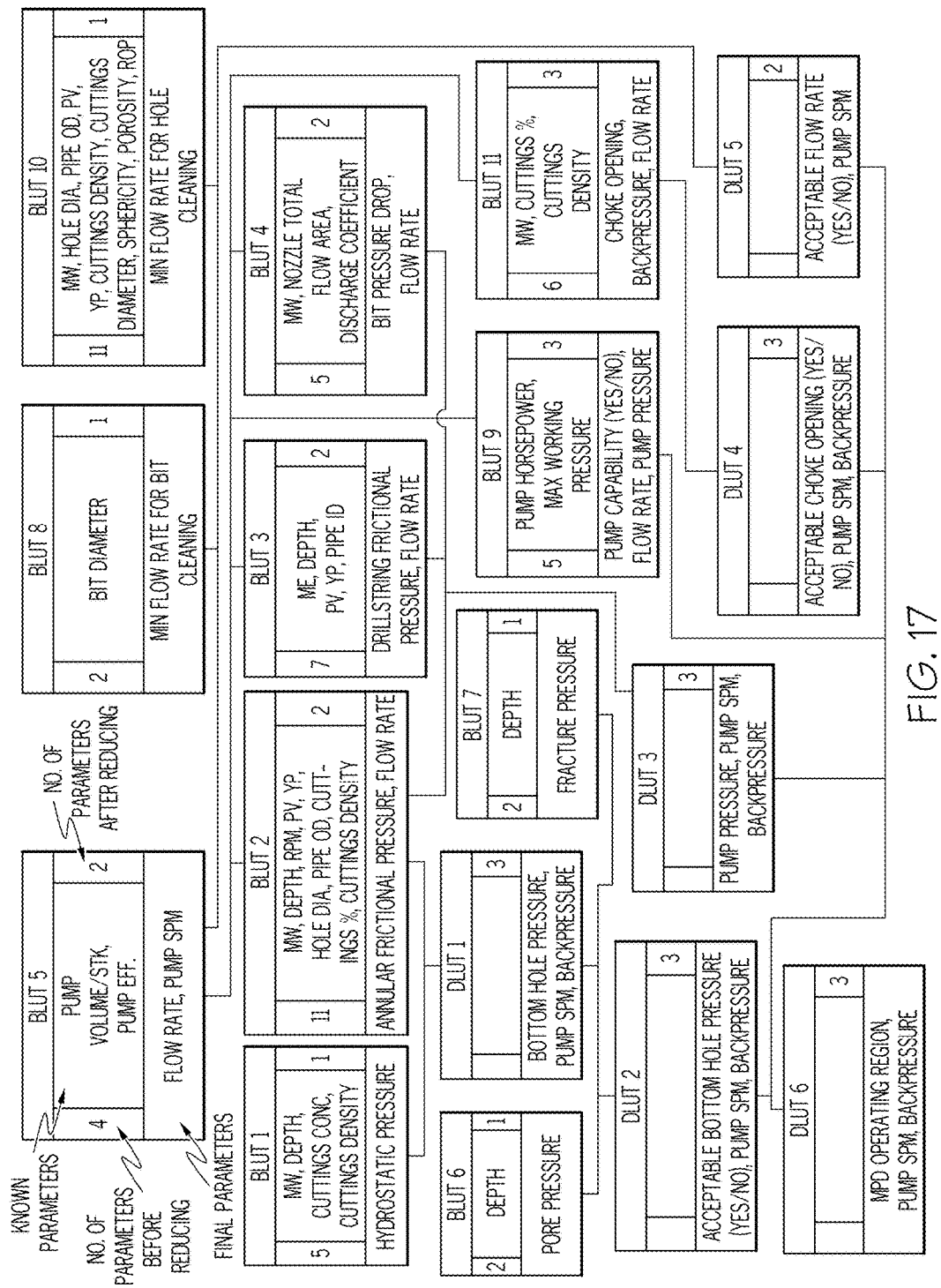
FIG. 17 is high-level diagram showing how data is combined to arrive at pump rate and backpressure constraints in accordance with an embodiment of the present invention.
Figure 18:
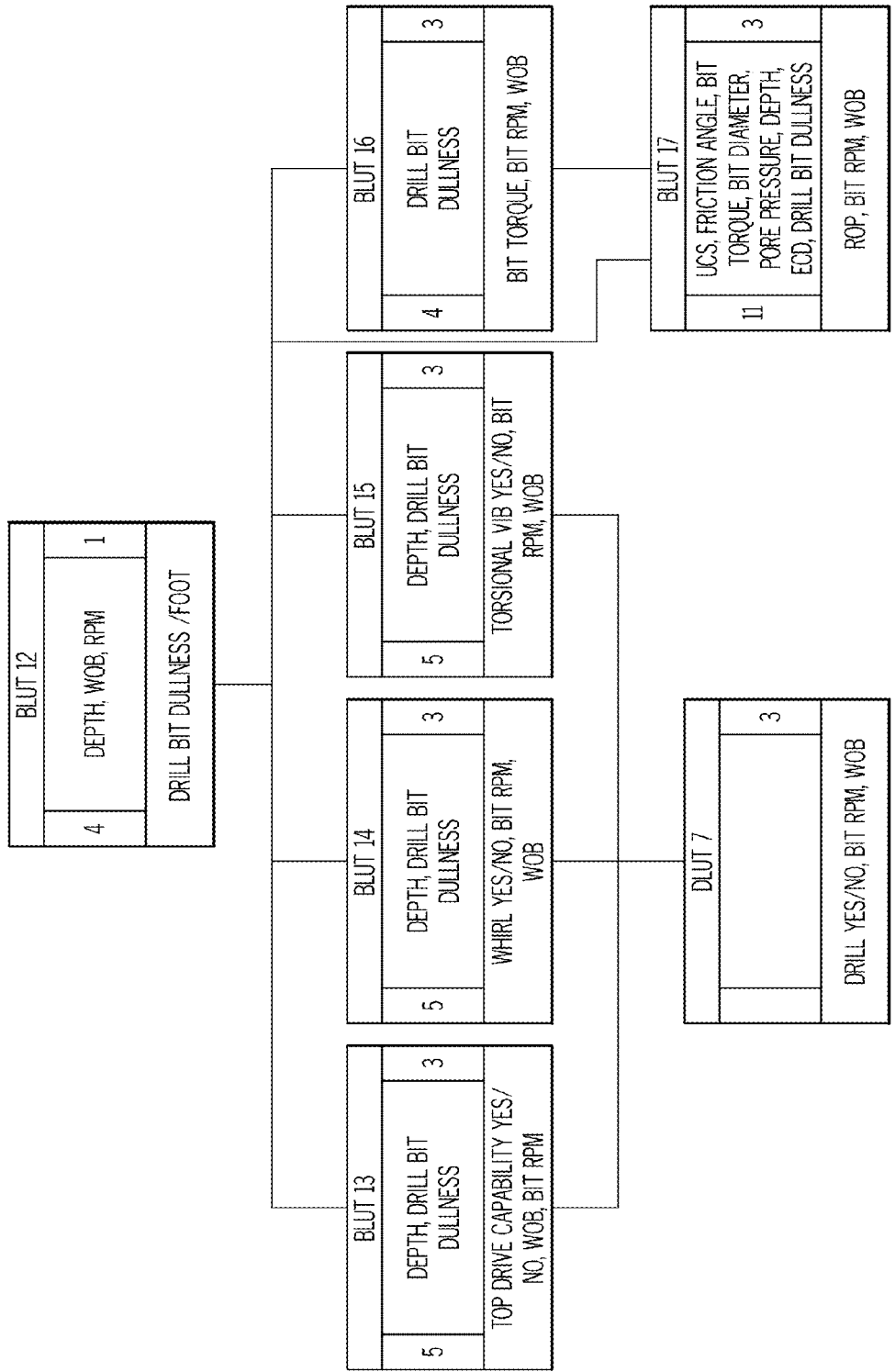
FIG. 18 is a high-level diagram showing how data is combined to arrive at bit rpm and weight on bit constraints in accordance with an embodiment of the present invention.
Figure 19A:
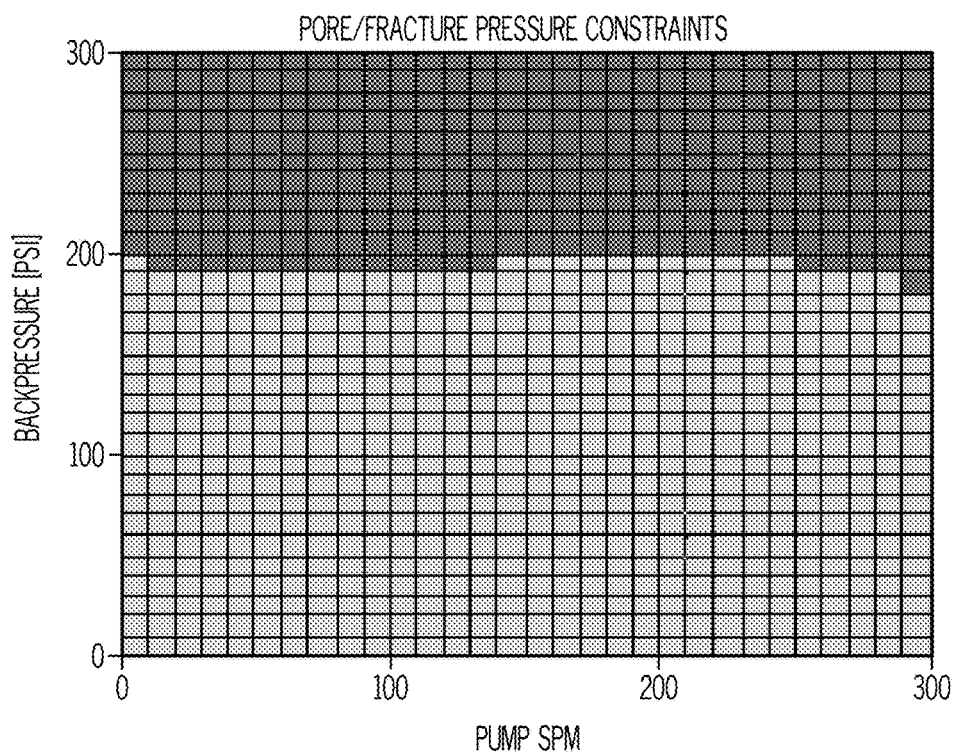
FIGS. 19A-19H illustrate the constraints for a controller design at 1,000 ft. measured depth, where the darker shaded regions represent allowable combinations of parameters, in accordance with an embodiment of the present invention.
Figure 19B:
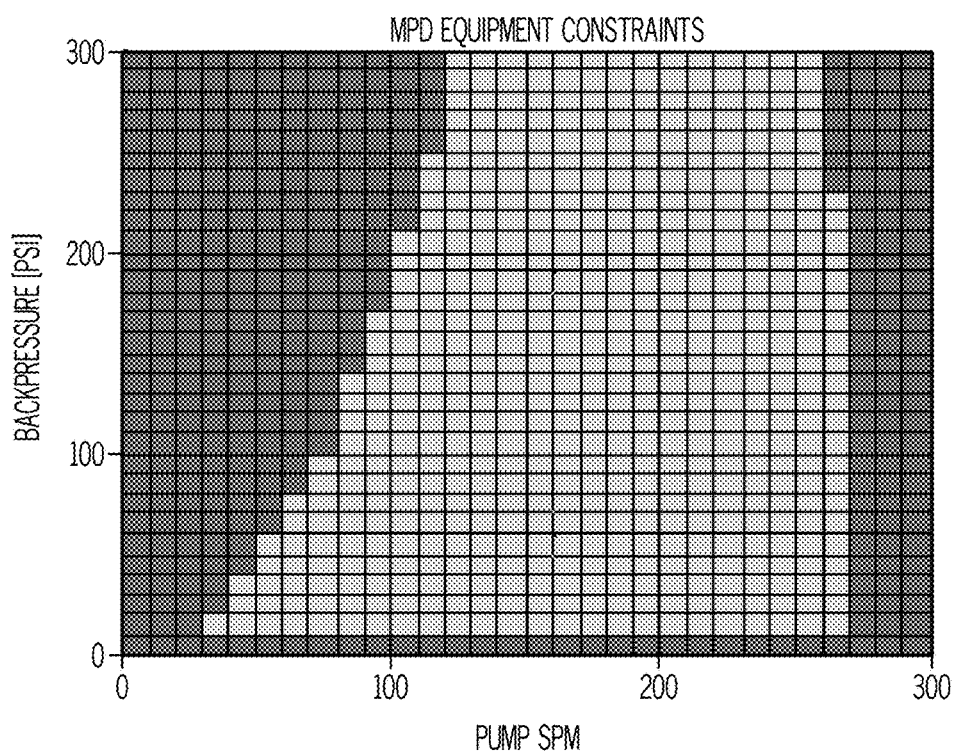
Figure 19C:
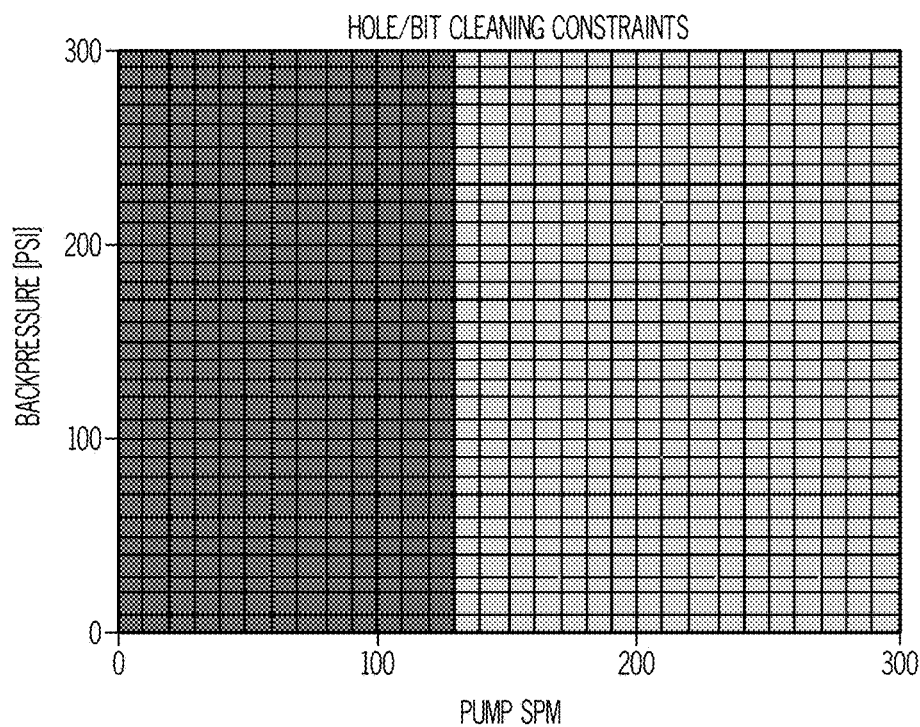
Figure 19D:
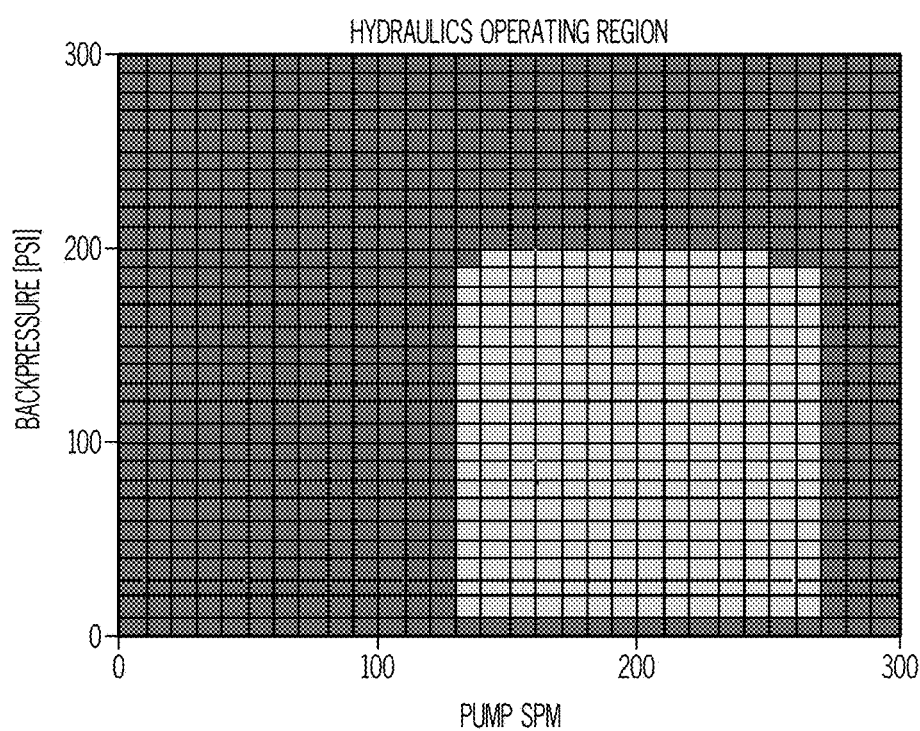
Figure 19E:
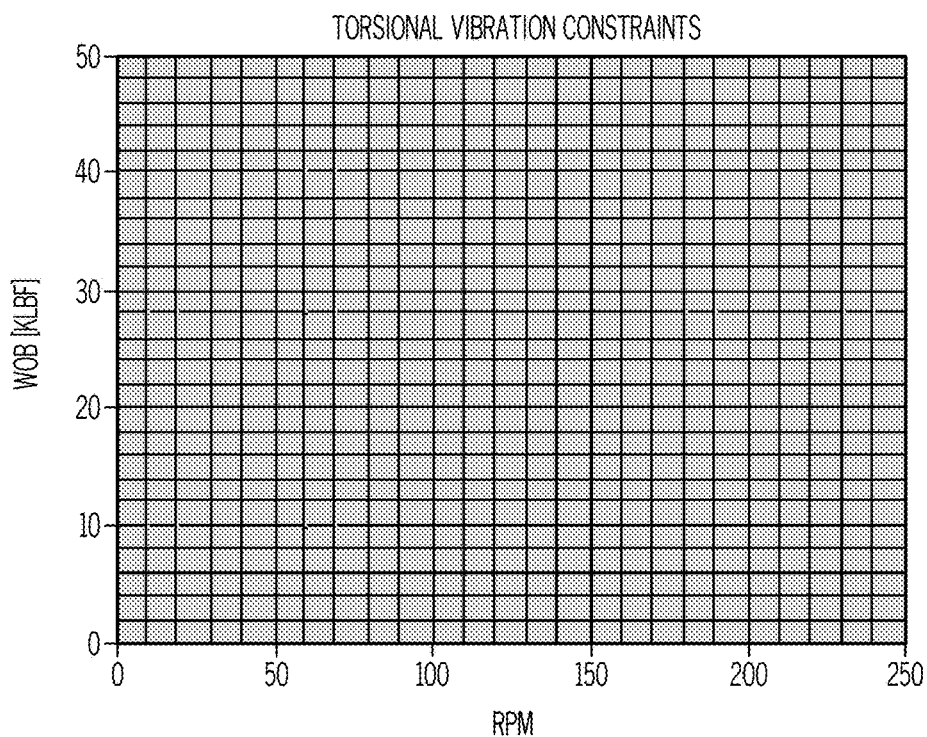
Figure 19F:
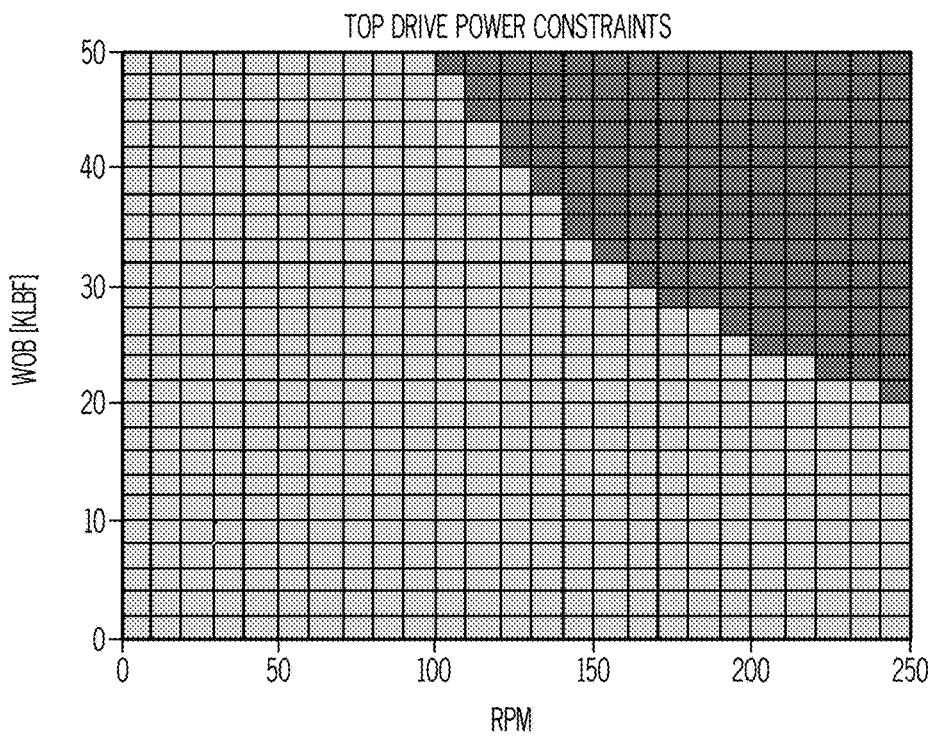
Figure 19G:
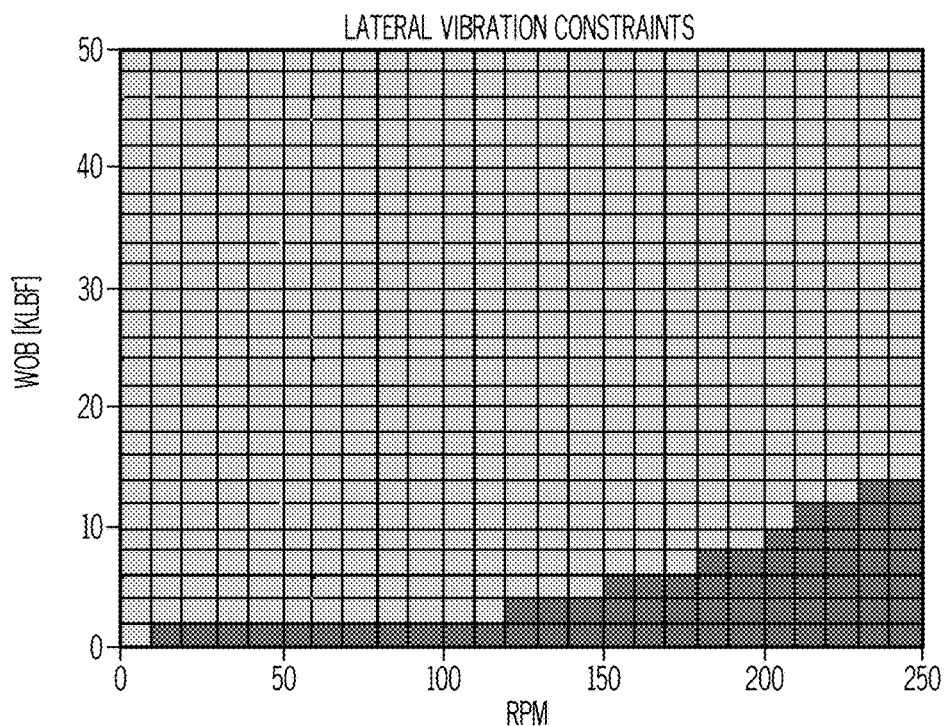
Figure 19H:
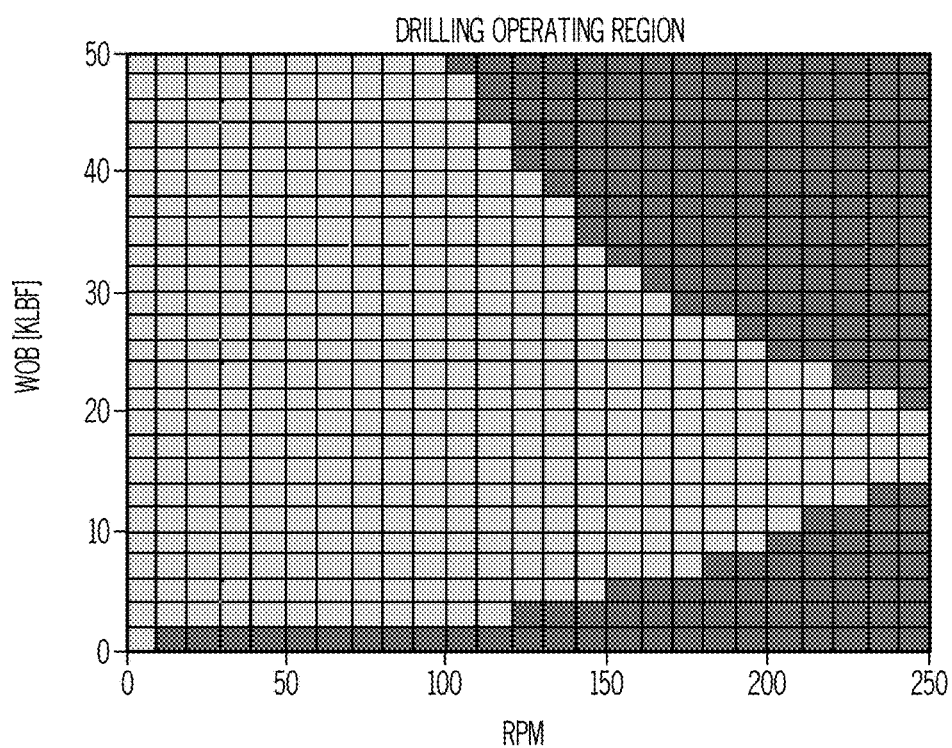
Figure 20A:
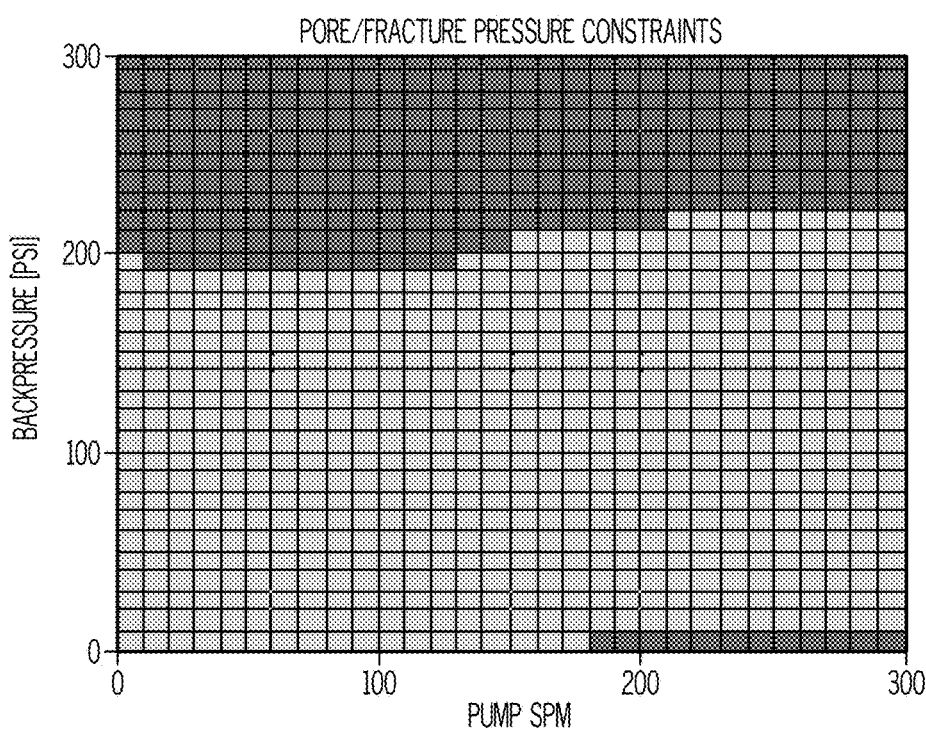
FIGS. 20A-20H illustrate the constraints for a controller design at 2,000 ft. measured depth, where the darker shaded regions represent allowable combinations of parameters, in accordance with an embodiment of the present invention.
Figure 20B:
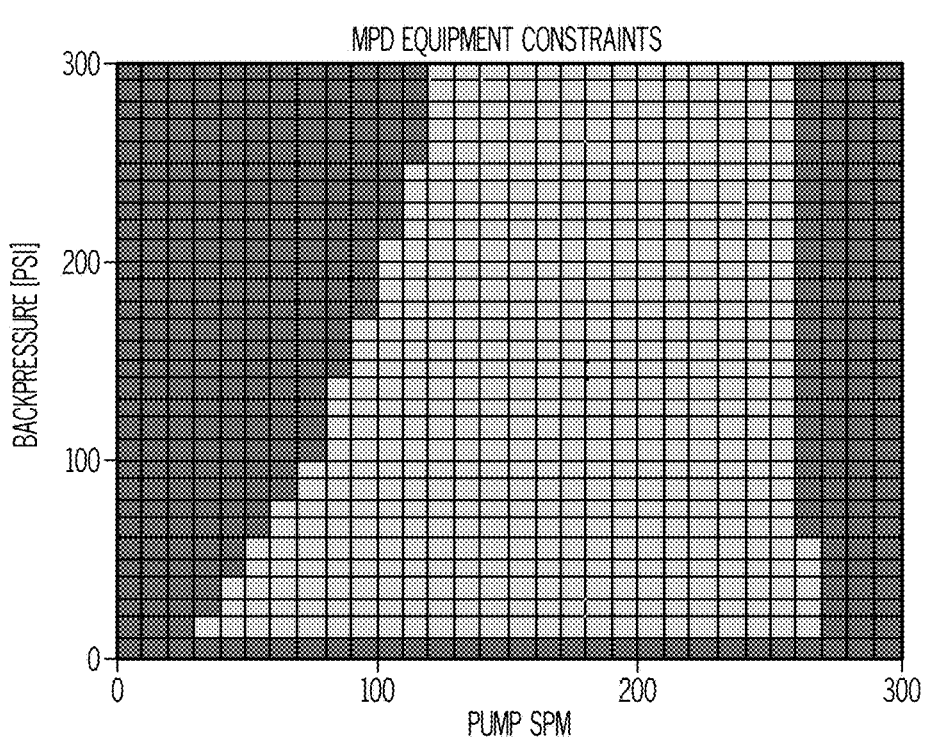
Figure 20C:
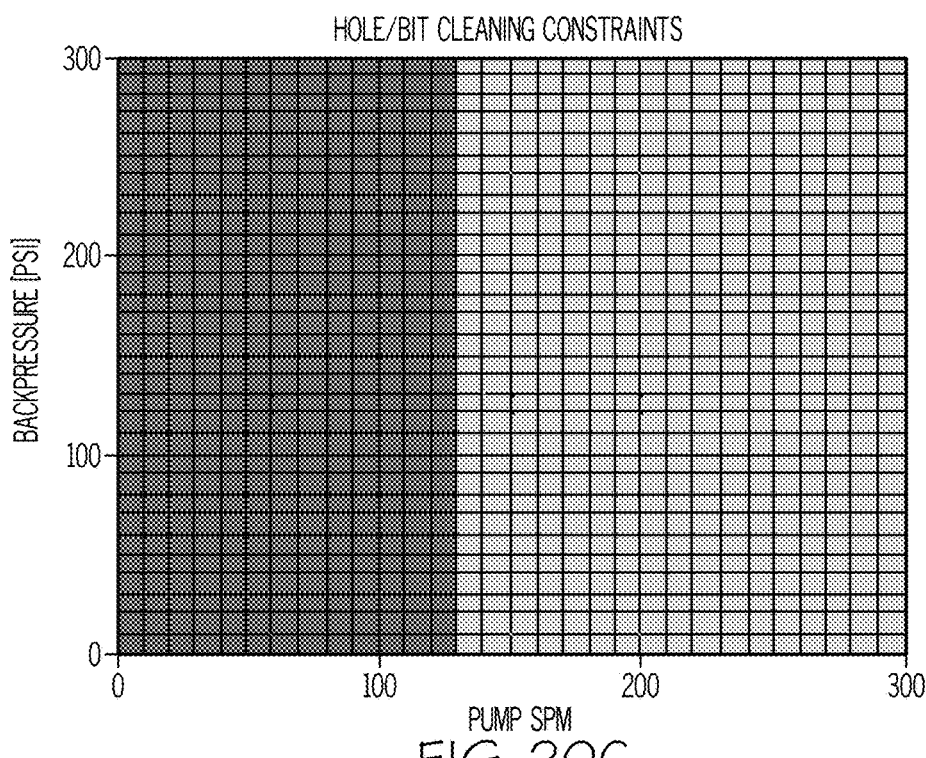
Figure 20D:
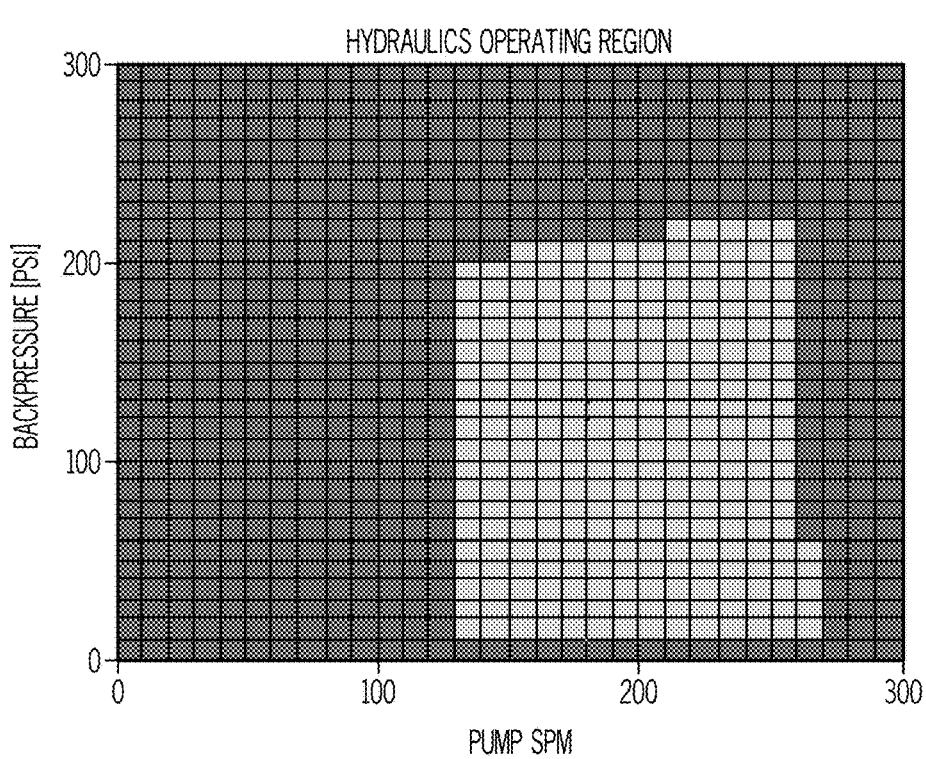
Figure 20E:
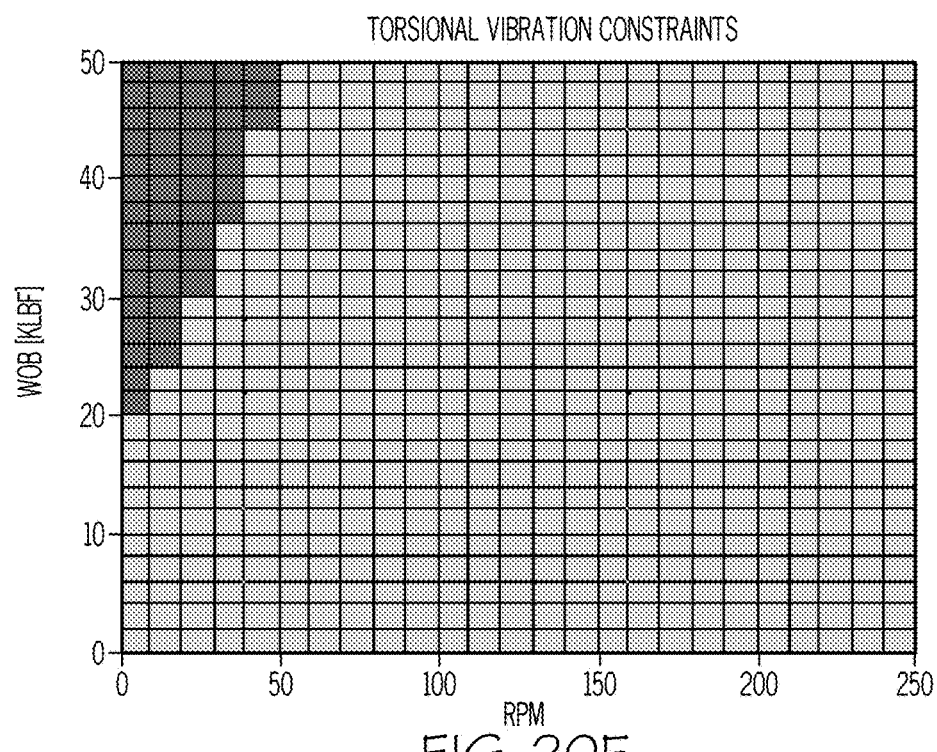
Figure 20F:
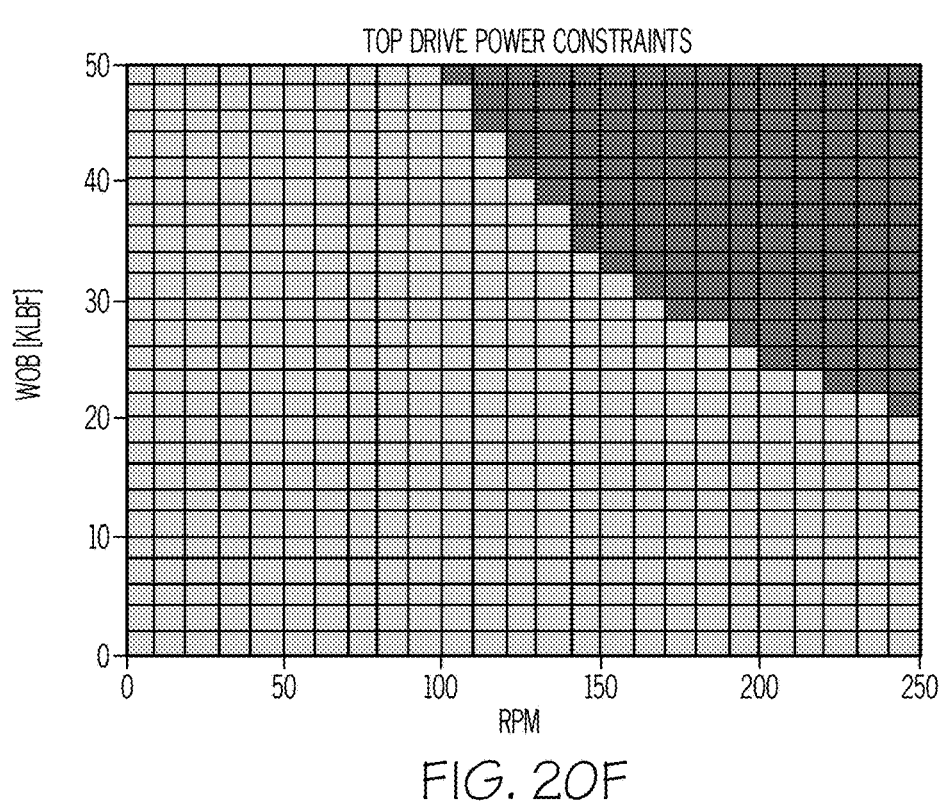
Figure 20G:
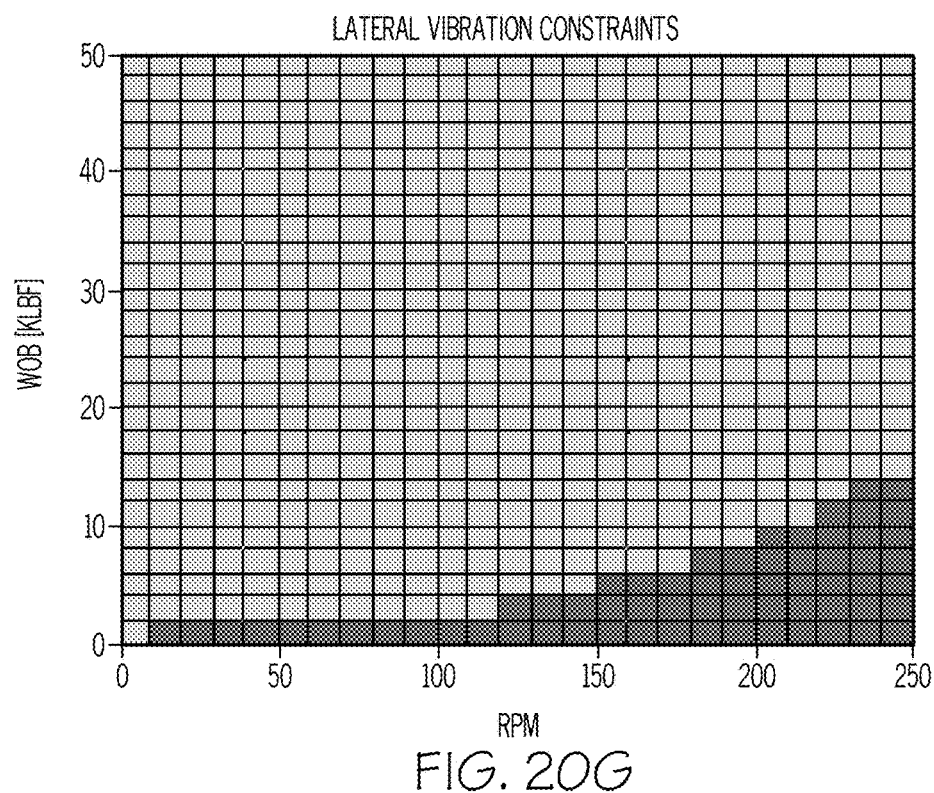
Figure 20H:
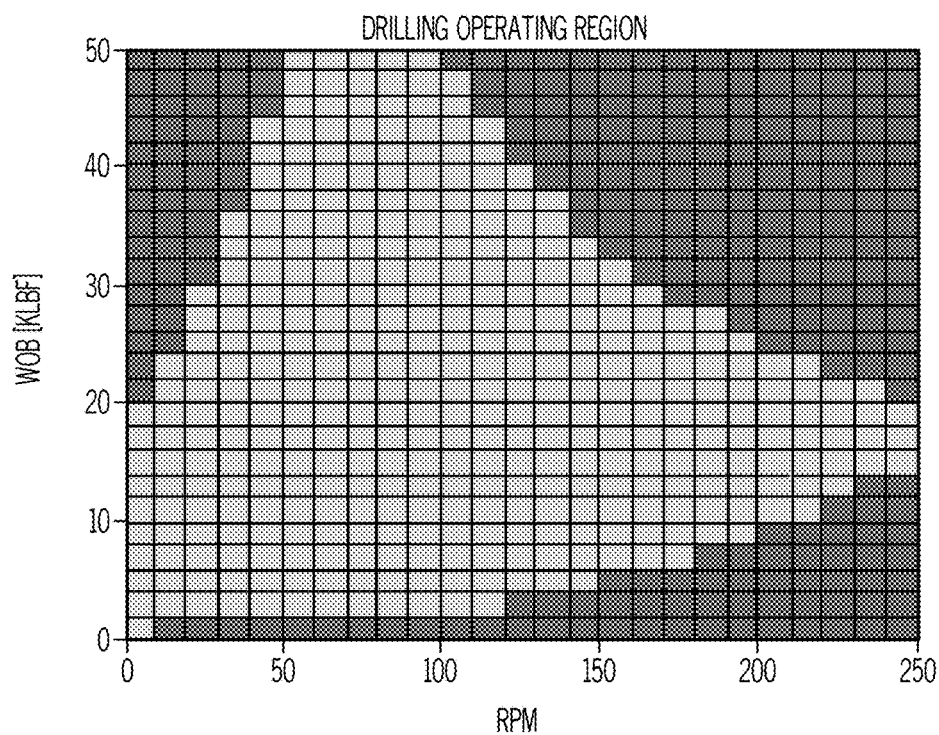
Figures 21A, 21B:
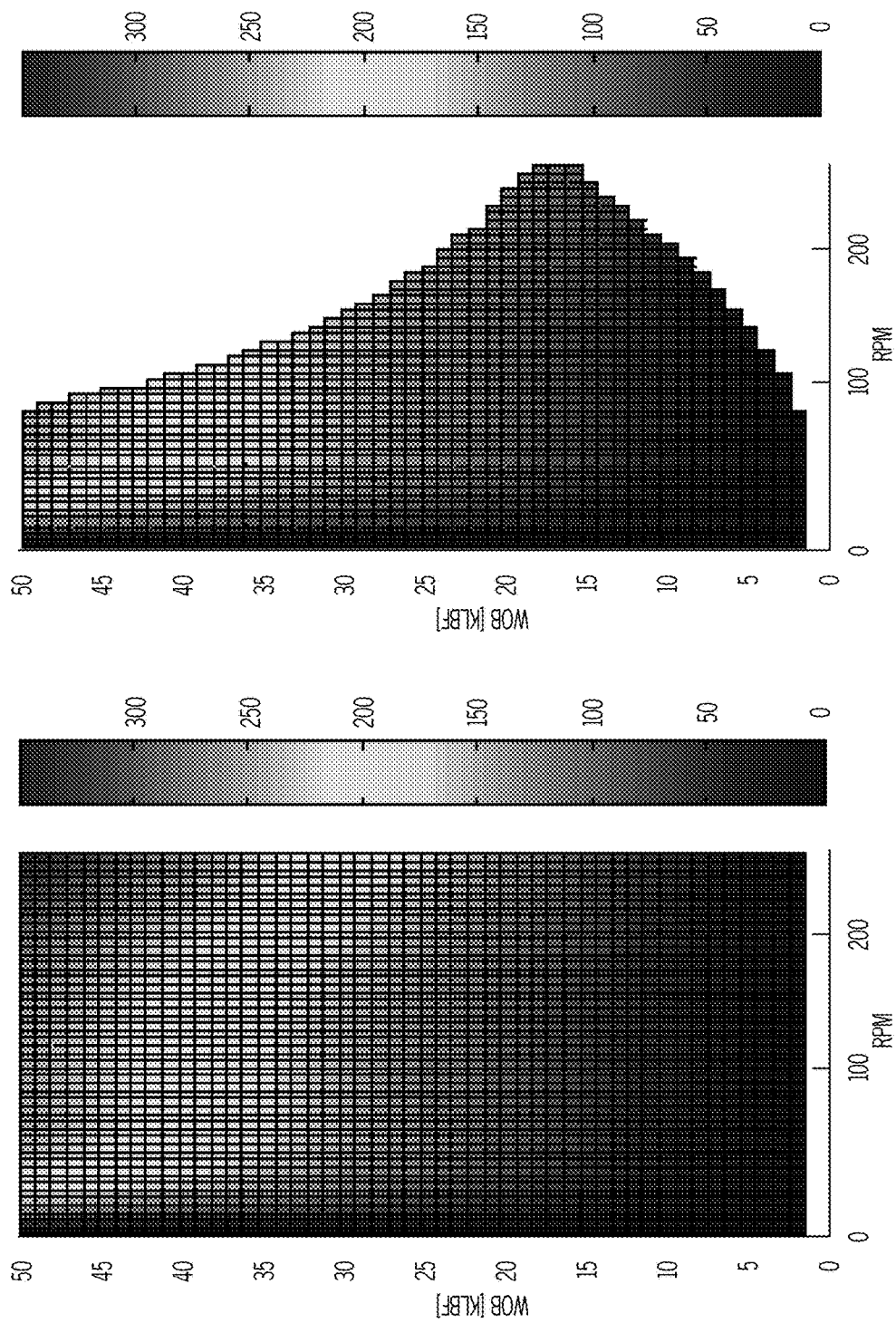
FIGS. 21A-21B illustrate the Rate of Penetration look-up table at 1,000 ft., where the plot in FIG. 21A is before constraints are enforced and the plot in FIG. 21B is with the constraints, in accordance with an embodiment of the present invention.
Figure 23A:
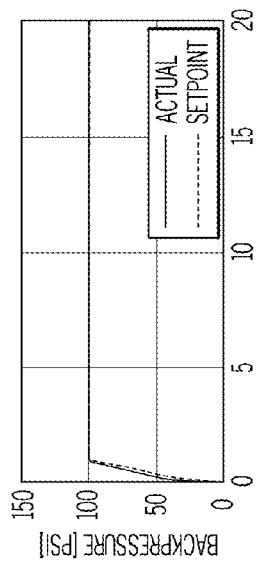
FIGS. 23A-23F illustrate the hydraulics inputs and outputs for controller 1 in accordance with an embodiment of the present invention.
Figure 23B:
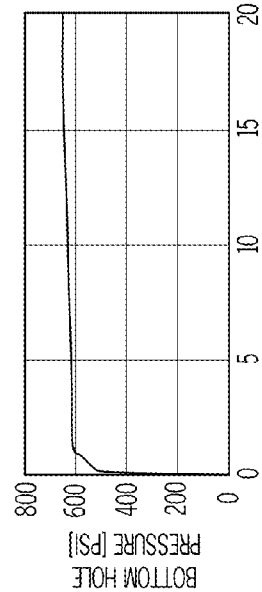
Figure 23C:
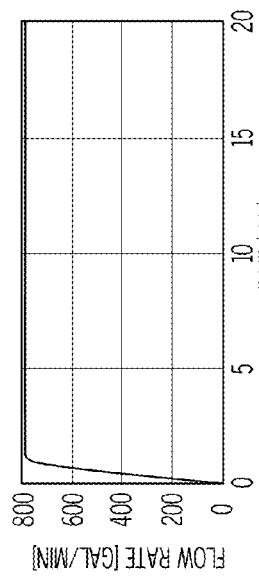
Figure 23D:
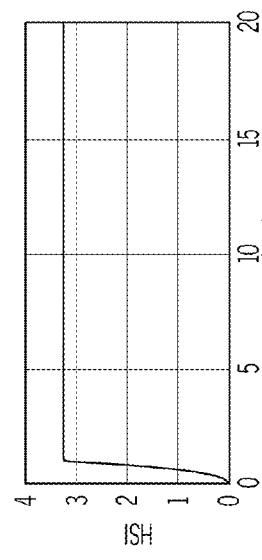
Figure 23E:
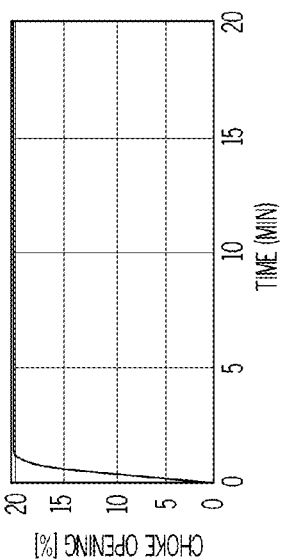
Figure 23F:
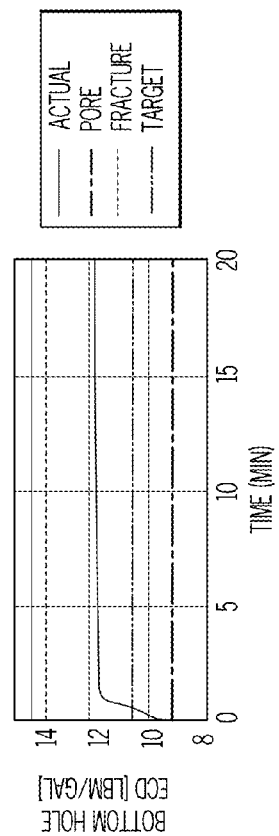
Figure 24A:
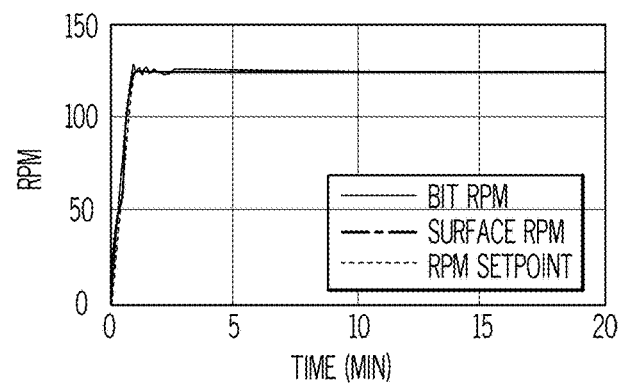
FIGS. 24A-24D illustrate the drilling inputs and outputs for controller 1 in accordance with an embodiment of the present invention.
Figure 24B:
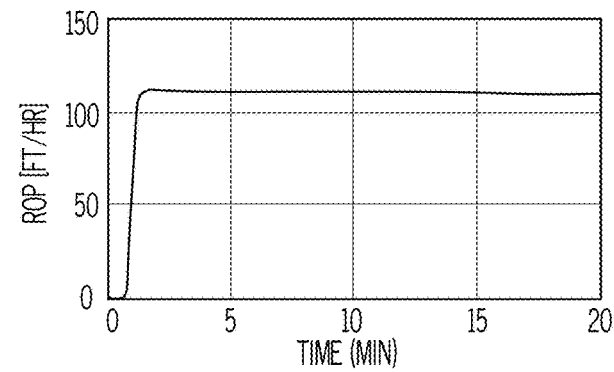
Figure 24C:
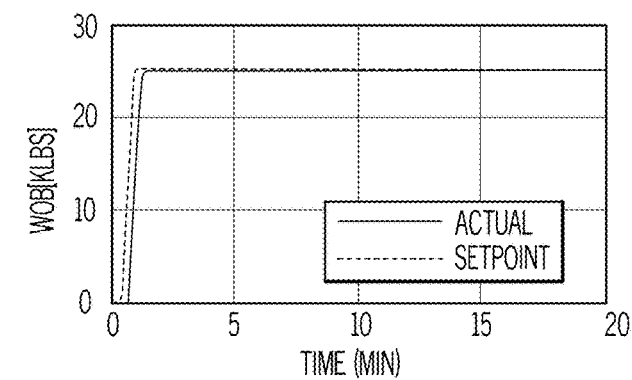
Figure 24D:
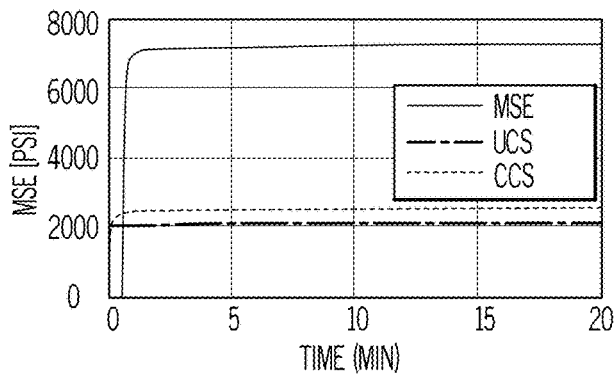
Figure 25A:
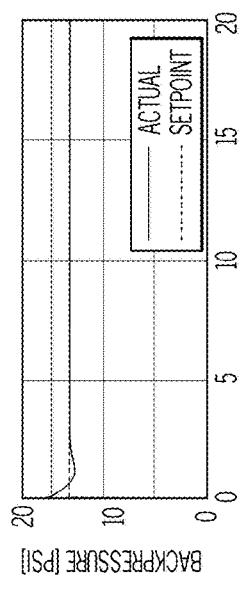
FIGS. 25A-25F illustrate the hydraulics inputs and outputs for controller 2A in accordance with an embodiment of the present invention.
Figure 25C:
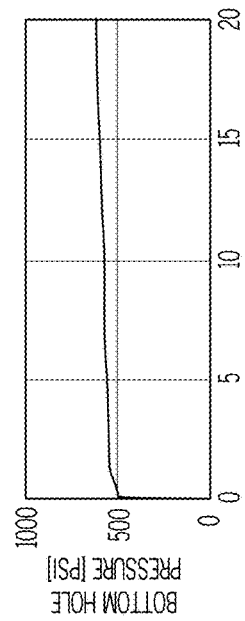
Figure 25B:
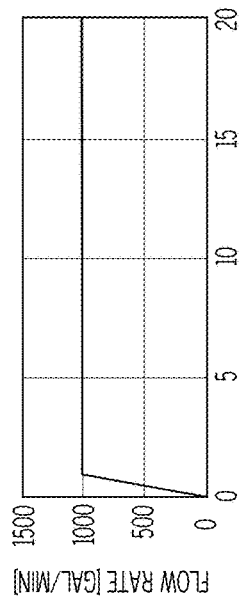
Figure 25D:
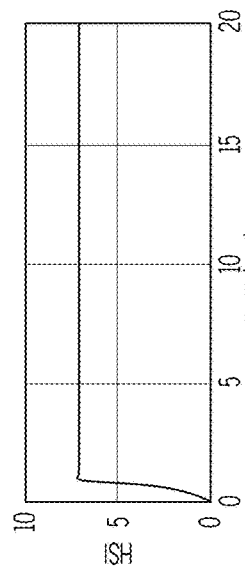
Figure 25E:
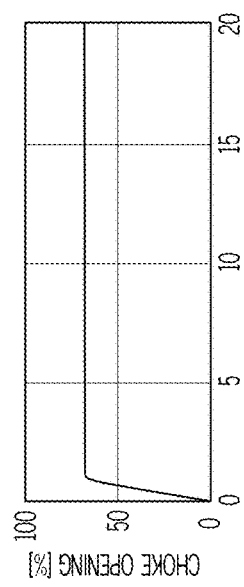
Figure 25F:
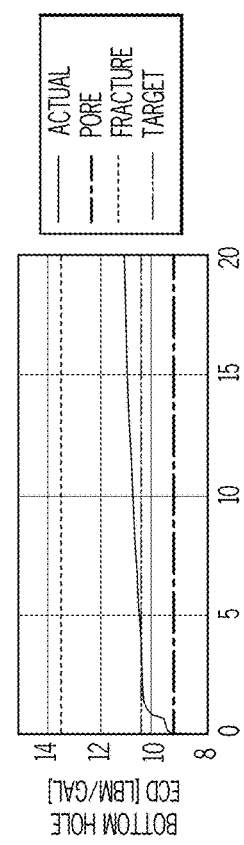
Figure 26A:
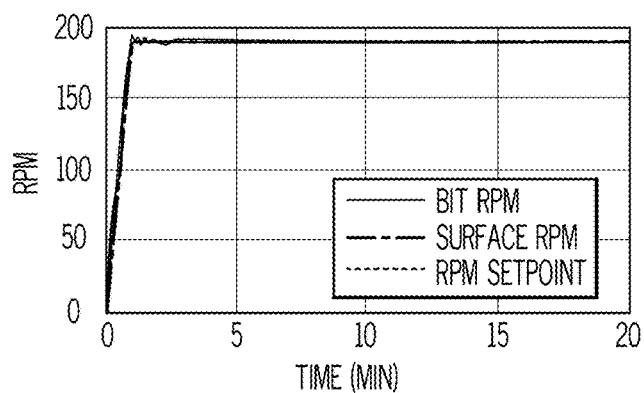
FIGS. 26A-26D illustrate drilling inputs and outputs for controller 2A in accordance with an embodiment of the present invention.
Figure 26B:
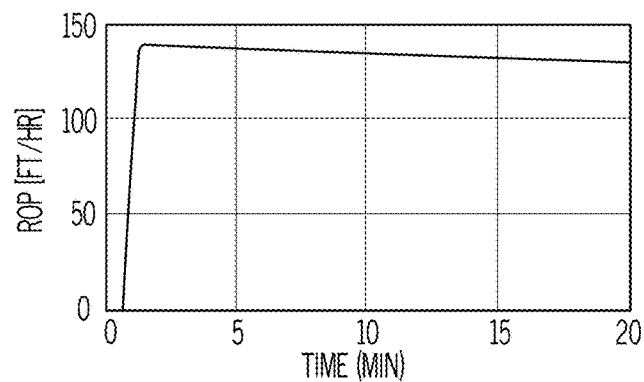
Figure 26C:
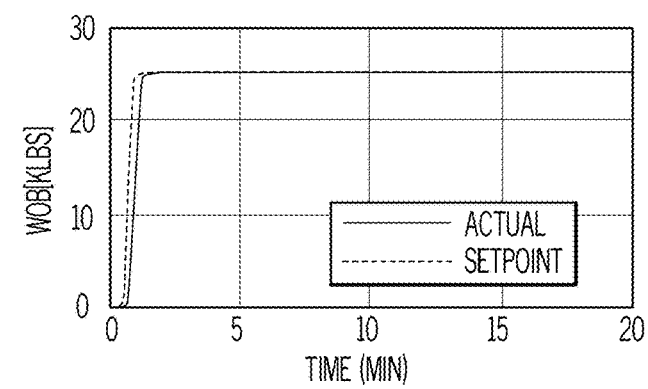
Figure 26D:
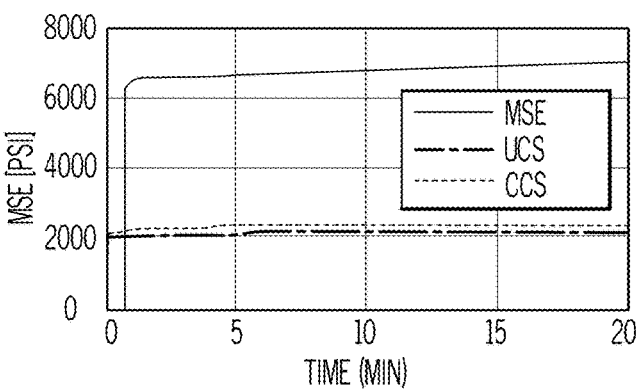
Figure 28A:
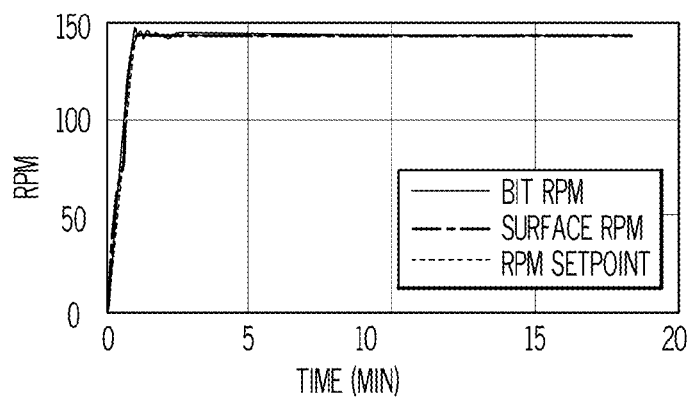
FIGS. 28A-28D illustrate the drilling inputs and outputs for controller 2B in accordance with an embodiment of the present invention.
Figure 28B:
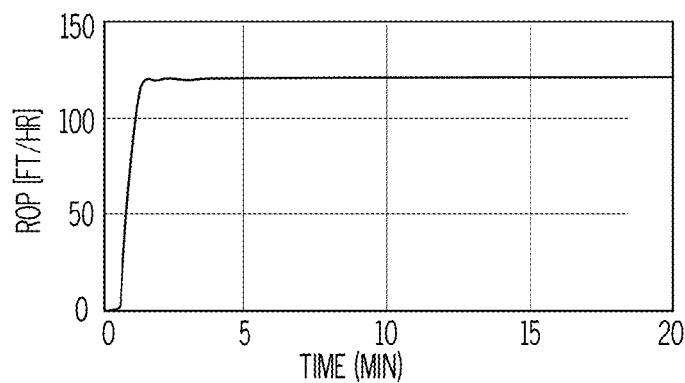
Figure 28C:
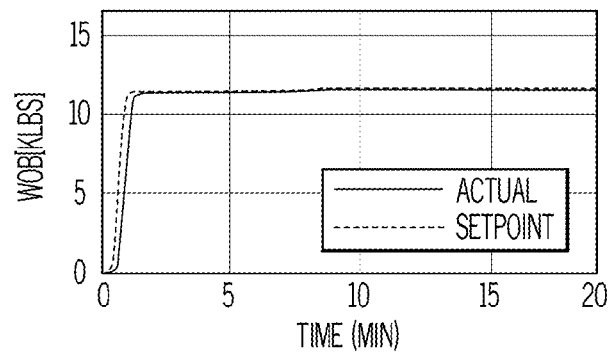
Figure 28D:
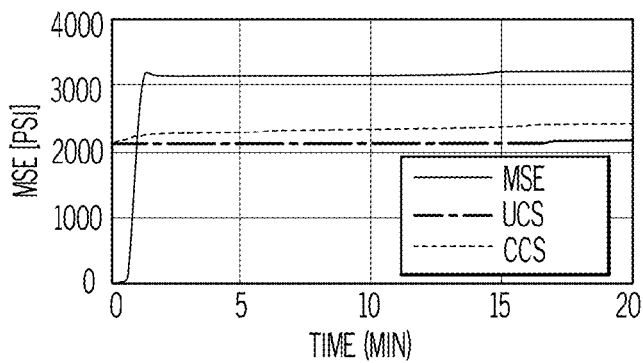
Figure 29A:
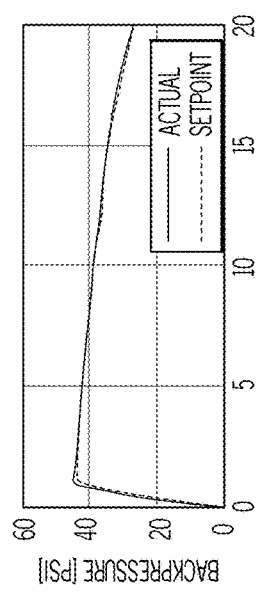
FIGS. 29A-29F illustrate the hydraulics inputs and outputs for controller 2C in accordance with an embodiment of the present invention.
Figure 29B:
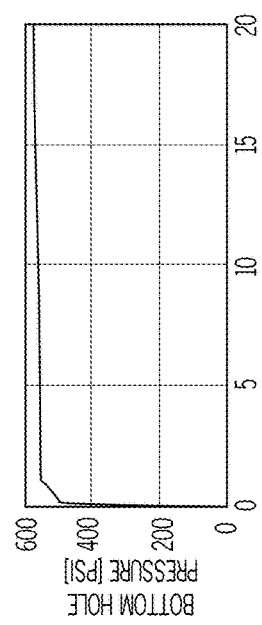
Figure 29C:
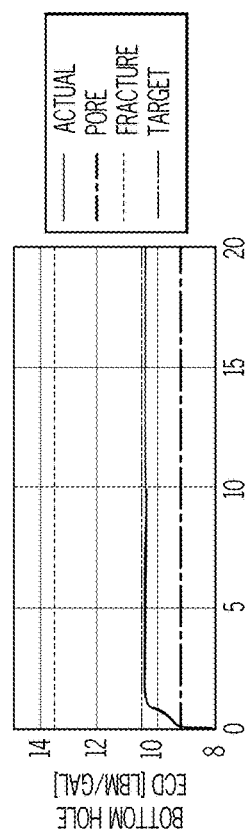
Figure 29D:
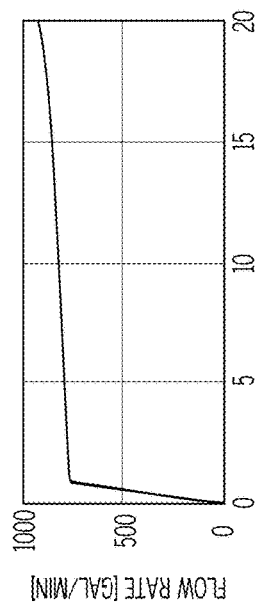
Figure 29E:
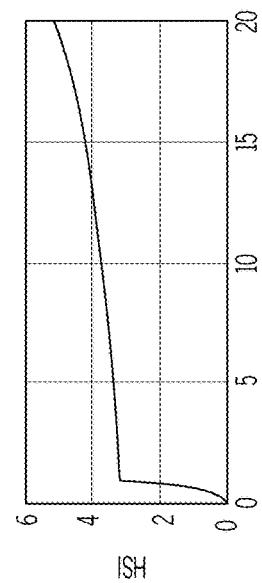
Figure 29F:
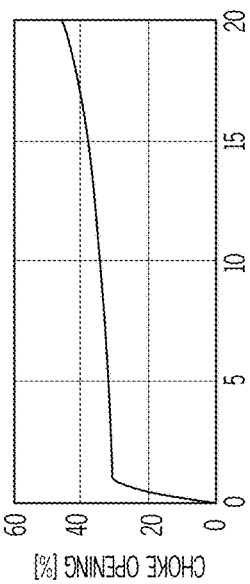
Figure 30A:
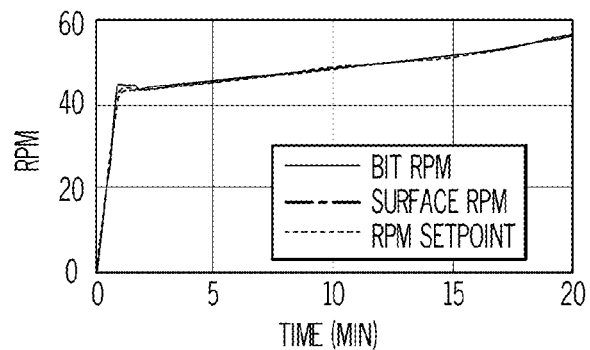
FIGS. 30A-30D illustrate the drilling inputs and outputs for controller 2C in accordance with an embodiment of the present invention.
Figure 30B:
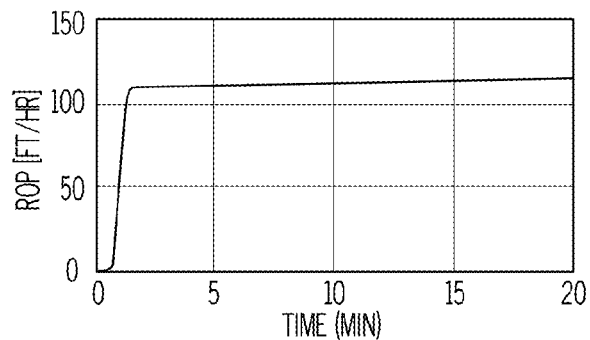
Figure 30C:
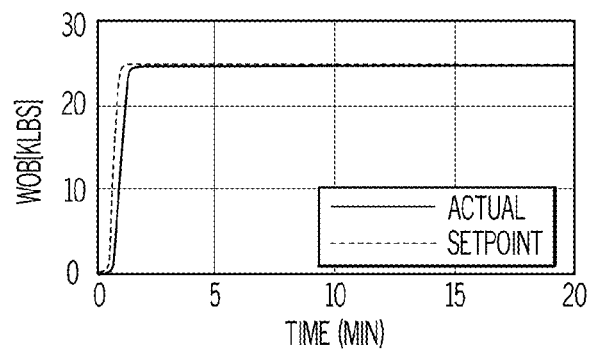
Figure 30D:
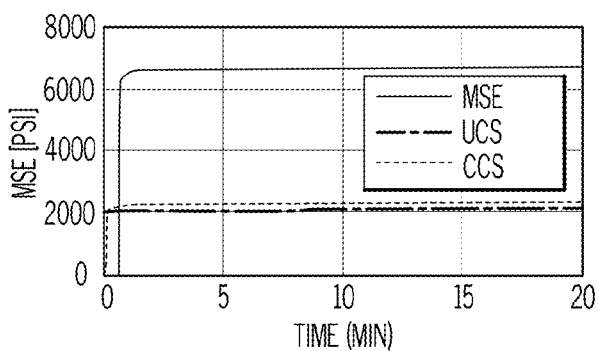

The look-up tables described in the previous section are now linked together. A diagram is presented in FIG. 17 that outlines how the BLUTs may be combined. FIG. 17 is high-level diagram showing how data is combined to arrive at pump rate and backpressure constraints in accordance with an embodiment of the present invention. Each of the boxes in FIG. 17 contain 5 pieces of information: the serial number of the LUT in the database, the number of parameters before the known parameters are applied, the known parameters, the number and names of parameters passed on to the next stage. FIG. 18 is a high-level diagram showing how data is combined to arrive at bit rpm and weight on bit constraints in accordance with an embodiment of the present invention. FIGS. 17 and 18 highlight the steps in this sequence, while FIGS. 19A-19H, 20A-20H, 21A-21B and 22A-22B show possible look up tables that can be generated using the sequence outlined above. FIGS. 19A-19H illustrate the constraints for controller design at 1,000 ft. measured depth, where the darker shaded regions represent allowable combinations of parameters, in accordance with an embodiment of the present invention. FIGS. 20A-20H illustrate the constraints for controller design at 2,000 ft. measured depth, where the darker shaded regions represent allowable combinations of parameters, in accordance with an embodiment of the present invention. FIGS. 21A-21B illustrate the Rate of Penetration look-up table at 1,000 ft., where the plot in FIG. 21A is before constraints are enforced and the plot in FIG. 21B is with the constraints, in accordance with an embodiment of the present invention. FIGS. 22A-22B illustrate the bottom-hole pressure look-up table at 1,000 ft., where the plot in FIG. 22A is before constraints are enforced and the plot in FIG. 22B is with the constraints, in accordance with an embodiment of the present invention.

Control Algorithm Design and Simulation Results

The plant on which the controllers are tested consists of ordinary differential equation models of hydraulics and drillstring torsional vibration. The dynamics are based on previously developed models developed coupled with steady-state Non-Newtonian fluid frictional pressure loss models, drillstring rotation effects on annular pressure and cuttings transport. Furthermore, a previously developed model was used for calculating the Rate of Penetration. Proportional-Integral (PI) control is used to track the set point values for back pressure and surface RPM. The initial setpoint values are ramped from zero over a period of one minute to simulate equipment start-up procedures. Weight on Bit is added after 30 seconds from the start of the simulation and then ramped to the setpoint value. All simulations start at a measured depth of 1,000 feet. The mud weight used in all the simulations in this section is 9 ppg while the desired Equivalent Circulating Density (ECD) is 10.5 ppg.

Controller 1

The first controller designed will be a naïve controller, which will compute the constraints and generate the allowable region for a given depth, then pick control variables in or close to the centroid of the allowable ranges. This will guarantee that even with unexpected transients, the operational constraints will not be exceeded.

Controller 2

The second controller will resort to optimization to achieve the desired performance while staying within the constraints. To generate the control setpoints, at every time instant, a set of performance metrics are evaluated for the following 90 feet drilled. These metrics can include one or more of the following: Rate of Penetration (ROP), Mechanical Specific Energy (MSE), Hydraulic Horsepower per Square Inch (HSI) and variation in bottom hole ECD. After scaling the metrics to yield similar order of magnitude, the resulting values can be combined into the following cost function, which can be minimized in order to find an optimal combination of control variables (note that some of the quantities, such as ROP, will be invert, since maximizing them is equivalent to minimizing their reciprocal):

$$J(u) = \sum_0^{90\,ft} [W_1 y_1 + W_2 y_2 + W_3 y_3 + W_4 y_4 + \Delta u^T V \Delta u]$$

where:

$$y_1 = \frac{ROP_{max}}{ROP}, y_2 = \frac{MSE}{MSE_{max}},$$

$$y_3 = \frac{HSI_{max}}{HSI}, y_4 = \left[\frac{\Delta ECD}{(\Delta ECD)_{max}}\right]^2,$$

$$u^T = [\text{Top Drive } RPM, \text{Weight on Bit,}$$

Pump Rate, *Backpressure*],

V is a matrix containing penalties for excessive variations in the control inputs (Δu) across the 90-feet interval, and $W_1$, $W_2$, $W_3$, $W_4$ are weights assigned to each of them to denote the relative importance of each metric at a particular point in the operation. For instance, a control law aimed at maximizing ROP irrespective of MSE and HSI will use a high value of $W_1$, while a controller aimed at keeping ECD at a constant value at all times will use a large $W_4$ while keeping the other weights small. These weights can be manually assigned by the driller or automatically adjusted by the system when instances of inefficient drilling are detected.

The cost function can be minimized through a numerical optimization technique or through a heuristic search in the solution space. The optimization problem can be mathematically formulated as:

$$\min_{u \in U} J(u) \text{ such that}$$
$$f_i(u) = 0, i = 1, \ldots, m$$
$$g_j(u) \leq 0, j = 1, \ldots, n$$

where $f_i(u)$ and $g_j(u)$ are constraints imposed to the control variables and U represents the set of possible values that the control variables can take. Since the cost function and constraints are nonlinear, solving the problem formulated requires nonlinear programming tools. The constrained minimization problem was solved using a commercial optimization toolbox. Simulation results are presented for three different controllers, which differ in the optimization objective and the selection of weights.

Controller 1 Simulation Results

The naïve controller is simulated with the following setpoints: surface rotation rate of 125 rev/min, Weight on Bit of 25 klbs, pump rate of 200 strokes/min (782 gal/min) and 100 psi backpressure. The initial values were ramped from zero to the reference value over one minute. FIGS. 23A-23F illustrate the hydraulics inputs and outputs for controller 1 in accordance with an embodiment of the present invention. FIGS. 24A-24D illustrate the drilling inputs and outputs for controller 1 in accordance with an embodiment of the present invention.

Controller 2A Simulation Results

The objective of this controller is to maximize ROP and HSI while keeping WOB to a constant setpoint and varying the RPM and pump rate. The backpressure is kept at atmospheric conditions. The cost function uses the following weights:

$$W_1 = 0.9,$$
$$W_2 = 0.1,$$
$$W_3 = W_4 = 0,$$
$$V = \begin{bmatrix} 10^{-2} & 0 & 0 & 0 \\ 0 & 0 & 0 & 0 \\ 0 & 0 & 10^{-2} & 0 \\ 0 & 0 & 0 & 0 \end{bmatrix}$$

FIGS. 25A-25F illustrate the hydraulics inputs and outputs for controller 2A in accordance with an embodiment of the present invention. FIGS. 26A-26D illustrate drilling inputs and outputs for controller 2A in accordance with an embodiment of the present invention.

Controller 2B Simulation Results

The objective of this controller is to minimize MSE and maximize HSI for a setpoint ROP value. RPM, WOB and pump SPM are allowed to vary, while the backpressure is again kept at atmospheric conditions. The cost function weights are:

$$W_1 = W_4 = 0,$$
$$W_2 = 0.9,$$
$$W_3 = 0.1;$$
$$V = \begin{bmatrix} 10^{-2} & 0 & 0 & 0 \\ 0 & 10^{-3} & 0 & 0 \\ 0 & 0 & 10^{-4} & 0 \\ 0 & 0 & 0 & 0 \end{bmatrix}$$

FIGS. 27A-27F illustrate the hydraulics inputs and outputs for controller 2B in accordance with an embodiment of the present invention. FIGS. 28A-28D illustrate the drilling inputs and outputs for controller 2B in accordance with an embodiment of the present invention.

Controller 2C Simulation Results

The objective of this controller is to maximize ROP and HSI, and keep the ECD as close to the target value as possible using both the pump rate and backpressure. RPM is allowed to vary while WOB is kept constant. The cost function weights are:

$$W_1 = 0.5,$$
$$W_2 = 0,$$
$$W_3 = 0.2,$$
$$W_4 = 0.3,$$
$$V = \begin{bmatrix} 10^{-2} & 0 & 0 & 0 \\ 0 & 0 & 0 & 0 \\ 0 & 0 & 10^{-3} & 0 \\ 0 & 0 & 0 & 10^{-4} \end{bmatrix}$$

FIGS. 29A-29F illustrate the hydraulics inputs and outputs for controller 2C in accordance with an embodiment of the present invention. FIGS. 30A-30D illustrate the drilling inputs and outputs for controller 2C in accordance with an embodiment of the present invention.

Discussion of Results

The naïve controller achieved a high ROP value, but the other performance metrics were far from optimal. The optimal controllers show good performance with respect to the objective they were tasked with and were overall superior to the naïve controller. Controller 2A achieved the highest ROP, at the expense of a larger MSE value which can be detrimental in the long term. Controllers 2A and 2B performed better in terms of HSI maximization than controller 2C, since the latter had to trade-off hydraulics optimization for downhole pressure management. Controller 2B minimized the MSE while still keeping an optimal HSI value of 7 for most of the run. In assessing MSE optimization, values of Unconfined Compressive Strength (UCS) and Confined Compressive Strength (CCS) are also observed.

Since CCS depends on the overbalance, drilling with downhole ECD closer to the pore pressure gradient will lead to lower MSE values, and consequently, higher ROP.

All controllers managed to avoid the onset of stick-slip and the bit RPM closely followed the RPM prescribed on the surface. As the drillstring is being extended, the operational envelope for stick-slip avoidance will reduce, and the system will adjust the setpoints accordingly. It is also worth noting that, while controllers 2A and 2B yielded acceptable ECD values with a choke setpoint on the order of atmospheric pressure, this value will not be enough at higher depths. Since pump rate is limited by pump performance and hole cleaning considerations, the change in backpressure needs to be coordinated with the change in pump rate. For the setpoint generator to effectively achieve this, higher weight must be placed on the pressure management term of the objective function, and the operation will have to carry on with ROP, MSE or HSI values that might be deemed sub-optimal in a different context. Visualization of the control input trajectories overlaid on the constraints plots (FIGS. 19 and 20) may serve to reassure the driller or the system operator that valid parameter combinations are being selected at all times.

Application to Pipe Tripping

Many of the problems that account for major downtimes during the drilling process occur when the drillstring is being tripped in/out of the hole. These issues typically arise from the BHA/drill pipe getting stuck inside the hole or kick or lost circulation due to surge and swab effects. Therefore, a tripping operation requires careful attention of the driller to avoid costly down time. Another important issue is the effective detection of such occurrences. Not only is it difficult to prevent the occurrence of such events, but also it is equally difficult to detect a kick or a loss after it has started and delay in taking appropriate actions can result in disastrous consequences. Hence, an automated tripping system is potentially beneficial if it can eliminate the chance of such events happening while also optimizing for maximum tripping speeds to complete the drilling process as effectively as possible.

Control Variable

During a tripping operation, the main variables that are controlled are the acceleration/deceleration and the velocity of the drill string. The acceleration will primarily depend on the torque applied by the draw-works and the velocity depends on the duration of the applied torque.

Known Information

For this scenario, the variables below are assumed to be known information:

Real-time depth position of the drillstring
BHA/drillstring configuration details
Mud properties
Draw-works performance specifications
Set of Base Look-up Tables (BLUTs)

Before the controller can be designed, one needs to collect all the LUTs used to build it. The following is a list of LUTS that are used to build a controller for a tripping out operation.

BLUT 6: LUT relating pore pressure to depth. This data is usually obtained from offset wells and seismic tests. The operator usually owns this information.

BLUT 7: LUT of fracture pressure vs. depth. This data is also obtained from offset wells. Formation integrity tests are often used to update this table.

BLUT 18: LUT of hydrostatic pressure as function of depth. This data is calculated from the mud weight being used at a certain depth. A plot of hydrostatic pressure, pore pressure and fracture pressure vs. depth is available in FIG. 31A. FIGS. 31A-31D illustrate the base look-up tables 18 through 21 in accordance with an embodiment of the present invention.

BLUT 19: LUT of change in pressure vs drillstring velocity and drillstring acceleration. This BLUT is obtained by performing simulations for a range of velocity/accelerations using a transient hydraulics model. This plot is available in FIG. 31B.

BLUT 20: LUT of draw-works force capability versus drillstring velocity. This information is obtained from the draw-works manufacturer. A performance plot of a typical draw-works is available in FIG. 31C.

BLUT 21: LUT of drill string velocity as a function of initial drill string velocity and force. This LUT is obtained by performing simulations using a mechanical model of the tripping operation. The results are available in FIG. 31D.

Combining Base LUTs to Obtain Control Relevant Derived LUTs

Figure 32:
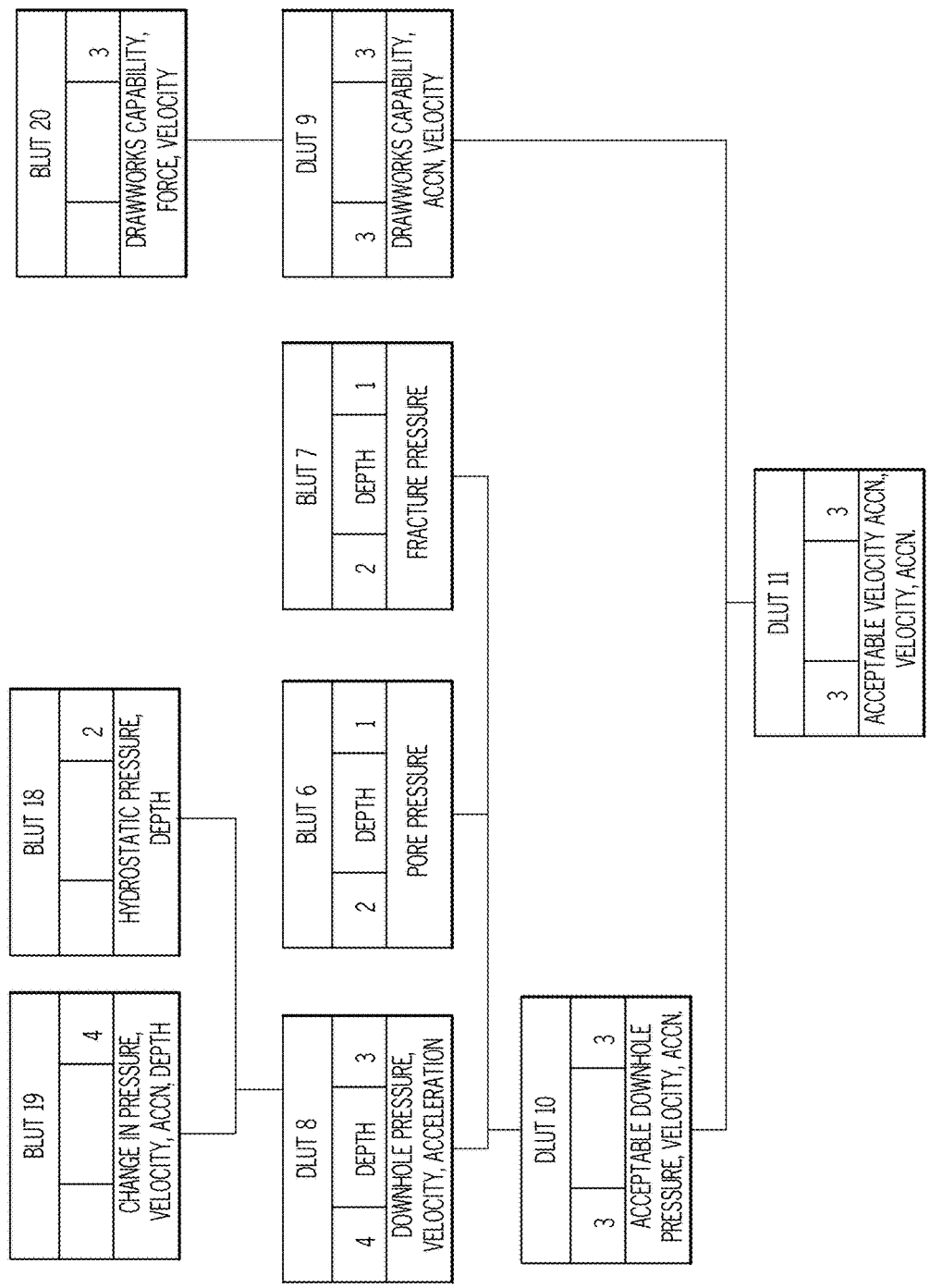
FIG. 32 is a diagram illustrating how data is combined to arrive at the pipe tripping operating region look-up table in accordance with an embodiment of the present invention.
Figure 33A:
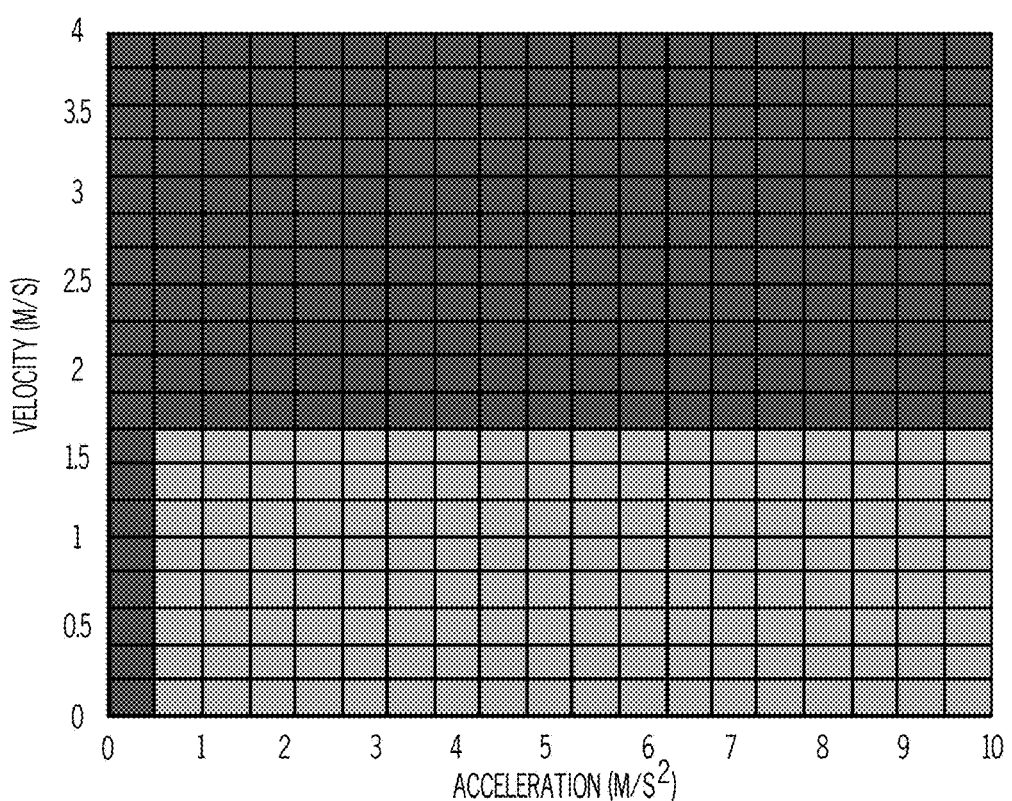
FIGS. 33A-33B illustrate the operating region look-up tables for the pipe tripping operation, where the darker shaded region represents the operating region, in accordance with an embodiment of the present invention.
Figure 33B:
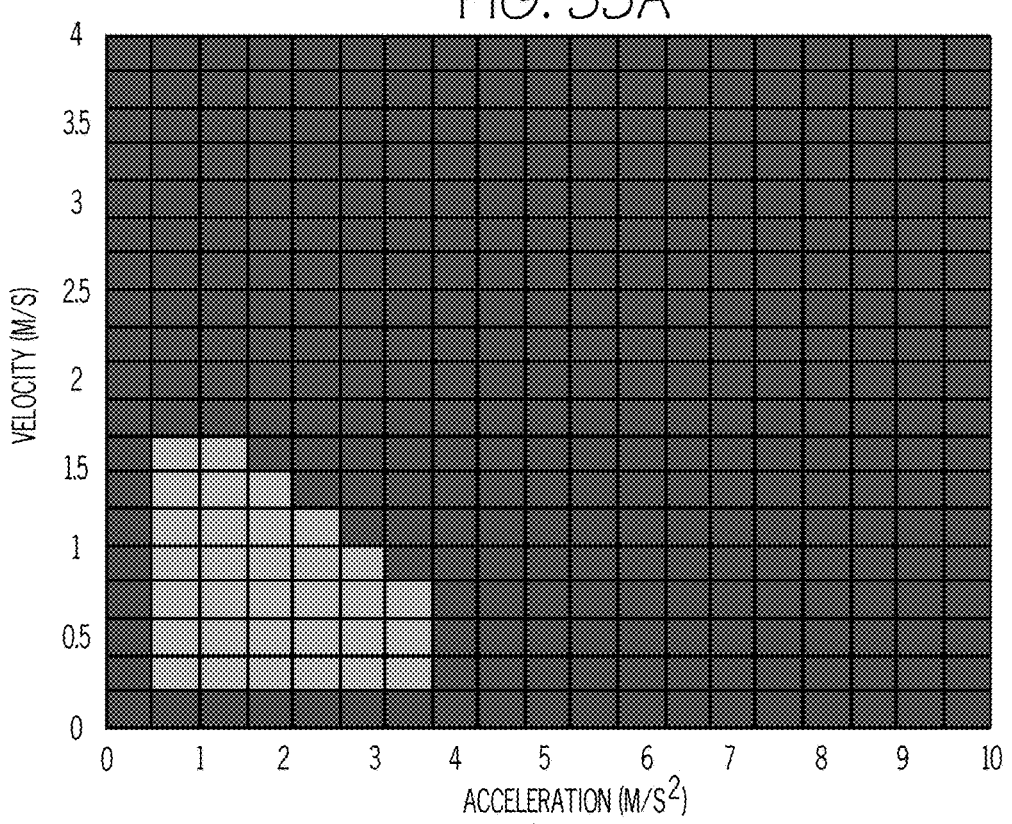

The BLUTs described above need to be combined to obtain the LUTs that may be readily used by the control algorithm designer. FIG. 32 is a diagram illustrating how data is combined to arrive at pipe tripping operating region look-up table in accordance with an embodiment of the present invention. In particular, FIG. 32 outlines how the BLUTs may be combined. First, BLUTs 6, 7, 18 and 19 are combined in order to define an operating region for drillstring velocity and acceleration only in terms of pressure constraints. Next, the draw-works limits are converted into an operating region in terms of velocity and acceleration using the mechanical model and then enforced on the pressure operating region. Combining these LUTs in the order presented lead to the operating region LUTs that are visually represented in FIGS. 33A-33B. FIGS. 33A-33B illustrate the operating region look-up tables for pipe tripping operation, where the darker shaded region represents the operating region, in accordance with an embodiment of the present invention. The operating region on the plot of FIG. 33A represents the allowable combinations of velocity and acceleration that will stay within the pressure limits only and the plot of FIG. 33B demonstrates the allowable velocity/acceleration combinations that will satisfy both the pressure constraints as well as the draw-works limits.

Control Algorithm Design and Simulation Results

Figure 31A:
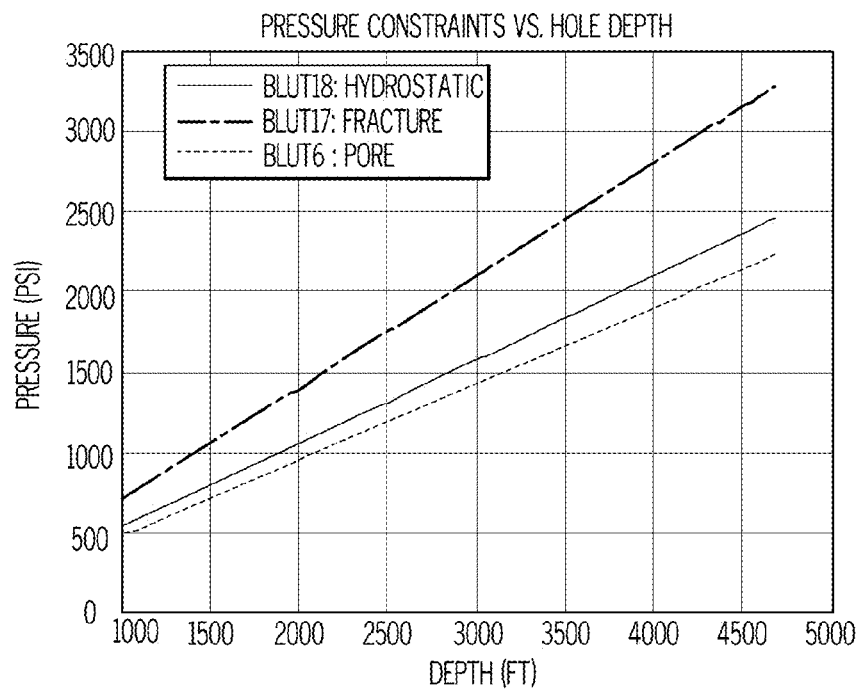
FIGS. 31A-31D illustrates the base look-up tables 18 through 21 in accordance with an embodiment of the present invention.
Figure 31B:
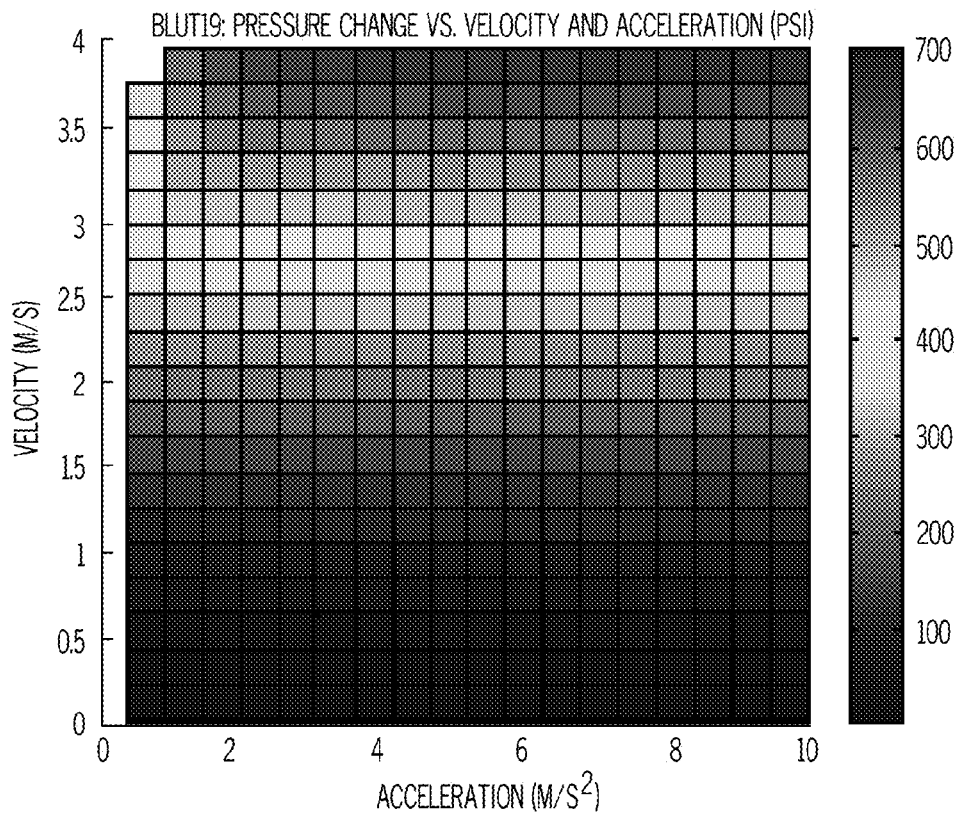
Figure 31C:
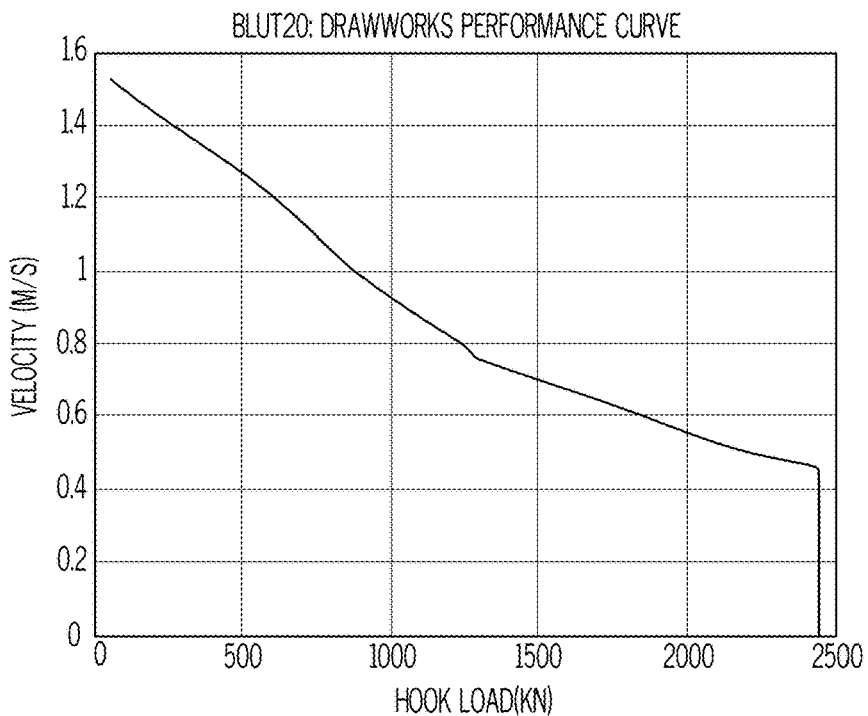
Figure 31D:
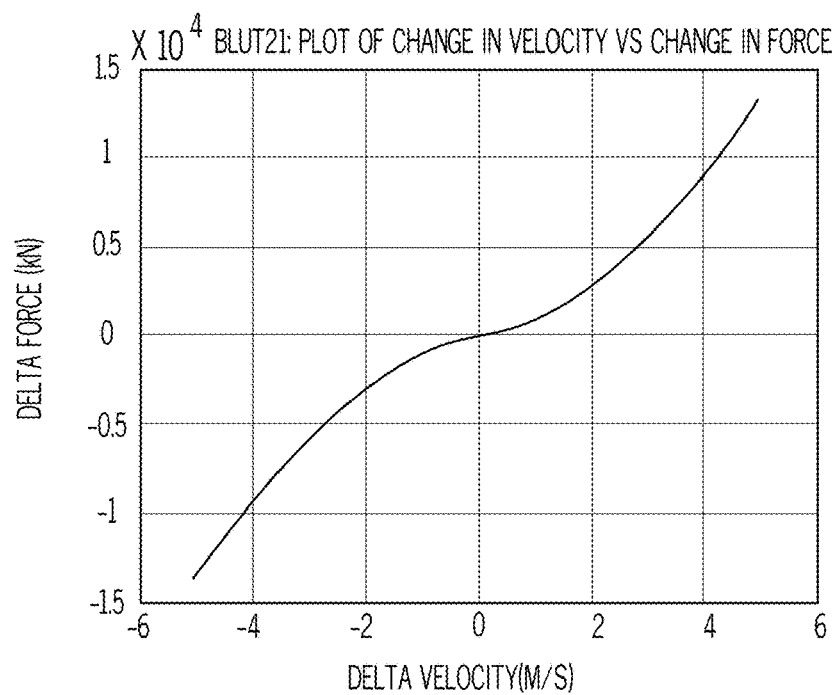
Figure 34A:
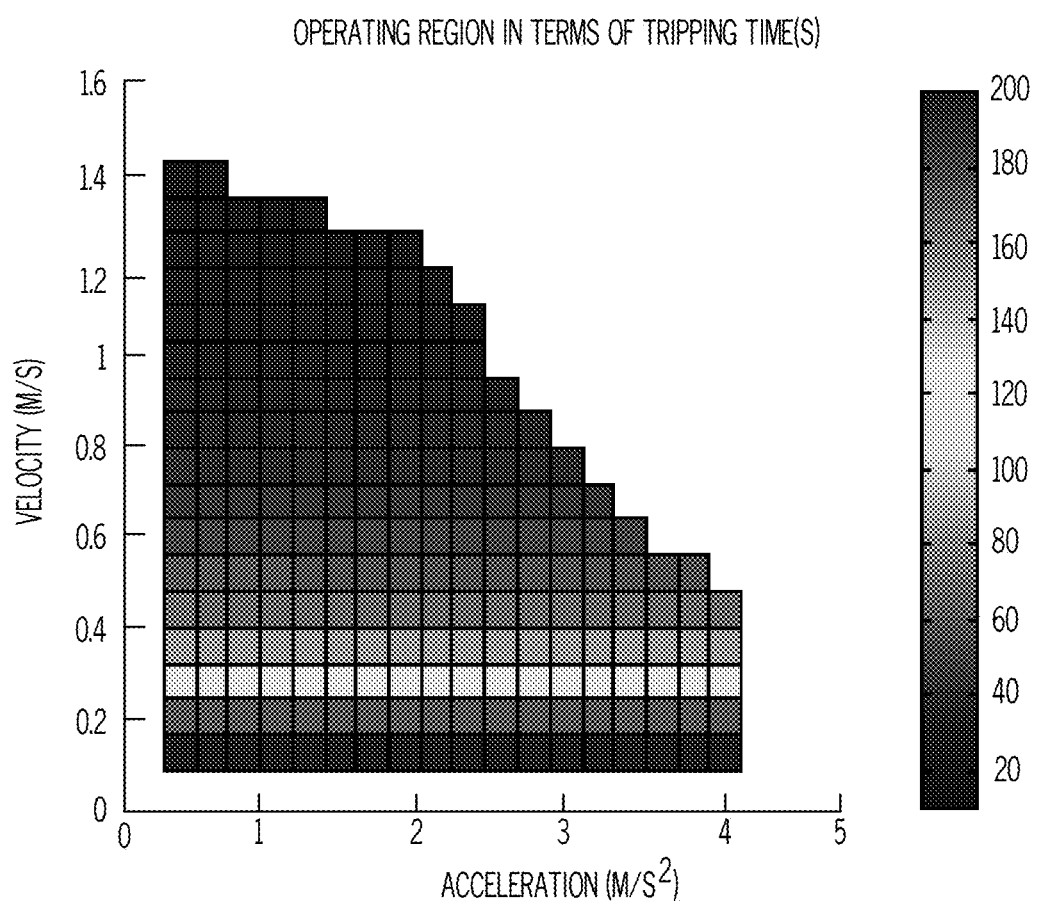
FIGS. 34A-34C illustrate the tripping operating region for various controller objectives in accordance with an embodiment of the present invention.
Figure 34B:
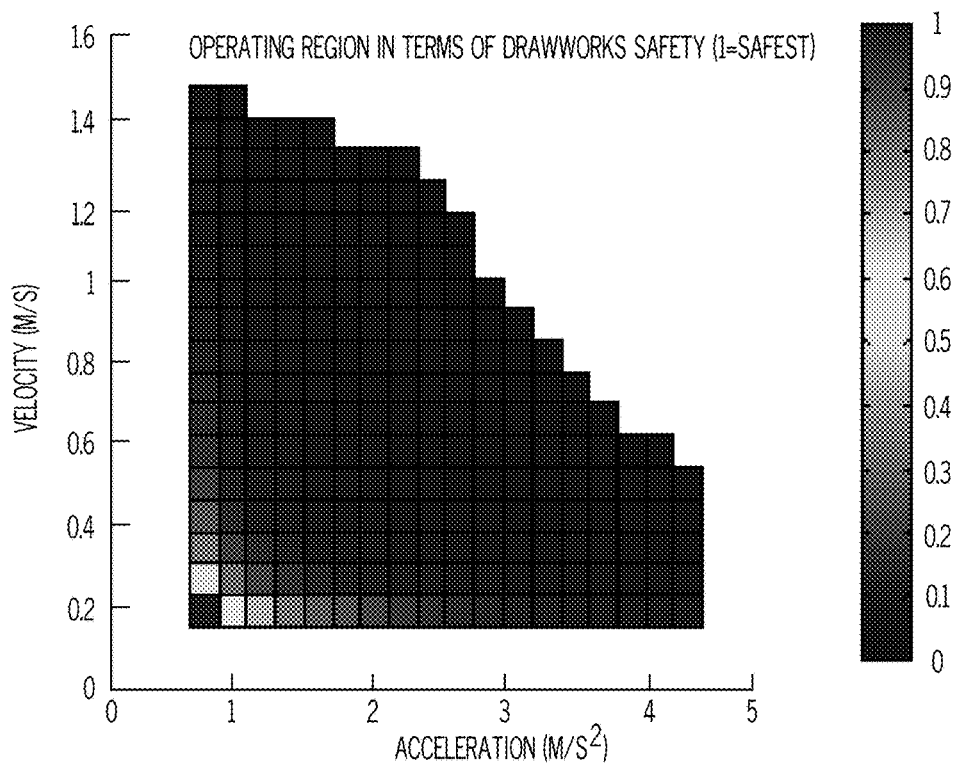
Figure 34C:
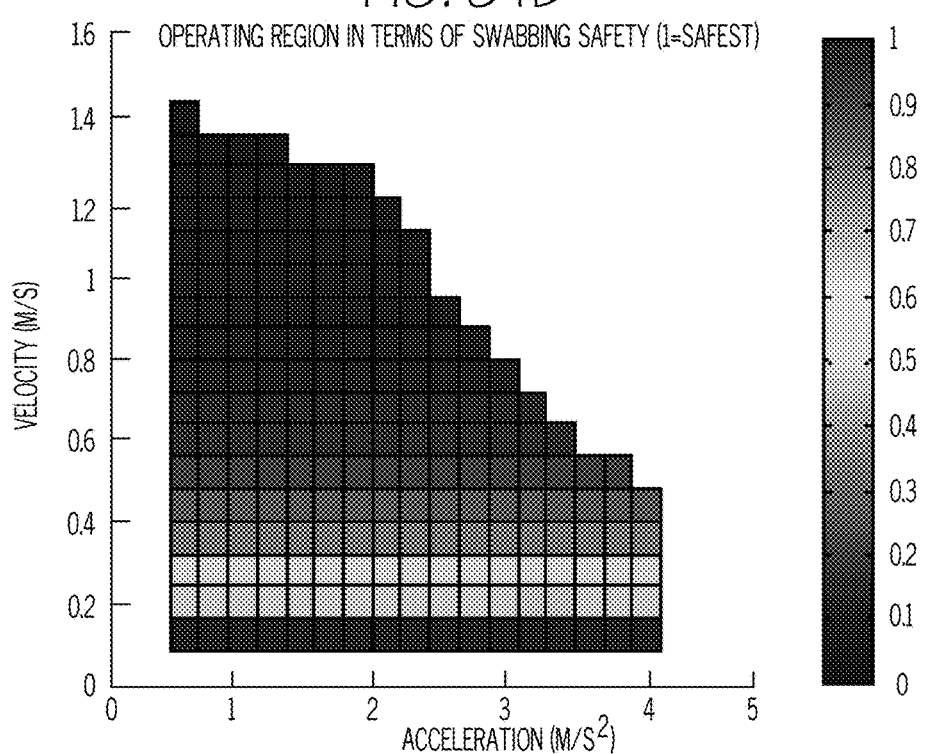
Figure 35A:
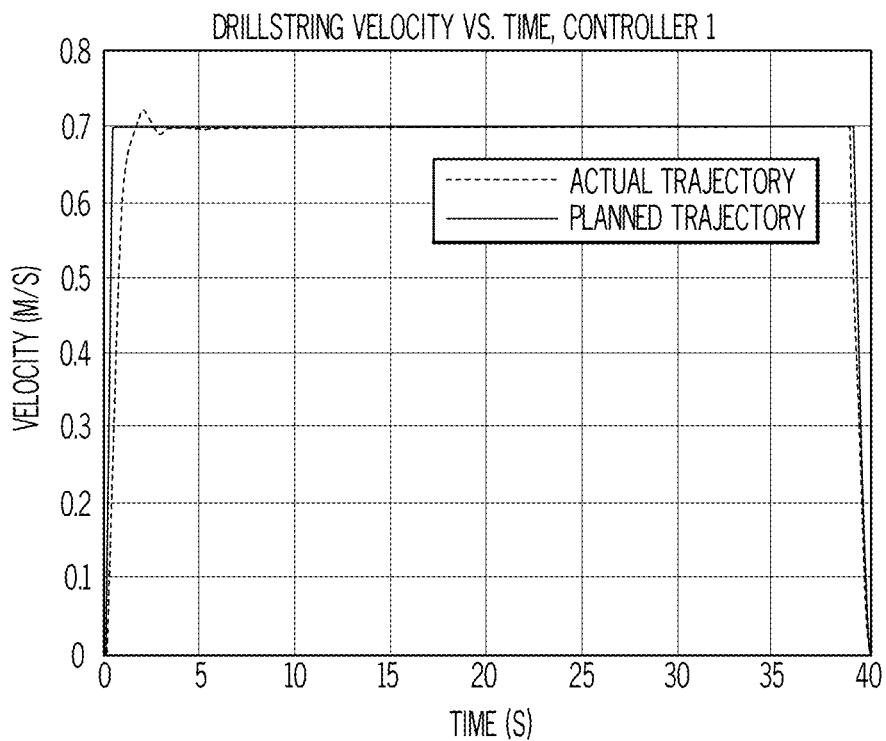
FIGS. 35A-35D illustrate the simulation results for controller 1 with no optimization objective in accordance with an embodiment of the present invention.
Figure 35B:
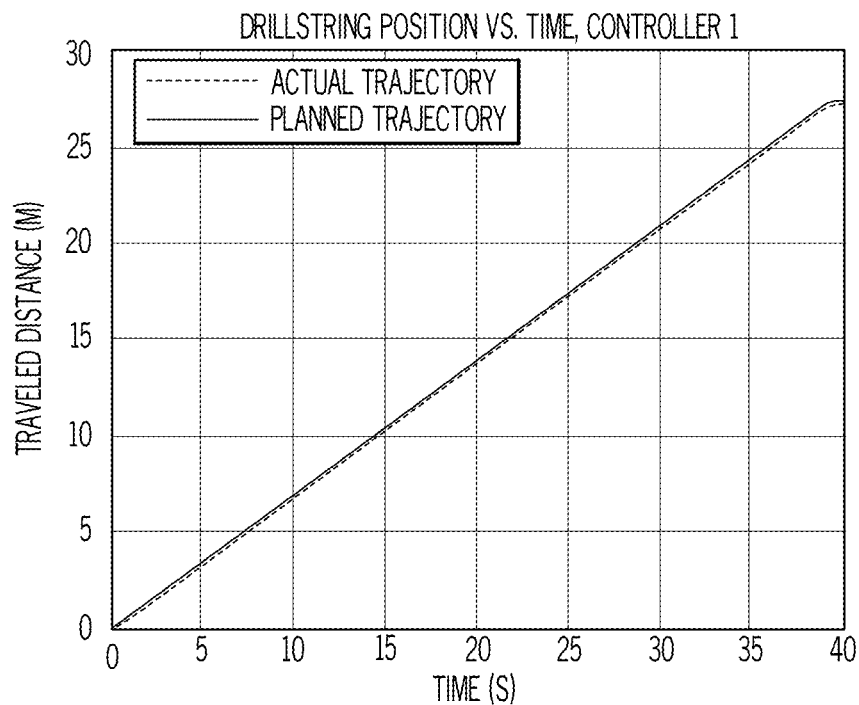
Figure 35C:
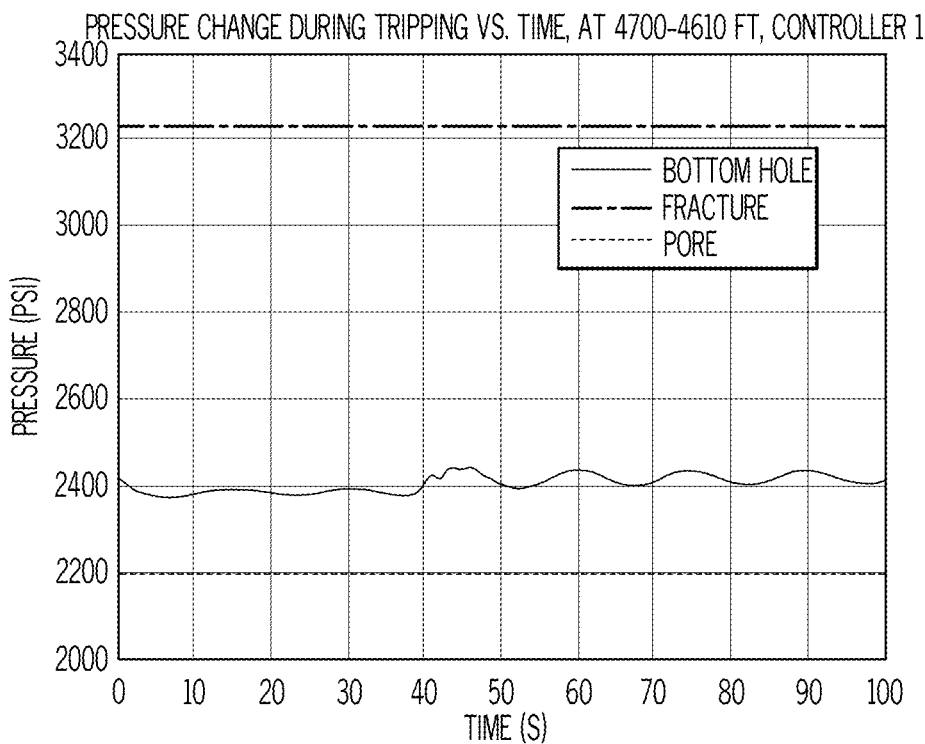
Figure 35D:
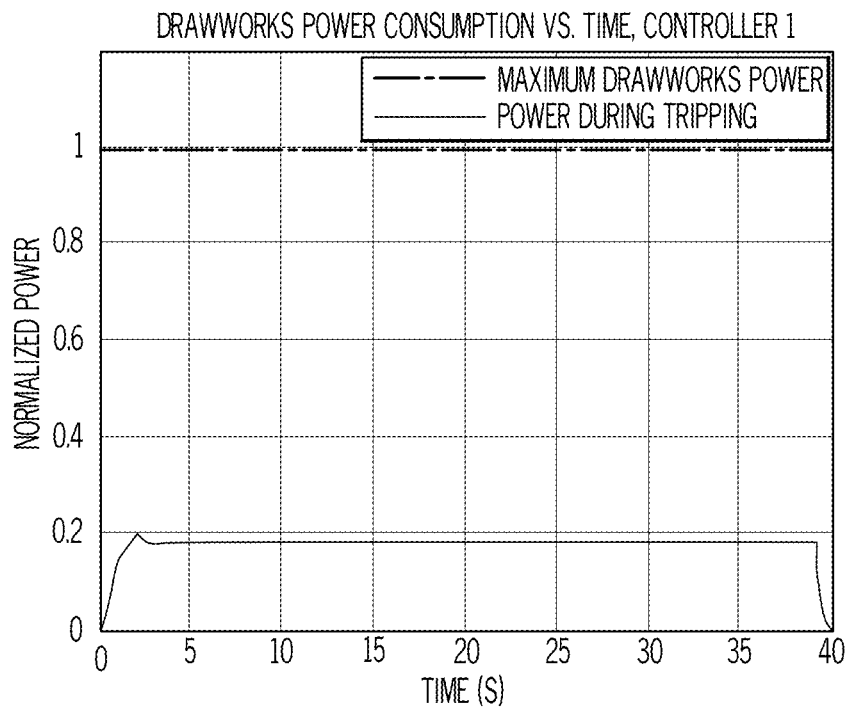

There are two critical pieces of information that will be provided to the control system designers so that they may proceed to design the controller: the operating region LUT and the system dynamics LUT. The following briefly outlines how a potential controller can be designed using such information. To begin with, the operating region obtained in FIGS. 33A-33B is evaluated in terms of three different controller objectives: tripping time, operation safety with regards to swabbing pressure and operation safety with regards to draw-works limits. Using the three regions presented in FIGS. 34A-34C, the controller can define an optimization objective and select the appropriate velocity/acceleration combination for the 90 ft. tripping operation. FIGS. 34A-34C illustrate the tripping operating region for various controller objectives in accordance with an embodiment of the present invention. To achieve the optimization task, the controller assigns a weight to each of the objectives and then searches for the optimum combination in the combined solution space. The objective weights are defined as follows:

$W_P$=Swabbing Pressure Safety
$W_V$=Minimum Tripping Time
$W_D$=Drawworks Power Safety During the real-time operation, the controller uses BLUT 21 in FIG. 31D in order to determine the input to the draw-works. The controller refines this input and the planned trajectory every second based on the real-time feedback of drillstring velocity and position.

Controller 1

This naive controller does not perform any optimization. It simply selects the centroid of the operating region to perform the tripping operation.

$$v = 0.7 \frac{m}{s}, a = 1.5 \frac{m}{s^2}$$

FIGS. 35A-35D illustrate the simulation results for controller 1 with no optimization objective in accordance with an embodiment of the present invention.

Controller 2

The goal of this controller is to optimize for both swabbing pressure safety and draw-works power safety. The selected objective weights in this case are:

$$W_P = 0.3, W_V = 0.1, W_D = 0.6$$

Figure 36:
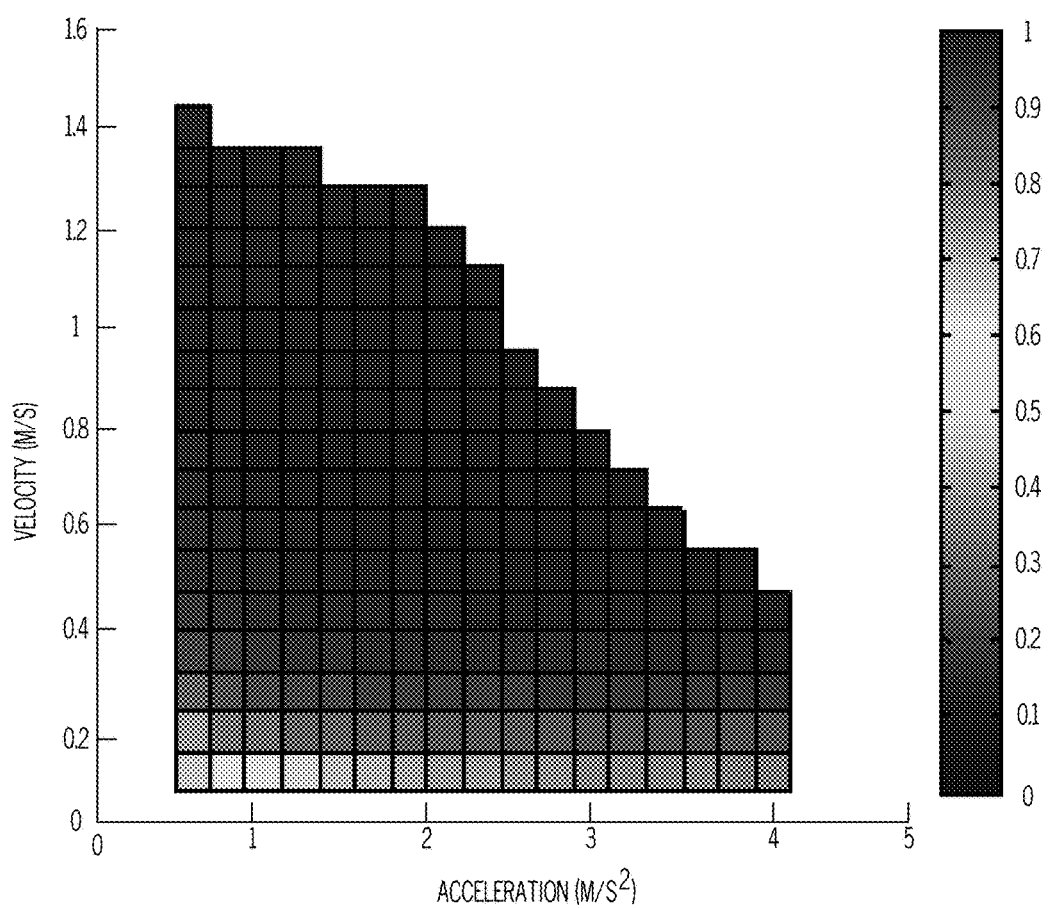
FIG. 36 illustrates the refined solution space for the controller 2 objective in accordance with an embodiment of the present invention.
Figure 37A:
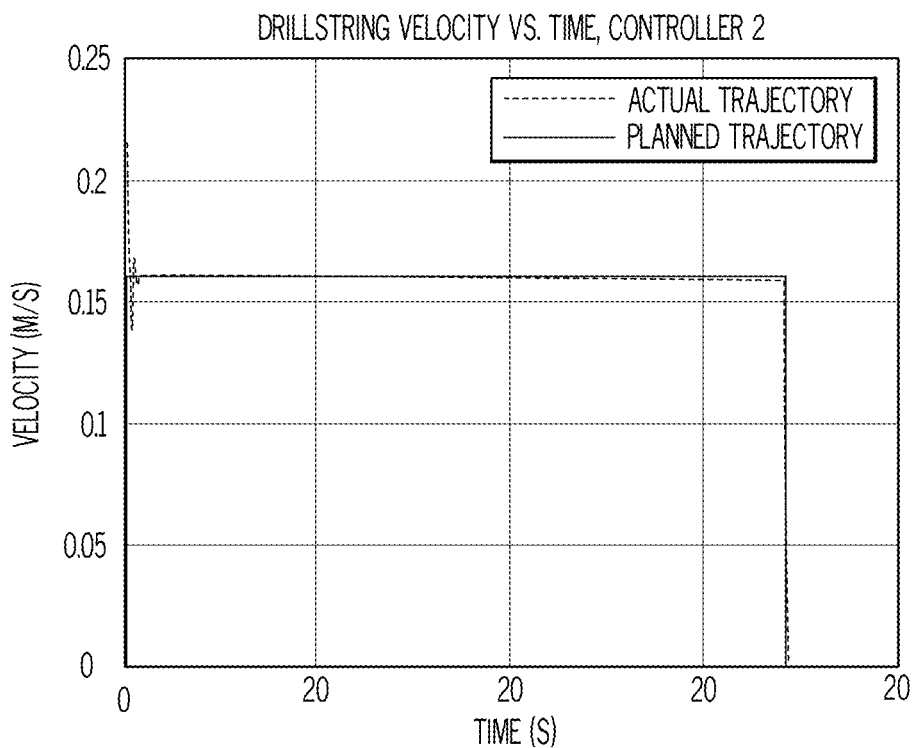
FIGS. 37A-37D illustrate the simulation results for controller 2 with the goal of optimizing for swabbing pressure safety and draw-works performance in accordance with an embodiment of the present invention.
Figure 37B:
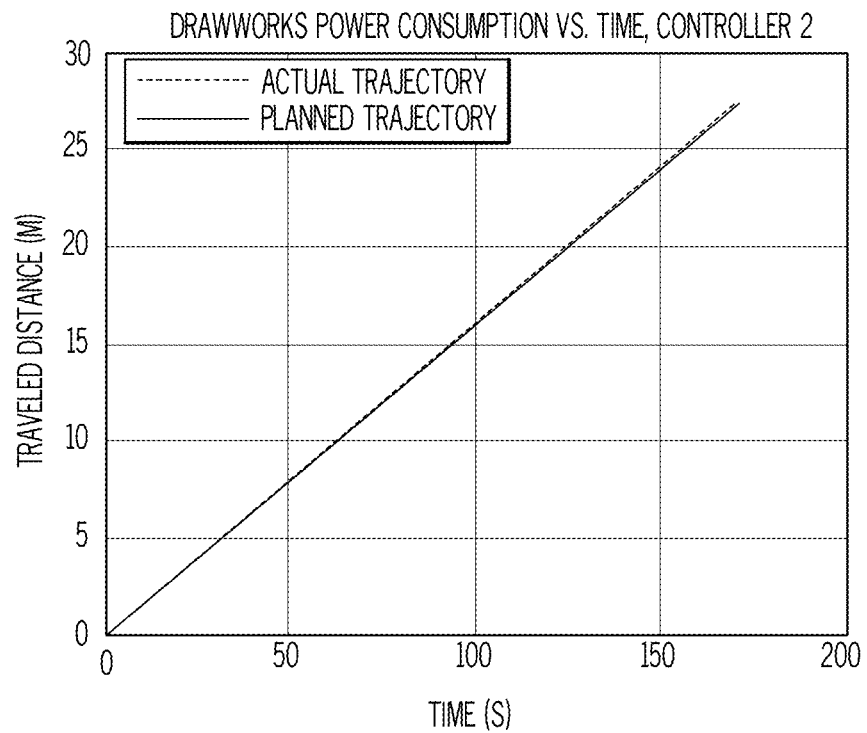
Figure 37C:
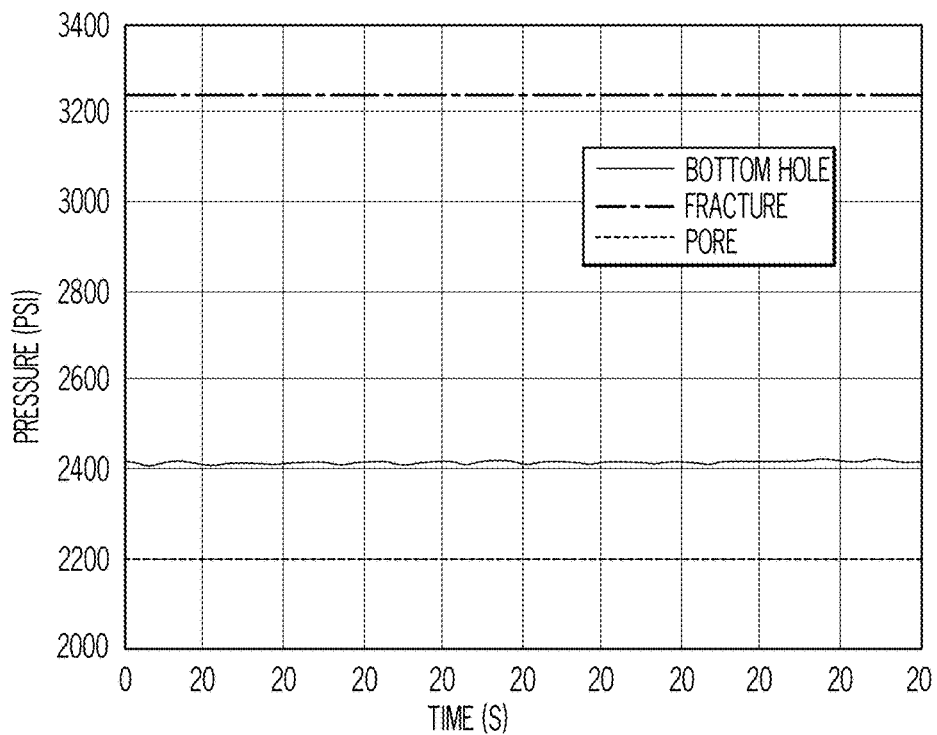
Figure 37D:
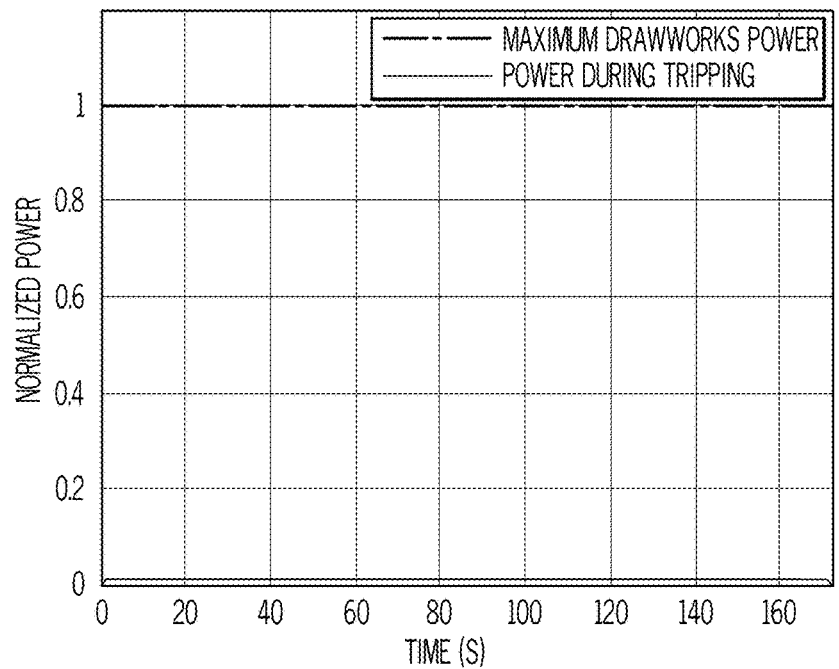

The refined operating region for this controller objective is shown in FIG. 36. FIG. 36 illustrates the refined solution space for the controller 2 objective in accordance with an embodiment of the present invention. The selected velocity/acceleration combination based on this objective becomes:

$$v = 0.16 \frac{m}{s}, a = 0.75 \frac{m}{s^2}$$

FIGS. 37A-37D illustrate the simulation results for controller 2 with the goal of optimizing for swabbing pressure safety and draw-works performance in accordance with an embodiment of the present invention.

Controller 3

The goal of this controller is to optimize for a fast tripping operation while staying within the constraints. Swabbing pressure safety and draw-works power safety are not the main objectives of this controller. The selected objective weights in this case are:

$$W_P = 0.3, W_V = 0.7, W_D = 0$$

Figure 38:
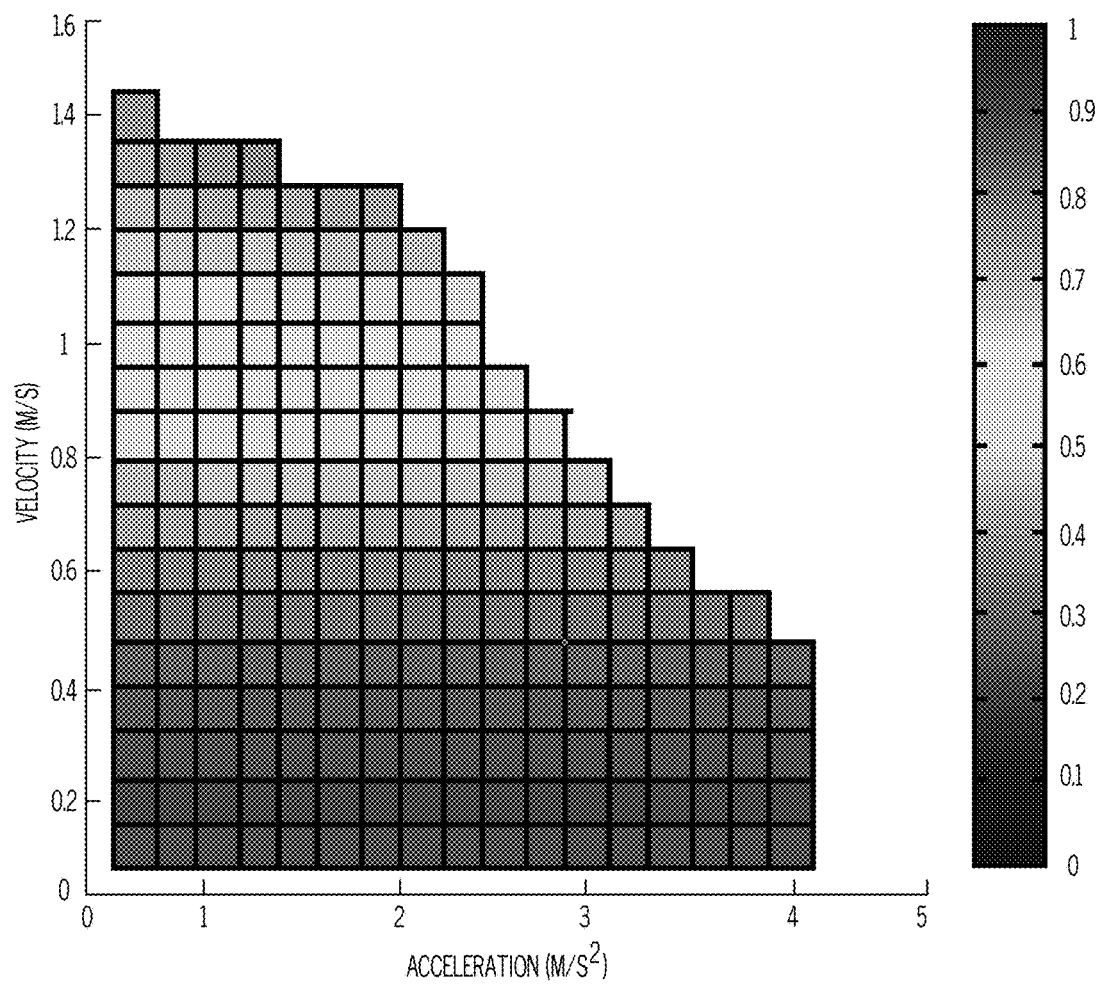
FIG. 38 illustrates the refined solution space for the controller 3 objective in accordance with an embodiment of the present invention.
Figure 39A:
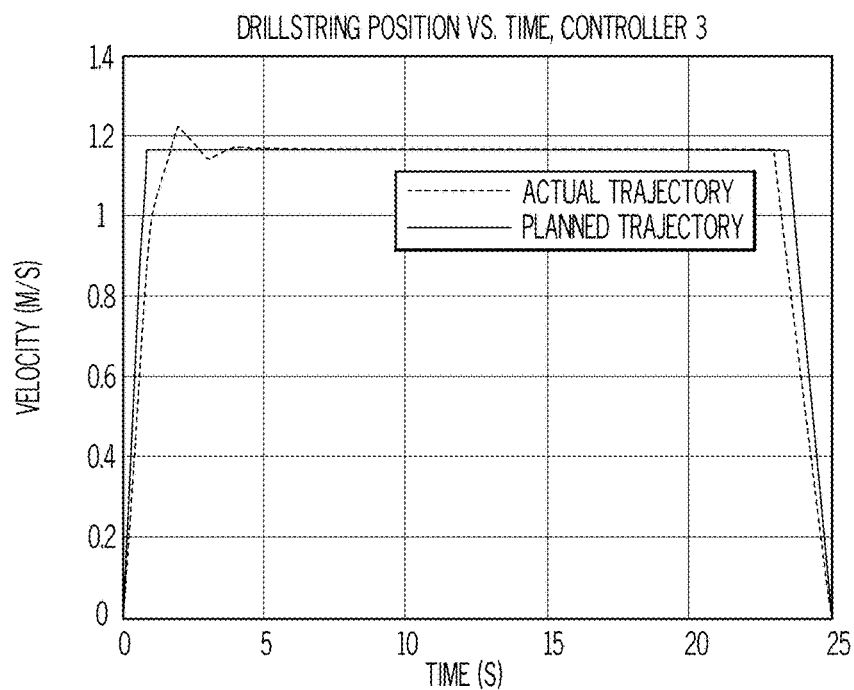
FIGS. 39A-39D illustrate the simulation results for controller 3 with the goal of optimizing for shortest tripping time while staying within the constraints in accordance with an embodiment of the present invention.
Figure 39B:
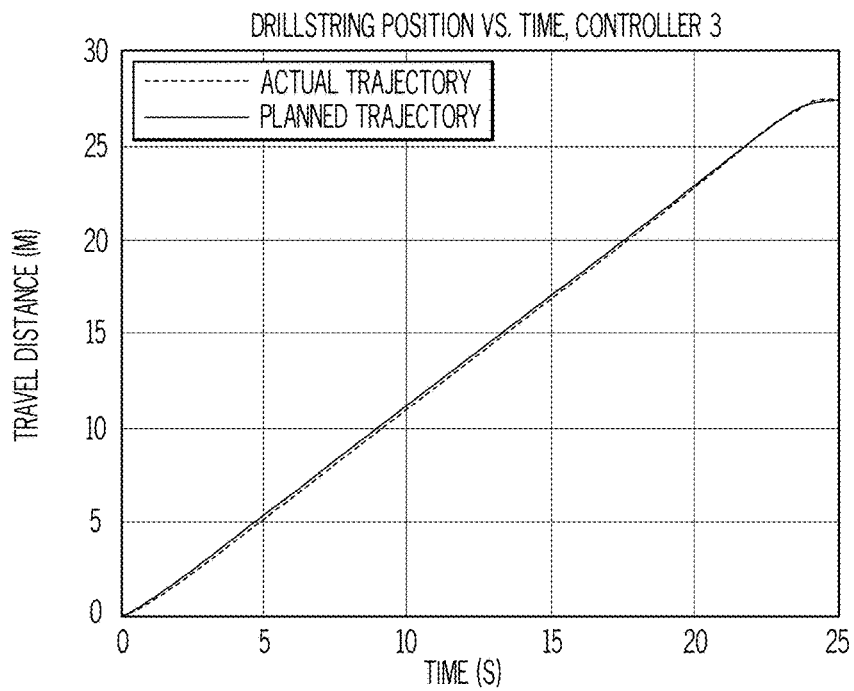
Figure 39C:
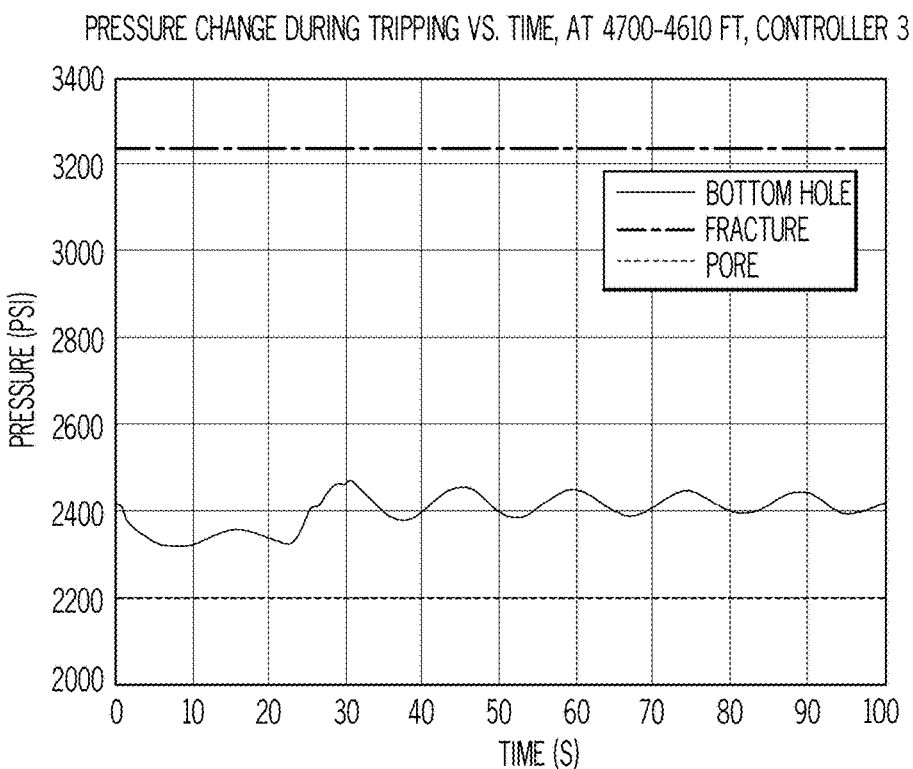
Figure 39D:
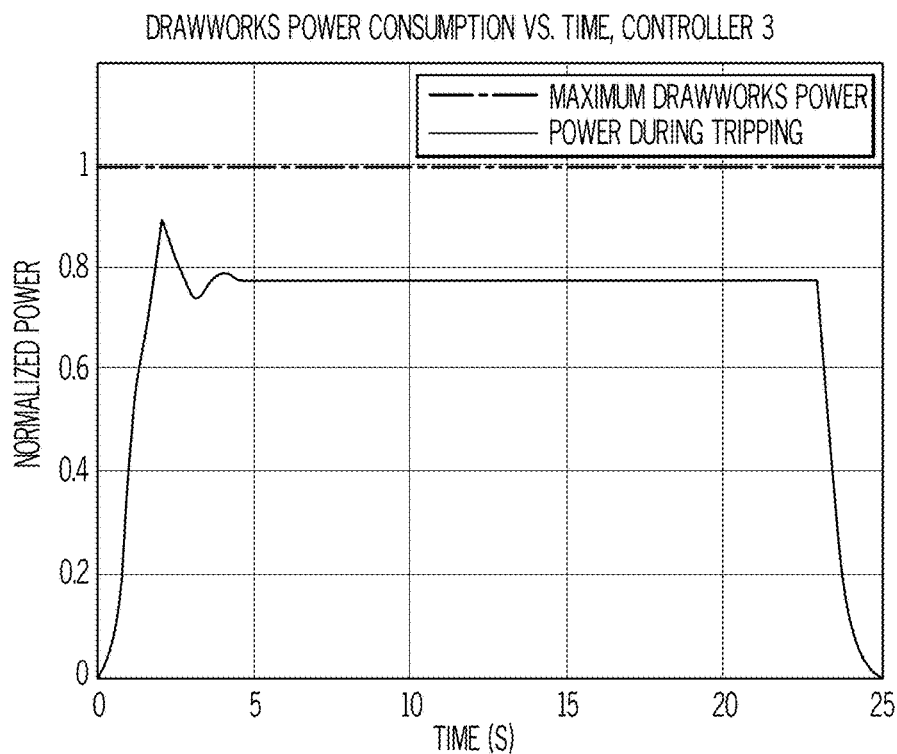

The refined operating region for this controller objective is shown in FIG. 38. FIG. 38 illustrates the refined solution space for the controller 3 objective in accordance with an embodiment of the present invention. The selected velocity/acceleration combination based on this objective becomes:

$$v = 1.17 \frac{m}{s}, a = 1.28 \frac{m}{s^2}$$

FIGS. 39A-39D illustrate the simulation results for controller 3 with the goal of optimizing for shortest tripping time while staying within the constraints in accordance with an embodiment of the present invention.

Discussion of Results

The simulation results presented in FIGS. 35, 37 and 39 conform well to each controller's main objective. In the case of the naïve controller, the operation occurs without any specific objective while staying within the main operating region. Controller 2 aimed at minimizing swabbing pressures and staying away from the draw-works' maximum power curve. As shown in FIGS. 37A-37D, this controller takes 175 seconds to complete the 90 ft. tripping distance. In the case of controller 3, the main optimization objective was to minimize tripping time while remaining within the main constraints. As seen in FIGS. 39A-39D, the controller is capable of completing the tripping distance of 90 ft. in 25 seconds. As expected, the controller gets relatively close to the draw-works maximum available power and causes higher swabbing pressures than controller 2.

Conclusions

Automation has long promised increased efficiency and safety, and it certainly shows the potential to deliver these. However, industry progress and results have been often been isolated and disconnected. As discussed herein, some of the main barriers to the broad adoption of automation were identified. As further discussed herein, using the data sharing construct (CPDs/CPTs) and control architecture of the present invention would potentially make automating drilling tasks more amenable. Some key features of the methodology are:

- The person in charge of working with the automated system (typically, the driller) needs to be able to understand how the computer chooses the set points. Until such time that automated systems are reliable to a very high degree, this is a necessity for this person to be able to trust the automated system. Hence simpler "close to optimal" solutions that the driller understands should be preferred over complex, truly optimal solutions. The methodology presented here enables this approach.
- The methodology described here is very amenable to integrating complex data from various sources. LUTs are universal, easy to display, interpret, validate and troubleshoot. When uncertainty-related information is available, it can be stored as CPDs/CPTs, from which the relevant LUTs can be extracted easily in real-time. The methodology was demonstrated on two distinct automation tasks. These two tasks shared some of the BLUTs. This demonstrated the modular nature of this architecture wherein BLUTs once added to the database can be used in multiple tasks.
- Data-aggregation is key to automation, and CPDs/CPTs provide an elegant and practical means to that end.
- The architecture presented herein does not require replacing existing sensors with sophisticated sensors (although in the end this may be highly desirable). It is understood that such replacement may not be practical in the vast majority of the land-based rigs for economic reasons. There is a built-in mechanism within this architecture to handle uncertainty. This makes the approach more amenable to rapid and widespread use, even for the existing set of rig sensors.
- It is envisioned that the automation algorithms to eventually become the responsibility of the operator (much like a well plan), built with support from the service providers and the rig contractors, on whose equipment the controller will run. These algorithms should be built during the well planning process by an integrated automation team with the active involvement of all stakeholders. This is enabled here by the separation of domain expertise from control algorithm design.
- The operator may require the service providers, the contractors, the equipment manufactures and other to share data in a CPD/CPT/LUT format. The data providers do not compromise their proprietary know-how by disclosing information in this format, and this helps them maintain their competitive edge. There will, however, need to be accountability for data quality and reliability. The probabilistic approach suggested herein enables this. The control architecture is implementable in a software platform that allows the engineers in the operator company to use visual programming techniques to implement and simulate their control law. Such software may be made available by the service providers for the operator.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for utilizing look-up tables representing all models in an automation control architecture to independently handle uncertainties in sensed data, the method comprising:
    storing data in a form of conditional probability tables or conditional probability distributions, wherein said data comes from all the following sources: an operator, a service provider, a drilling contractor and an equipment manufacturer, wherein said data from said operator comprises information regarding well planning and construction, wherein said data from said service provider comprises data from surface sensors and downhole telemetry tools, wherein said data from said drilling contractor comprises data regarding a working condition of rig equipment, wherein said data from said equipment manufacturer comprises data regarding equipment performance characteristics, wherein said conditional probability tables are matrices or multi-dimensional arrays that represent probabilistic relationships between various drilling parameters, wherein said conditional probability distributions are continuous variants of said conditional probability tables;
    receiving models of a drilling process comprising the following domains: wellbore hydraulics, drill bit/rock interactions, rock/fluid interactions, wellbore geomechanics, torque and drag modeling, vibration modeling and drilling machinery operation;
    extracting data from said models into said conditional probability tables or conditional probability distributions;
    converting, by a processor, said conditional probability tables or conditional probability distributions into look-up tables;
    visually displaying data in said look-up tables in graphical form;
    generating a set point vector for control variables using real-time data gathered from said surface sensors, model data from said conditional probability tables or conditional probability distributions and a current drilling operation state or event; and
    sending control signals based on said control variables to actuators and valves that are controlled to modify a plant's or drilling rig's response to external inputs and noise.

2. The method as recited in claim 1 further comprising:
    checking said data for ensuring said data can be trusted; and
    detecting said current drilling operation state or event.

3. The method as recited in claim 1, wherein said models are generated through offline solving of algebraic or differential equations, experimentation or data from offset wells.

4. The method as recited in claim 1, wherein said automation control architecture applies to drilling, completion, stimulation and production activities.

5. A computer program product for utilizing look-up tables representing all models in an automation control architecture to independently handle uncertainties in sensed data, the computer program product comprising a computer readable storage medium having program code embodied therewith, the program code comprising the programming instructions for:
    storing data in a form of conditional probability tables or conditional probability distributions, wherein said data comes from all the following sources: an operator, a service provider, a drilling contractor and an equipment manufacturer, wherein said data from said operator comprises information regarding well planning and construction, wherein said data from said service provider comprises data from surface sensors and downhole telemetry tools, wherein said data from said drilling contractor comprises data regarding a working condition of rig equipment, wherein said data from said equipment manufacturer comprises data regarding equipment performance characteristics, wherein said conditional probability tables are matrices or multi-dimensional arrays that represent probabilistic relationships between various drilling parameters, wherein said conditional probability distributions are continuous variants of said conditional probability tables;
    receiving models of a drilling process comprising the following domains: wellbore hydraulics, drill bit/rock interactions, rock/fluid interactions, wellbore geomechanics, torque and drag modeling, vibration modeling and drilling machinery operation;
    extracting data from said models into said conditional probability tables or conditional probability distributions;
    converting said conditional probability tables or conditional probability distributions into look-up tables;
    visually displaying data in said look-up tables in graphical form;
    generating a set point vector for control variables using real-time data gathered from said surface sensors, model data from said conditional probability tables or conditional probability distributions and a current drilling operation state or event; and
    sending control signals based on said control variables to actuators and valves that are controlled to modify a plant's or drilling rig's response to external inputs and noise.

6. The computer program product as recited in claim 5, wherein the program code further comprises the programming instructions for:
    checking said data for ensuring said data can be trusted; and
    detecting said current drilling operation state or event.

7. The computer program product as recited in claim 5, wherein said models are generated through offline solving of algebraic or differential equations, experimentation or data from offset wells.

8. The computer program product as recited in claim 5, wherein said automation control architecture applies to drilling, completion, stimulation and production activities.

9. A system, comprising:
a memory unit for storing a computer program for utilizing look-up tables representing all models in an automation control architecture to independently handle uncertainties in sensed data; and
a processor coupled to the memory unit, wherein the processor is configured to execute the computer program instructions comprising:
storing data in a form of conditional probability tables or conditional probability distributions, wherein said data comes from all the following sources: an operator, a service provider, a drilling contractor and an equipment manufacturer, wherein said data from said operator comprises information regarding well planning and construction, wherein said data from said service provider comprises data from surface sensors and downhole telemetry tools, wherein said data from said drilling contractor comprises data regarding a working condition of rig equipment, wherein said data from said equipment manufacturer comprises data regarding equipment performance characteristics, wherein said conditional probability tables are matrices or multi-dimensional arrays that represent probabilistic relationships between various drilling parameters, wherein said conditional probability distributions are continuous variants of said conditional probability tables;
receiving models of a drilling process comprising the following domains: wellbore hydraulics, drill bit/rock interactions, rock/fluid interactions, wellbore geomechanics, torque and drag modeling, vibration modeling and drilling machinery operation;
extracting data from said models into said conditional probability tables or conditional probability distributions;
converting said conditional probability tables or conditional probability distributions into look-up tables;
visually displaying data in said look-up tables in graphical form;
generating a set point vector for control variables using real-time data gathered from said surface sensors, model data from said conditional probability tables or conditional probability distributions and a current drilling operation state or event; and
sending control signals based on said control variables to actuators and valves that are controlled to modify a plant's or drilling rig's response to external inputs and noise.

10. The system as recited in claim 9, wherein the computer program instructions further comprise:
checking said data for ensuring said data can be trusted; and
detecting said current drilling operation state or event.

11. The system as recited in claim 9, wherein said models are generated through offline solving of algebraic or differential equations, experimentation or data from offset wells.

12. The system as recited in claim 9, wherein said automation control architecture applies to drilling, completion, stimulation and production activities.

* * * * *